US007941445B2

(12) United States Patent
Motoyama et al.

(10) Patent No.: US 7,941,445 B2
(45) Date of Patent: *May 10, 2011

(54) MANAGING PROJECT SCHEDULE DATA USING SEPARATE CURRENT AND HISTORICAL TASK SCHEDULE DATA AND REVISION NUMBERS

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 323 days.

This patent is subject to a terminal disclaimer.

(21) Appl. No.: 12/122,442

(22) Filed: May 16, 2008

(65) Prior Publication Data

US 2009/0287718 A1    Nov. 19, 2009

(51) Int. Cl.
*G06F 17/30* (2006.01)
(52) U.S. Cl. .......... 707/790; 707/792; 707/802; 705/35; 715/751; 715/963
(58) Field of Classification Search .................. 707/790, 707/792, 802; 705/7–9, 11, 35; 715/751, 715/963
See application file for complete search history.

(56) References Cited

U.S. PATENT DOCUMENTS

| 5,706,502 | A | | 1/1998 | Foley et al. |
| 5,826,252 | A | * | 10/1998 | Wolters et al. ................. 717/101 |
| 6,049,776 | A | * | 4/2000 | Donnelly et al. .................. 705/8 |
| 6,101,481 | A | * | 8/2000 | Miller ................................. 705/9 |
| 6,415,259 | B1 | | 7/2002 | Wolfinger et al. |
| 6,519,763 | B1 | * | 2/2003 | Kaufer et al. ................. 717/101 |
| 6,954,737 | B2 | * | 10/2005 | Kalantar et al. ................. 705/50 |
| 7,051,036 | B2 | * | 5/2006 | Rosnow et al. ............... 707/723 |
| 7,062,449 | B1 | * | 6/2006 | Clark ................................. 705/9 |
| 7,073,175 | B2 | | 7/2006 | Rehg et al. |
| 7,167,893 | B1 | | 1/2007 | Malone et al. |
| 7,210,119 | B2 | | 4/2007 | Pothos et al. |
| 7,251,693 | B2 | | 7/2007 | Stull et al. |
| 7,406,432 | B1 | | 7/2008 | Motoyama |
| 7,546,228 | B2 | | 6/2009 | Cullick et al. |
| 7,668,800 | B2 | | 2/2010 | Motoyama et al. |
| 7,721,290 | B2 | | 5/2010 | Horikawa |
| 2002/0004734 | A1 | | 1/2002 | Nishizawa |

(Continued)

OTHER PUBLICATIONS

Uyttewaal, et al., "Dynamic scheduling with Microsoft Office Project 2003: The book by and for professionals", 2005, J. Ross publishing and International Institute for Learning, 4 pages.

(Continued)

*Primary Examiner* — Hanh B Thai
(74) *Attorney, Agent, or Firm* — Hickman Palermo Truong & Becker LLP; Edward A. Becker

(57) ABSTRACT

A project management system manages project schedule data using separate current and historical task schedule data structures. In general, current schedule data is stored separately from historical schedule data, so that the current schedule data may be retrieved separately from the historical task schedule data. The project management system may also maintain unscheduled tasks as "to-do lists." Tasks may be added to a member's schedule without specifying any planned dates and the tasks are added to the database. The tasks have an associated revision number of 0 to indicate that the tasks were added, but not yet scheduled. The tasks are displayed in the member schedule editor and in Web page schedules. The tasks may then be displayed in the member schedule editor and in Web page schedules in a manner that allows a user to readily determine that the tasks are "to-do list" tasks.

24 Claims, 55 Drawing Sheets

U.S. PATENT DOCUMENTS

| | | | |
|---|---|---|---|
| 2002/0065828 A1* | 5/2002 | Goodspeed | 707/100 |
| 2002/0077879 A1* | 6/2002 | Uchida et al. | 705/9 |
| 2002/0082889 A1* | 6/2002 | Oliver | 705/8 |
| 2002/0169739 A1 | 11/2002 | Carr et al. | |
| 2002/0178019 A1 | 11/2002 | Anderson et al. | |
| 2002/0194048 A1 | 12/2002 | Levinson | |
| 2003/0046345 A1 | 3/2003 | Wada et al. | |
| 2003/0191681 A1 | 10/2003 | Gallion et al. | |
| 2004/0078257 A1 | 4/2004 | Schweitzer et al. | |
| 2004/0111705 A1 | 6/2004 | Motoyama et al. | |
| 2004/0162750 A1 | 8/2004 | Motoyama | |
| 2004/0260782 A1* | 12/2004 | Affleck et al. | 709/208 |
| 2004/0267595 A1* | 12/2004 | Woodings et al. | 705/9 |
| 2005/0022198 A1 | 1/2005 | Olapurath et al. | |
| 2005/0027386 A1 | 2/2005 | Weigand et al. | |
| 2005/0033669 A1 | 2/2005 | Stremler et al. | |
| 2005/0138031 A1 | 6/2005 | Wefers | |
| 2005/0198103 A1* | 9/2005 | Ching | 709/200 |
| 2005/0216328 A1* | 9/2005 | Clark | 705/9 |
| 2006/0053043 A1 | 3/2006 | Clarke | |
| 2006/0053125 A1 | 3/2006 | Scott | |
| 2006/0136461 A1 | 6/2006 | Lee et al. | |
| 2006/0265690 A1* | 11/2006 | Motoyama et al. | 717/117 |
| 2007/0073695 A1* | 3/2007 | Conlan et al. | 707/9 |
| 2007/0192156 A1* | 8/2007 | Gauger | 705/8 |
| 2007/0214450 A1 | 9/2007 | Motoyama et al. | |
| 2007/0288283 A1* | 12/2007 | Fitzpatrick | 705/8 |
| 2007/0288288 A1 | 12/2007 | Motoyama et al. | |
| 2007/0288289 A1 | 12/2007 | Motoyama et al. | |
| 2007/0288290 A1 | 12/2007 | Motoyama et al. | |
| 2007/0288334 A1* | 12/2007 | Creedle et al. | 705/35 |
| 2007/0294617 A1 | 12/2007 | Kroeger | |
| 2008/0027779 A1 | 1/2008 | Kirwan | |
| 2008/0209416 A1 | 8/2008 | De Souza et al. | |
| 2008/0221952 A1 | 9/2008 | Mohri | |
| 2008/0255907 A1 | 10/2008 | Motoyama et al. | |
| 2008/0313024 A1 | 12/2008 | Kunichika et al. | |
| 2009/0055228 A1* | 2/2009 | Henry et al. | 705/7 |
| 2009/0217240 A1 | 8/2009 | Motoyama et al. | |
| 2009/0217241 A1 | 8/2009 | Motoyama et al. | |
| 2009/0222299 A1 | 9/2009 | Clemenson et al. | |
| 2009/0276260 A1* | 11/2009 | Douglas et al. | 705/7 |
| 2009/0287521 A1 | 11/2009 | Motoyama et al. | |
| 2009/0287522 A1 | 11/2009 | Motoyama et al. | |
| 2009/0287730 A1 | 11/2009 | Motoyama et al. | |
| 2009/0287731 A1 | 11/2009 | Motoyama et al. | |
| 2010/0070321 A1 | 3/2010 | Motoyama | |
| 2010/0070328 A1 | 3/2010 | Motoyama | |

OTHER PUBLICATIONS

Business Editors & High-Tech Writers, "SGP International Introduces E2doPro Enterprises Collaboration System Facilitates Project Management", Business Wire, Oct. 2002, 3 pages.

Steinbrecher "Project management software allows managers to plan, schedule, and control and project", Feb. 1987, Today's Office v21n9, Dialog file 15, Accession 00351477, pp. 8-14.

Giridhar "The computerized project planning system", Dec. 1998, Transactions of AACE International, Dialog file 275, Accession No. 01103603, pp. PS13-PS16.

Edwards "Project Management With the PC", Oct. 1984, PC Magazine, v3, n21, pp. 109-117, Dialog file 275, Accession No. 01103603.

Leslie, "Cost Forecasting—Beyond the Crystal Ball", Transactions of AACE International, Dialog file 15, Accession No. 01615178, Dec. 1996, 13 pages.

* cited by examiner

FIG. 1A

Task Assignment

| Task | Member Assignment |
|---|---|
| Planning | |
| Project Plan | T1 |
| Project Initiation | MGR |
| Requirements | |
| Requirements for System | T2 |
| Requirements Matrix for System | T2 |
| Guideline Documents | |
| Implementation and Unit Test Plan Guideline | T3 |
| Procedure for Source Code Control | T3 |
| Organization and Use of Project Directory | T3 |
| Design Document Guideline | T1 |
| Code Convention | T1 |
| Package Design | |
| Top Level Design | |
| Interface | T1 |
| Architecture | MGR |
| Database | |

*FIG. 1B*

Project Schedule

| | Tasks | Identified Date | Planned Start | Planned End | Actual Start | Actual End |
|---|---|---|---|---|---|---|
| | Planning | 2006-04-21 | 2005-09-20 | 2005-10-13 | | |
| | | 2005-09-19 | 2005-10-03 | 2005-10-14 | | |
| MGR | Project Initiation | 2005-09-20 | 2005-09-20 | 2005-09-29 | 2005-09-20 | |
| | | 2005-09-19 | 2005-09-27 | 2005-10-07 | 2005-09-20 | |
| T1 | Project Plan | 2005-09-19 | 2005-10-06 | 2005-10-13 | | |
| | Top Level Design | 2006-04-21 | 2005-10-04 | 2005-11-11 | | |
| | | 2005-09-19 | 2005-10-31 | 2005-11-18 | | |
| MGR | Architecture | 2005-09-20 | 2005-10-04 | 2005-10-12 | | |
| T1 | Interface | 2005-09-19 | 2005-10-31 | 2005-11-11 | | |
| | Guideline Documents | 2006-04-21 | 2005-10-16 | 2005-10-28 | | |
| | | 2005-09-19 | 2005-10-17 | 2005-10-28 | | |
| T1 | Code Convention | 2005-10-27 | 2005-10-16 | 2005-10-23 | | |
| | Design Document Guideline | 2005-09-19 | 2005-10-17 | 2005-10-23 | | |
| | Requirements | 2005-09-19 | 2005-10-21 | 2005-10-28 | | |
| | Class Specification | 2005-09-19 | 2005-11-18 | 2005-12-22 | | |
| | Package Design | 2005-09-19 | 2005-11-21 | 2005-12-09 | | |
| | Implementation and Unit Test Plan | 2006-04-21 | 2005-12-23 | 2006-01-09 | | |

*FIG. 2B*

Constant Query Strings Containing Placeholder Strings define("C_SelectHighestRevForMemberTaskQuery", "SELECT nLevel1TaskID, max(nScheduleRevNumber) FROM Level1MemberTask WHERE sProjectNumber='%%ProjectNumber%%' AND sMemberLabel='%%MemberLabel%%' AND nProjectTaskID=%%ProjectTaskID%% GROUP BY nLevel1TaskID");

define("C_SelectAllForMemberTaskQuery", "SELECT * FROM Level%%Level%%MemberTask WHERE sProjectNumber='%%ProjectNumber%%' AND nLevel%%Level%%TaskID=%%LevelTaskID%% ORDER BY nScheduleRevNumber DESC");

Constant For Placeholder Strings define("C_ProjectNumberKey", "%%ProjectNumber%%");
define("C_MemberLabelKey", "%%MemberLabel%%");
define("C_ProjectTaskIDKey", "%%ProjectTaskID%%");
define("C_TaskLevelKey", "%%Level%%");
define("C_LevelTaskID", "%%LevelTaskID%%");

FIG. 27

Script to generate query string $loc_sQuery = C_SelectHighestRevForMemberTaskQuery; ①
$loc_sQuery = str_replace(C_ProjectNumberKey, "J17", loc_sQuery); ②
$loc_sQuery = str_replace(C_MemberLabel, "T1", loc_sQuery); ③
$loc_sQuery = str_replace(C_ProjectTaskIDKey, "40", loc_sQuery); ④

String resulting from replacements

① SELECT nLevel1TaskID, max(nScheduleRevNumber) FROM Level1MemberTask WHERE sProjectNumber='%%ProjectNumber%%' AND sMemberLabel='%%MemberLabel%%' AND nProjectTaskID=%%ProjectTaskID%% GROUP BY nLevel1TaskID ② SELECT nLevel1TaskID, max(nScheduleRevNumber) FROM Level1MemberTask WHERE sProjectNumber='J17' AND sMemberLabel='%%MemberLabel%%' AND nProjectTaskID=%%ProjectTaskID%% GROUP BY nLevel1TaskID ③ SELECT nLevel1TaskID, max(nScheduleRevNumber) FROM Level1MemberTask WHERE sProjectNumber='J17' AND sMemberLabel='T1' AND nProjectTaskID=%%ProjectTaskID%% GROUP BY nLevel1TaskID ④ SELECT nLevel1TaskID, max(nScheduleRevNumber) FROM Level1MemberTask WHERE sProjectNumber='J17' AND sMemberLabel='T1' AND nProjectTaskID=40 GROUP BY nLevel1TaskID

FIG. 28

IN RESPONSE TO A REQUEST ASSOCIATED WITH A PARTICULAR EDITOR OF A NETWORK-BASED PROJECT SCHEDULE SYSTEM, LOCATE A PARTICULAR QUERY STRING ASSOCIATED WITH THE PARTICULAR EDITOR, WHEREIN THE QUERY STRING CONTAINS ONE OR MORE PLACEHOLDER STRINGS THAT EACH IDENTIFY WITH WHAT TYPE OF VALUE THE PLACEHOLDER STRING IS REPLACED TO GENERATE A QUERY FOR SUBMISSION TO A DATABASE  3302

GENERATE A DATABASE QUERY BY AUTOMATICALLY REPLACING THE ONE OR MORE PLACEHOLDER STRINGS IN THE PARTICULAR QUERY STRING WITH RESPECTIVE VALUES  3304

SUBMIT THE DATABASE QUERY TO THE DATABASE  3306

RETURN RESULTS OF THE DATABASE QUERY IN RESPONSE TO THE REQUEST  3308

FIG. 33

```
┌─────────────────────────────────────────────┐
│ IN RESPONSE TO AN EVENT THAT AFFECTS A      │
│ ROW OF A TABLE OF AN EDITOR ASSOCIATED      │
│ WITH A PROJECT SCHEDULE SYSTEM, WHEREIN     │
│ EACH ROW OF THE TABLE CORRESPONDS TO A      │
│ TASK ASSOCIATED WITH A PROJECT SCHEDULE     │
│ AND DISPLAYS VALUES CORRESPONDING TO        │
│ ELEMENTS OF THE EDITOR, A CLASS OBJECT      │
│ CORRESPONDING TO THE AFFECTED ROW           │
│ DIRECTLY ACCESSES ONE OR MORE ATTRIBUTES    │
│ OF THE CLASS OBJECT THAT CORRESPOND TO      │
│ ELEMENTS OF THE EDITOR, WHEREIN THE         │
│ ELEMENTS OF THE EDITOR ARE ATTRIBUTES OF    │
│ THE CLASS OBJECT    3402                    │
└─────────────────────────────────────────────┘
                      ↓
┌─────────────────────────────────────────────┐
│ THE CLASS OBJECT CORRESPONDING TO THE       │
│ AFFECTED ROW DIRECTLY MANIPULATES A VALUE   │
│ FOR EACH OF THE ONE OR MORE ATTRIBUTES OF   │
│ THE CLASS OBJECT BASED ON THE EVENT         │
│                   3404                      │
└─────────────────────────────────────────────┘
                      ↓
┌─────────────────────────────────────────────┐
│ A CLIENT TRANSMITTING TO A SERVER THE       │
│ VALUE FOR EACH OF THE ONE OR MORE           │
│          ATTRIBUTES    3406                 │
└─────────────────────────────────────────────┘
                      ↓
┌─────────────────────────────────────────────┐
│ THE SERVER STORING THE VALUE FOR EACH OF    │
│ THE ONE OR MORE ATTRIBUTES IN A DATABASE    │
│                   3408                      │
└─────────────────────────────────────────────┘
```

FIG. 34

| | | | |
|---|---|---|---|
| Task Assignment Processor | TaskAssignEditor.htm, PostTaskAssign.htm | | |
| | TaskAssignmentPHPPreEdit | CTAPreManagerP<br>CTAPreInitialDataP<br>CTAPreTaskRowDataP<br>CTAPreJavaScriptInterfaceP<br>CTAPreDBInterfaceP<br>TAPreConstantP | 3602 |
| | TaskAssignmentJavaScript | CTAjsEditorManagerJ<br>CTAjsTableJ<br>CTAjsRowJ<br>CTAjsTaskCellJ<br>CTAjsAssignmentCellJ | 3604 |
| | TaskAssignmentPHPPostEdit | CTAPostManagerP<br>CTAPostUpdaterP<br>CTAPostDBInterfaceP<br>CTAPostDBQueryGeneratorP<br>TAPostConstantsP | 3606 |
| | TaskAssignmentWebPageGenerator | CTAWebManagerP<br>CTAWebTableP<br>CTAWebDBInterfaceP<br>TAWebConstantsP | 3608<br>3610 |
| Project Schedule Processor | ProjScheduleEditor.htm, PostProjSchedule.htm | | |
| | ProjectSchedulePHPPreEdit | CPSPreManagerP<br>CPSPreInitialDataP<br>CPSPreRowDataP<br>CPSPreDBInterfaceP<br>CPSPreDBQueryGeneratorP<br>CPSPreJavaScriptInterfaceP<br>PSPreConstantsP | 3612 |
| | ProjectScheduleJavaScript | CPSjsEditorManagerJ<br>CPSjsTableJ<br>CPSRowJ<br>CPSjsTaskCellJ<br>CPSjsMemberCellJ<br>CPSjsDateCellJ<br>sPSjsProjectTaskInfoJ | 3614 |
| | PostProjectSchedulePHPPostEdit | CPSPostManagerP<br>CPSPostUpdaterP<br>CPSPostDBInterfaceP<br>CPSPostDBQueryGeneratorP<br>PSPostConstantsP | 3616 |
| | ProjectScheduleWebPageGenerator | CPSWebManagerP<br>CPSWebTableP<br>CPSWebRowP<br>CPSWebDBInterfaceP<br>CPSWebDBQueryGeneratorP<br>PSWebConstantsP | 3618<br>3620 |

FIG. 36A

| | MembScheduleEditor.htm, PostMembSchedule.htm | |
|---|---|---|
| Member Schedule Processor | MemberSchedulePHPPreEdit | CMSPreManagerP<br>CMSPreInitialDataP<br>CMSPreTaskRowDataP — 3622<br>CMSPreDBInterfaceP<br>CMSPreJavaScriptInterfaceP<br>MSPreConstantsP |
| | MemberScheduleJavaScript | CMSjsEditorManagerJ<br>CMSjsTableManagerJ<br>CMSjsTableJ — 3624<br>CMSjsRowJ<br>CMSjsTaskCellJ<br>CMSjsDateCellJ<br>CMSjsDetailTaskInfoJ<br>sMSjsMemberTaskInfoJ |
| | MemberSchedulePHPPostEdit | CMSPostManagerP<br>CMSPostUpdaterP<br>CMSPostDBInterfaceP — 3626<br>CMSPostDBQueryGeneratorP<br>MSPostConstantsP |
| | MemberScheduleWebPageGenerator | CMSWebManagerP<br>CMSWebTableP<br>CMSWebRowP — 3628<br>CMSWebDBInterfaceP<br>CMSWebDBQueryGeneratorP — 3630<br>MSWebConstantsP |

*FIG. 36B*

| FIG. 36A |
|---|
| FIG. 36B |

*FIG. 36C*

| sProjectNumber | sMemberLabel | nProjectTaskID | nLevel1TaskID | sLevel1TaskName | setDate | planStart | planEnd | actualStart | actualEnd | nScheduleRevNumber |
|---|---|---|---|---|---|---|---|---|---|---|
| J98 | MGR | 10 | 11 | Project Initiation | 8/20/2007 | 8/17/2007 | 8/23/2007 | 8/17/2007 | 8/23/2007 | 2 |
| J98 | MGR | 10 | 21 | Budget | 8/17/2007 | 8/20/2007 | | | | 1 |
| J98 | MGR | 10 | 31 | Schedule | 8/17/2007 | | | | | 0 |
| J98 | MGR | 0 | 41 | Review Office Action RSID 1-730 | 8/17/2007 | 8/27/2007 | 8/31/2007 | 8/23/2007 | 8/27/2007 | 1 |
| J98 | MGR | 40 | 51 | Status Report | 8/21/2007 | 8/27/2007 | 9/6/2007 | 8/5/2007 | 9/6/2007 | 2 |
| J98 | MGR | 40 | 61 | Remote Cross Reference Update | 8/3/2007 | | | | | 0 |
| J98 | T1 | 0 | 32 | Update MySQL to latest version | 8/2/2007 | 8/15/2007 | 8/24/2007 | | | 1 |
| J98 | T1 | 20 | 12 | Project Plan | 8/2/2007 | 8/6/2007 | 8/15/2007 | | | 1 |
| J98 | T1 | 30 | 42 | Requirements Document | 8/6/2007 | 8/13/2007 | 8/17/2007 | | | 1 |
| J98 | T1 | 30 | 52 | Requirements Matrix | 8/6/2007 | 8/17/2007 | 8/19/2007 | | | 1 |
| J98 | T1 | 30 | 22 | Design Document Guideline | 8/2/2007 | | | | | 0 |
| J98 | T2 | 50 | 13 | Design Document Guideline | 8/3/2007 | 8/1/2007 | 8/7/2007 | 8/1/2007 | 8/6/2007 | 1 |
| J98 | T2 | 50 | 23 | PHP Code Convention | 8/3/2007 | 8/7/2007 | 8/13/2007 | 8/5/2007 | 8/14/2007 | 1 |
| J98 | T2 | 50 | 33 | JavaScript Code Convention | 8/3/2007 | 8/13/2007 | 8/17/2007 | 8/14/2007 | 8/20/2007 | 1 |
| J98 | T2 | 50 | 43 | Unit Test Plan Guideline | 8/6/2007 | 8/20/2007 | 8/23/2007 | | | 1 |

*FIG. 41A*

| sProjectNumber | nLevel1TaskID | setDate | planStart | planEnd | actualStart | actualEnd | nScheduleRevNumber |
|---|---|---|---|---|---|---|---|
| J98 | 11 | 8/17/2007 | 8/17/2007 | 8/24/2007 | | | 1 |
| J98 | 51 | 8/20/2007 | 8/27/2007 | | | | 1 |

Task Schedule

Project Preparation

| Tasks | Identified Date | Planned Start | Planned End | Actual Start | Actual End |
|---|---|---|---|---|---|
| Project Initiation | 2007-08-20 | 2007-08-17 | 2007-08-23 | 2007-08-17 | 2007-08-23 |
| ~~2007-08-17~~ | ~~2007-08-17~~ | ~~2007-08-24~~ | | |
| Draft | 2007-08-17 | 2007-08-17 | 2007-08-22 | 2007-08-17 | 2007-08-21 |
| Review/Inspection | 2007-08-20 | 2007-08-21 | 2007-08-23 | 2007-08-21 | 2007-08-23 |
| ~~2007-08-17~~ | ~~2007-08-22~~ | ~~2007-08-24~~ | | |
| ~~Budget~~ | ~~2007-08-17~~ | ~~2007-08-20~~ | | | |
| ~~Schedule~~ | ~~2007-08-17~~ | | | | |
| Review Office Action RSID 1-730 | 2007-08-17 | 2007-08-27 | 2007-08-31 | 2007-08-23 | 2007-08-27 |

Patent Reporting Update

| Tasks | Identified Date | Planned Start | Planned End | Actual Start | Actual End |
|---|---|---|---|---|---|
| Status Report | 2007-08-21 | 2007-08-27 | 2007-09-06 | 2007-08-28 | 2007-09-06 |
| Project Web Site | 2007-08-20 | 2007-08-27 | 2007-09-06 | 2007-08-28 | 2007-09-06 |
| Setup | 2007-08-20 | 2007-08-27 | 2007-08-27 | 2007-08-28 | 2007-08-30 |
| Collect Information | 2007-08-20 | 2007-08-27 | 2007-08-28 | 2007-08-30 | 2007-09-03 |
| Generate Report | 2007-08-21 | 2007-09-03 | 2007-09-06 | 2007-09-03 | 2007-09-06 |
| ~~Project Workspace~~ | ~~2007-08-20~~ | ~~2007-08-28~~ | ~~2007-08-31~~ | | |
| ~~Setup~~ | ~~2007-08-20~~ | | | | |
| ~~Collect Information~~ | ~~2007-08-20~~ | | | | |
| ~~Generate Report~~ | ~~2007-08-20~~ | | | | |
| ~~Remote Cross Reference Update~~ | ~~2007-08-20~~ | | | | |

Task Schedule

Planning

| Tasks | Identified Date | Planned Start | Planned End | Actual Start | Actual End |
|---|---|---|---|---|---|
| Project Plan | 2007-08-17 | 2007-08-27 | 2007-09-03 | | |
| Draft | 2007-08-17 | 2007-08-27 | 2007-08-30 | | |
| Review/Inspection | 2007-08-17 | 2007-08-30 | 2007-09-03 | | |
| Update MySQL to latest version | 2007-08-17 | 2007-08-17 | 2007-08-27 | | |
| Upgrade Workstation to MS Vista | 2007-08-31 | | | | |
| Update Apache on Web Server | 2007-08-31 | | | | |

Top Level Design

| Tasks | Identified Date | Planned Start | Planned End | Actual Start | Actual End |
|---|---|---|---|---|---|
| Major Packages & Interface | 2007-08-31 | | | | |
| Major Sequences | 2007-08-31 | | | | |
| Data Structures | 2007-08-31 | | | | |
| Database | 2007-08-31 | | | | |

*FIG. 45*

FIG. 46 test1's J98 Schedule

| Task | Set Date | Planned Start Date | Planned End Date | Actual Start Date | Actual End Date |
|---|---|---|---|---|---|
| Project Plan | 2007-08-17 | Aug 27 2007 | Sep 03 2007 | | |
| Draft | 2007-08-17 | Aug 27 2007 | Aug 30 2007 | | |
| Review/Inspection | 2007-08-17 | Aug 30 2007 | Sep 03 2007 | | |
| Update MySQL to latest version | 2007-08-17 | Aug 17 2007 | Aug 27 2007 | | |
| Major Packages & Interface | 2007-08-31 | | | | |
| Major Sequences | 2007-08-31 | Sep 11 2007 | Sep 14 2007 | | |
| Data Structures | 2007-08-31 | | | | |
| Database | 2007-08-31 | | | | |
| Upgrade Workstation to MS Vista | 2007-08-31 | Sep 10 2007 | Sep 13 2007 | | |
| Update Apache on Web Server | 2007-09-10 | | | | |

Select Task in black
Select Task in black
New
~Package Design~
MemberSchedule
ProjectSchedule

| September | | | 2007 | | | |
|---|---|---|---|---|---|---|
| Sun | Mon | Tue | Wed | Thu | Fri | Sat |
| 26 | 27 | 28 | 29 | 30 | 31 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 1 | 2 | 3 | 4 | 5 | 6 |

-Select checkbox of task before selecting these buttons-
[Add Details] [Add Rows Above] [Add Rows Below] [Delete] [Finish]

Select the number of rows to add
[1]
[Add Rows At Bottom] [Update]

Task Schedule

Planning

| Tasks | Identified Date | Planned Start | Planned End | Actual Start | Actual End |
|---|---|---|---|---|---|
| Project Plan | 2007-08-17 | 2007-08-27 | 2007-09-03 | | |
| Draft | 2007-08-17 | 2007-08-27 | 2007-08-30 | | |
| Review/Inspection | 2007-08-17 | 2007-08-30 | 2007-09-03 | | |
| Update MySQL to latest version | 2007-08-17 | 2007-08-17 | 2007-08-27 | | |
| Update Apache on Web Server | 2007-09-10 | 2007-09-10 | 2007-09-13 | | |
| Upgrade Workstation to MS Vista | 2007-08-31 | | | | |

Top Level Design

| Tasks | Identified Date | Planned Start | Planned End | Actual Start | Actual End |
|---|---|---|---|---|---|
| Data Structures | 2007-09-10 | 2006-09-11 | 2007-09-14 | | |
| | 2007-08-31 | | | | |
| Major Packages & Interface | 2007-08-31 | | | | |
| Major Sequences | 2007-08-31 | | | | |
| Database | 2007-08-31 | | | | |

| sProjectNumber | sMemberLabel | nProjectTaskID | nLevel1TaskID | sLevel1TaskName | setDate | planStart | planEnd | actualStart | actualEnd | nScheduleRevNumber |
|---|---|---|---|---|---|---|---|---|---|---|
| J98 | T1 | 0 | 32 | Update MySQL to latest version | 8/17/2007 | 8/17/2007 | 8/27/2007 | | | 1 |
| J98 | T1 | 0 | 102 | Upgrade Workstation to MS Vista | 8/31/2007 | | | | | 0 |
| J98 | T1 | 0 | 112 | Update Apache on Web Server | 9/10/2007 | 9/10/2007 | 9/13/2007 | | | 1 |
| J98 | T1 | 20 | 12 | Project Plan | 8/17/2007 | 8/27/2007 | 9/3/2007 | | | 1 |
| J98 | T1 | 30 | 42 | Requirements Document | 8/21/2007 | 9/3/2007 | 9/6/2007 | | | 1 |
| J98 | T1 | 30 | 52 | Requirements Matrix | 8/21/2007 | 9/6/2007 | 9/10/2007 | | | 1 |
| J98 | T1 | 50 | 22 | Design Document Guidelines | 8/17/2007 | | | | | 0 |
| J98 | T1 | 60 | 62 | Major Packages & Interface | 8/31/2007 | | | | | 0 |
| J98 | T1 | 60 | 72 | Major Sequences | 8/31/2007 | | | | | 0 |
| J98 | T1 | 60 | 82 | Data Structures | 9/10/2007 | 9/11/2007 | 9/14/2007 | | | 1 |
| J98 | T1 | 60 | 92 | Database | 8/31/2007 | | | | | 0 |

*FIG. 49A*

| sProjectNumber | nLevel1TaskID | setDate | planStart | planEnd | actualStart | actualEnd | nScheduleRevNumber |
|---|---|---|---|---|---|---|---|
| J98 | 82 | 8/31/2007 | | | | | 0 |
| J98 | 112 | 8/31/2007 | | | | | 0 |

MANAGING PROJECT SCHEDULE DATA USING SEPARATE CURRENT AND HISTORICAL TASK SCHEDULE DATA AND REVISION NUMBERS

CROSS REFERENCE TO RELATED APPLICATIONS

This application is related to co-pending U.S. patent application Ser. No. 12/035,817, filed Feb. 22, 2008, entitled "Script Generation for Graceful Termination of a Web Enabled Client by a Web Server"; co-pending U.S. patent application Ser. No. 12/036,152 filed Feb. 22, 2008, entitled "Graceful Termination of a Web Enabled Client"; co-pending U.S. patent application Ser. No. 11/724,723, filed Mar. 15, 2007, entitled "Database Query Generation For Project Task Management System For Managing Project Schedules Over A Network", U.S. patent application Ser. No. 11/724,757, filed Mar. 15, 2007, entitled "Class Object Wrappers For Document Object Model (DOM) Elements For Project Task Management System For Managing Project Schedules Over A Network"; co-pending U.S. patent application Ser. No. 11/449,116, filed Jun. 7, 2006, entitled "Use of Schedule Editors In a Network-Based Project Schedule Management System"; co-pending U.S. patent application Ser. No. 11/449,130, filed Jun. 7, 2006, entitled "Consolidation of Member Schedules With a Project Schedule In a Network-Based Project Schedule Management System"; co-pending U.S. patent application Ser. No. 11/449,133, filed Jun. 7, 2006, entitled "Use of a Database In a Network-Based Project Schedule Management System"; co-pending U.S. patent application Ser. No. 09/881,250, filed Jun. 13, 2001, now U.S. Pat. No. 7,191,141 B2, entitled "Automated Management Of Development Project Files Over A Network"; co-pending U.S. patent application Ser. No. 10/059,694, filed Jan. 28, 2002, entitled "Project Management Over A Network With Automated Task Schedule Update"; co-pending U.S. patent application Ser. No. 12/122,392 filed May 16, 2008, entitled "Managing Project Schedule Data Using Separate Current And Historical Task Schedule Data"; co-pending U.S. patent application Ser. No. 12/122,497 filed May 16, 2008, entitled "To-Do List Representation In The Database Of A Project Management System"; co-pending U.S. patent application Ser. No. 12/122,514 filed May 16, 2008, entitled "Managing To-Do Lists In Task Schedules In A Project Management System"; co-pending U.S. patent application Ser. No. 12/122,533 filed May 16, 2008, entitled "Managing To-Do Lists In A Schedule Editor In A Project Management System", the contents of all of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to project management. The application relates more specifically to managing project schedule data using separate current and historical task schedule data and to-do list representations for project schedule data.

BACKGROUND

Computer-implemented project management tools have evolved into sophisticated systems that allow very large projects with many tasks to be managed effectively. Some tools allow designation of a so called "critical path" that identifies a task or set of tasks that must be completed before other tasks can be started. Knowing which tasks must be completed before other tasks can be started helps business organizations allocate resources on a project. When dates are changed in the project, the schedules are automatically updated based upon dependencies between tasks. For example, suppose that task A is on the critical path and tasks B and C cannot be started until task A is completed. If the projected end date of task A is changed, then the projected start dates of tasks B and C are automatically updated by the project management tool to reflect the change made to the projected end date of task A.

One of the problems with conventional project management systems is that they tend to accumulate a large amount of historical data. For example, in some situations, changing a single date on a task can cause changes in a large number of dates for other tasks. This is particularly true in situations where, because of dependencies, changes in dates cause a large number of other dates to change because of cascade effects. Conventional project management systems store both current and historical date information. One consequence of this is that as the amount of historical data grows, queries against the schedule data become more complex and computationally expensive to process. Another issue with conventional project management systems is that the user interfaces are often focused on project tasks that have been scheduled and little attention is given to tasks that have not yet been scheduled.

SUMMARY

A project management system manages project schedule data using separate current and historical task schedule data structures. In general, current schedule data is stored separately from historical schedule data, so that the current schedule data may be retrieved separately from the historical task schedule data. This avoids having to first query the schedule data to identify the most recent version of a schedule before the current schedule data can be retrieved. The project management system may also maintain unscheduled tasks as "to-do lists." Tasks may be added to a member's schedule without specifying any planned dates and the tasks are added to the database. The tasks have an associated revision number of 0 to indicate that the tasks were added, but not yet scheduled. The tasks are displayed in the member schedule editor and in Web page schedules. According to one embodiment of the invention, the tasks are displayed in the member schedule editor and in Web page schedules in a manner that allows a user to readily determine that the tasks are "to-do list" tasks, e.g., by displaying the "to-do list" tasks in a particular location or order with respect to scheduled tasks.

BRIEF DESCRIPTION OF THE DRAWINGS

In the drawings:

FIG. 1A is a screenshot of a task assignment editor.

FIG. 1B is a screenshot of a sample of a task assignment Web page.

FIG. 2B is a screenshot of a sample of a project schedule Web page.

FIG. 27 depicts example constant strings that are used to generate database queries.

FIG. 28 depicts an example script used to generate the database query from the constant strings of FIG. 27.

FIG. 33 is a flow diagram illustrating a method for automatically generating a database query in a network-based project schedule management system.

FIG. 34 is a flow diagram illustrating a method for managing tasks in a project schedule management system.

FIGS. 36A-36C are diagrams illustrating part of the indexing of Table 7 focusing on the three major packages of the system corresponding to the editors.

FIGS. 41A and 41B depict maintaining current schedule data and historical schedule data in separate data structures, according to one embodiment of the invention.

FIG. 44 depicts a sample Web page generated for a member's task schedule that includes both current and historical task schedule data.

FIG. 45 depicts an example Web page for a member's task schedule displaying to-do list tasks.

FIG. 46 depicts the member schedule editor containing the tasks displayed in the Web page of FIG. 45.

FIG. 47 depicts the Web page for a member's task schedule that is generated when the member completes the member schedule editor session of FIG. 46.

FIG. 48 depicts another member schedule editor session after the previous session of FIG. 46.

FIGS. 49A and 49B depict the Level1MemberTask table and Level1MemberTaskHistory table, respectively, of the database containing the task information that are the results of the member schedule editor session and used to generate the Web page of the member task schedule.

DETAILED DESCRIPTION

Figure 2A:
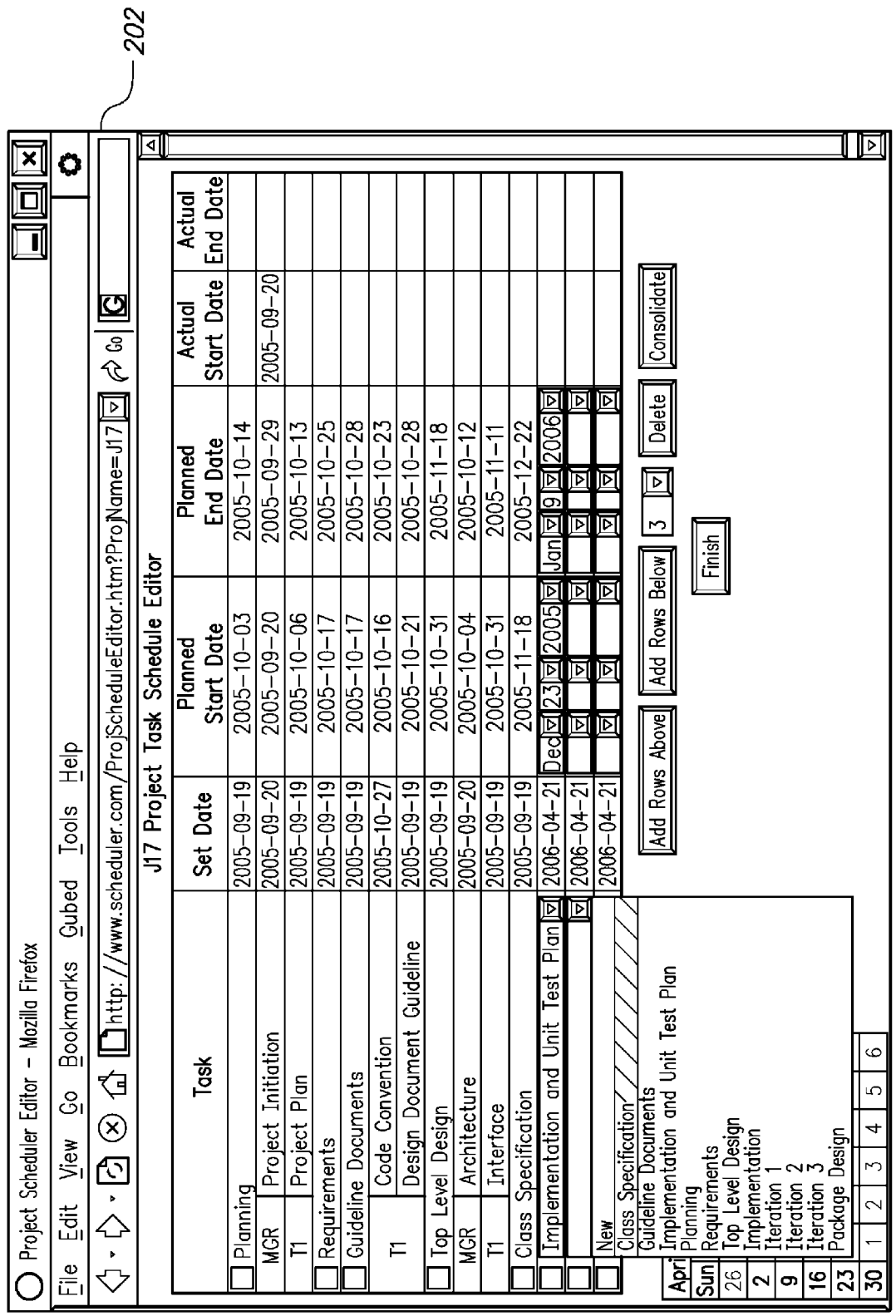
FIG. 2A is a screenshot of a project schedule editor.

A project management system manages project schedule data using separate current and historical task schedule data structures. The project management system also provides support for maintaining unscheduled tasks as "to-do lists." Example embodiments are associated with a client-server based project schedule task management system. However, the approaches described herein are broadly available to other software development projects. In the following description, for the purposes of explanation, numerous specific details are set forth in order to provide a thorough understanding of the present invention.

Task Assignment Editor

Figure 1A:
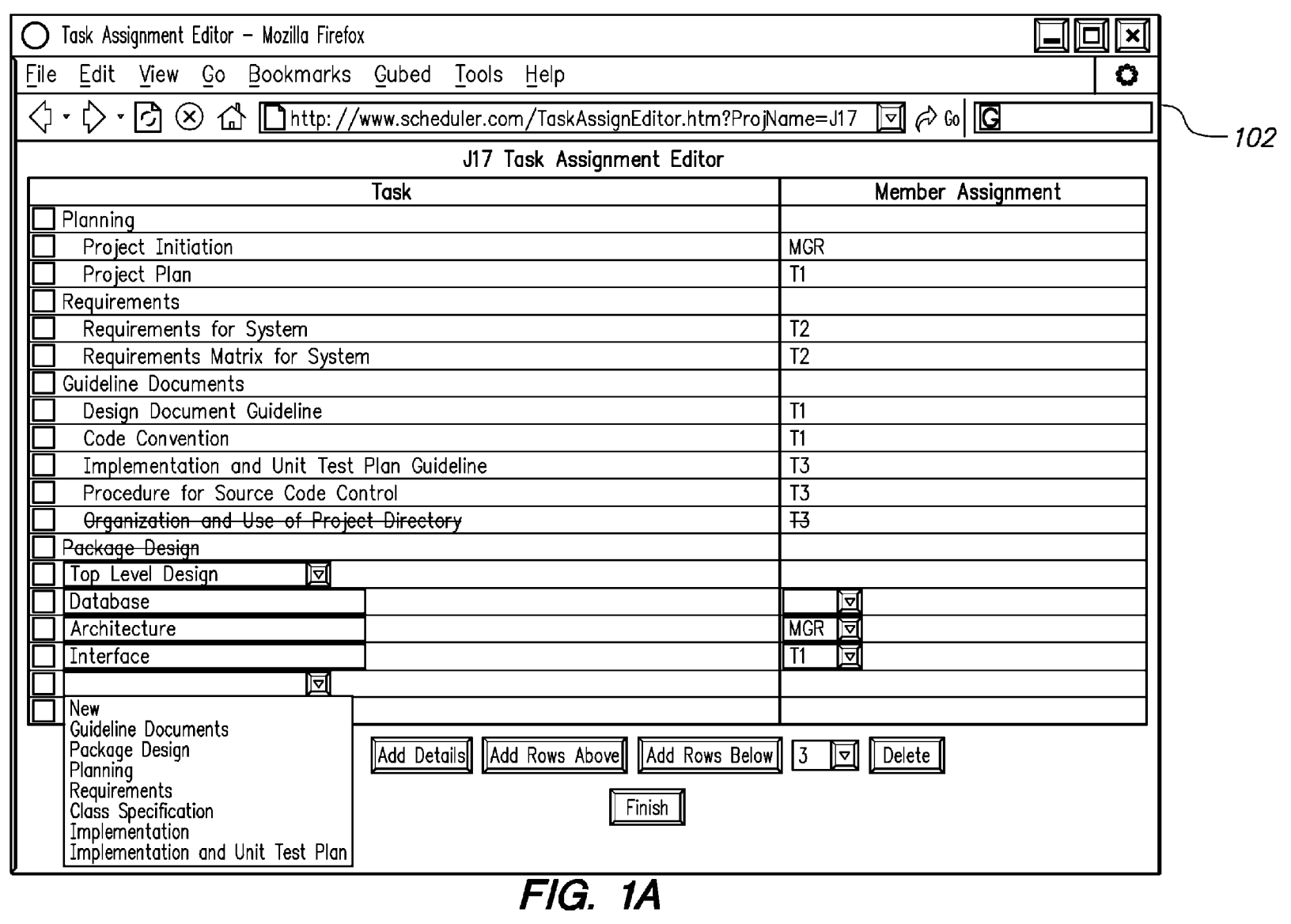

FIG. 1A is a screenshot of a task assignment editor. The task assignment editor 102 assists users in creating the project tasks that are to be completed in a project. With some organizations, there are default project tasks that are common to all projects that will be performed in association with the organization. Associated with the project tasks are subtasks which are assigned to project members. Typically, a project manager sets and assigns tasks to project members. The project manager can use this task assignment editor 102 to set up the project tasks for a project, create the subtasks for each project task, and assign the subtasks to the members. Information about the task assignment is stored and maintained in the task assignment editor 102 while the project manager is adding and assigning tasks. Upon the manager completing a session with the task assignment editor 102, the task assignment information is passed to, stored in, and maintained in a database.

In response to completion of a task assignment session, such as in response to a user selecting the "Finish" button on the task assignment editor 102 of FIG. 1A, a task assignment Web page 104 is automatically created, at the Web server, for displaying the tasks that are assigned to various project members. FIG. 1B is a screenshot of a sample of a task assignment Web page. Task and task assignment information entered and edited via the task assignment editor 102 is displayed in a form in a Web page when displayed in a Web browser. All the tasks the assignment of tasks are stored within one or more database tables, where each row preferably corresponds to a task, and displayed in the task assignment editor 102 and the task assignment Web page 104.

According to one embodiment, the task assignment editor 102 (FIG. 1A) includes buttons (e.g., Add Details, Add Rows Above, Add Rows Below, Delete, and Finish) usable to perform various operations. The "Finish" button completes the editor session and submits the task assignment information to be stored and maintained in the database. The other buttons perform a respective operation on a task that must be selected by selecting the checkbox in the row corresponding to the task. An "Add Details" button adds rows beneath a project task so the manager can add and assign subtasks to project members. "Add Rows Above" and "Add Rows Below" buttons add rows above and below the row corresponding to the selected task (either project task or subtask) so the manager can add more project tasks or add and assign more subtasks. The number of rows added is set by a "number of rows" menu selection that is next to the "Add Rows Below" button. The "Delete" button deletes the selected task, and removes a project task from the project or removes the assignment of subtasks to a project member.

Project Schedule Editor

FIG. 2A is a screenshot of a project schedule editor. The project schedule editor 202 is used to set the schedule for the project tasks that are created in the task assignment editor 102 (FIG. 1A). A project task may be created and scheduled in the project schedule editor 202. However, in one embodiment, subtasks cannot be added to the project tasks to assign them to project members using the project schedule editor 202. Most likely, the project manager will use the project schedule editor 202 after the task assignment editor 102. The manager can use the project schedule editor 202 to set the initial project schedule for the major project tasks added in the task assignment editor 102. Information about the scheduling of project tasks is stored and maintained in the project schedule editor 202 while the project manager is adding and scheduling tasks. Upon the manager completing a project schedule editor session, the schedule information for the project tasks is passed, stored, and maintained in the database.

In response to completion of a project schedule session, such as in response to a user selecting the "Finish" button on the project schedule editor 202 of FIG. 2A, a project schedule Web page 204 is automatically created, at the Web server, for displaying a table for the project schedule. If the individual project members' schedules are created and/or updated for the project subtasks, the project schedule editor 202 displays each project task schedule along with all the subtask schedules. The project schedule editor 202 depicts the subtasks with the project member to whom it was assigned. By completing the editor session or by selecting "Consolidate" on the project schedule editor 202 of FIG. 2A, all the subtask schedules for each project task are automatically consolidated or aggregated to update the schedule for the project task, and the project task schedule is updated in the database.

FIG. 2B is a screenshot of a sample of a project schedule Web page. The project schedule Web page 204 is created for displaying the schedule of the project tasks and its subtasks along with the member to whom a task or subtask is assigned. The project schedule Web page 204 depicts all the previous schedules (e.g., with strikethrough of previous dates) of each project task and subtask so that the project team can see the changes that occur in the schedule of a task. Project schedule information entered and edited via the project schedule editor 202 is displayed in a form in a Web page when displayed in a Web browser. All the project tasks' schedules and the subtasks' schedules are stored within one or more database tables, where each row preferably corresponds to a task, and displayed in the project schedule editor 202 and the project schedule Web page 204.

According to one embodiment, the project schedule editor 202 (FIG. 2A) includes buttons (Add Rows Above, Add Rows Below, Delete, Consolidate, and Finish) which perform various operations. The "Finish" and "Consolidate" buttons complete the project schedule editor session and submit the project task schedule information to be stored and maintained in the database. The "Consolidate" button causes the members' schedules to be consolidated with the project schedule so that the project schedule is updated in the database. The "Consolidate" button causes the project schedule editor to be redisplayed in the project schedule Web page with updated task schedules. The other buttons perform a respective operation on a task that is selected by selecting the checkbox in the row corresponding to the task. The operations can only be performed on project tasks and not the subtasks which are assigned to members. "Add Rows Above" and "Add Rows Below" buttons add rows above and below the row corresponding to the selected project so the manager can add more project tasks and set the schedules for the tasks. The number of rows added is set by the "number of rows" menu selection that is next to the "Add Rows Below" button. The "Delete" button deletes the selected project task.

Member Schedule Editor

Figure 3A:
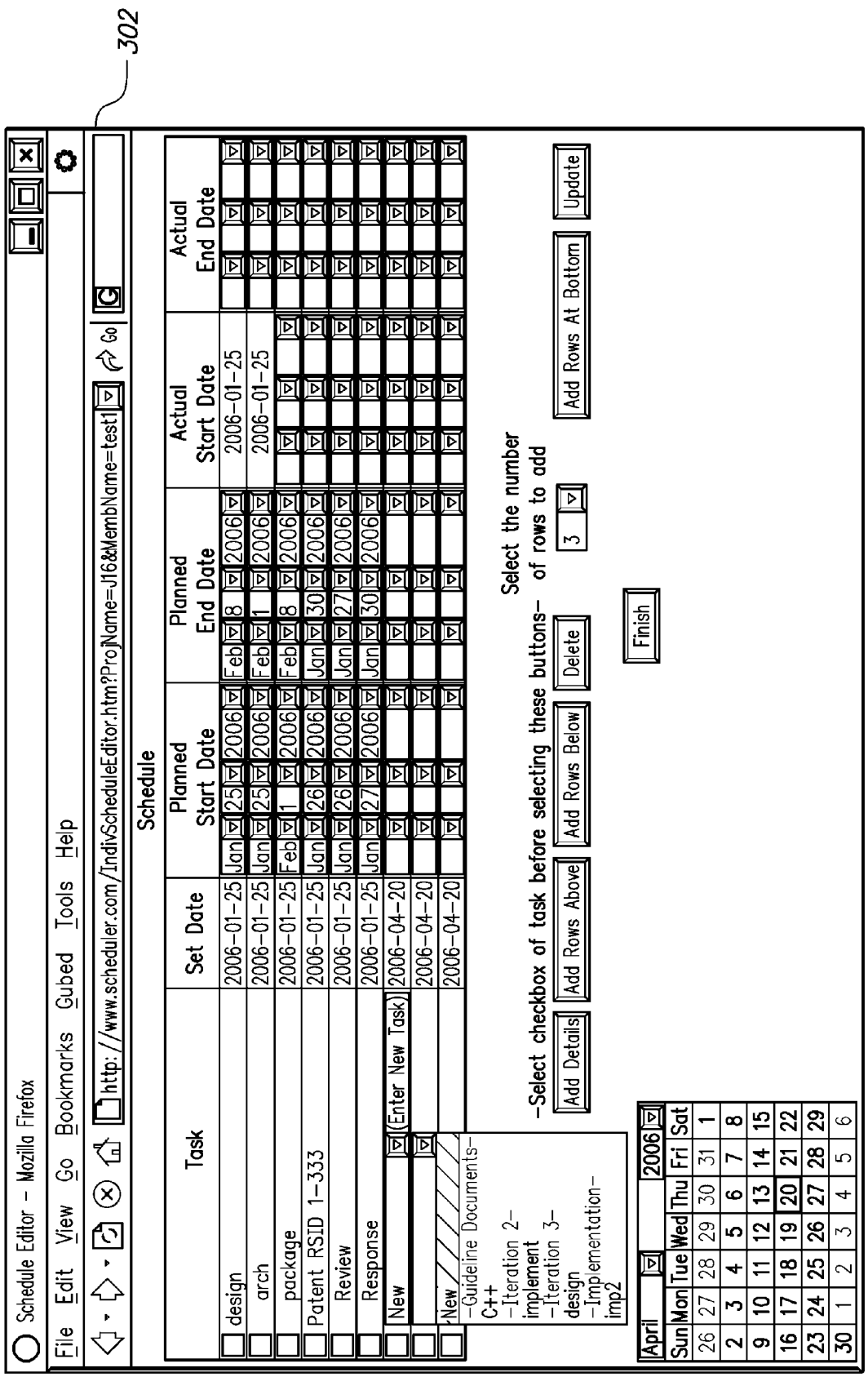
FIG. 3A is a screenshot of a member schedule editor.

FIG. 3A is a screenshot of a member schedule editor. The member schedule editor 302 (also referred to as "individual schedule editor") is used to create a schedule for an individual project member. According to one embodiment, the member schedule editor 302 displays only uncompleted tasks if the member schedule was previously created. The tasks of a member can be project subtasks and/or tasks unrelated to the project. The member can set the schedule, change the schedule, and update the results for a task via the member schedule editor 302. Each of the tasks of a member can be broken down into lower level tasks to schedule the minute details of the task. The addition or modification of lower level tasks may affect the schedule of the upper level task. Therefore, the upper level tasks schedules are updated when the "Update" button is selected. Information about the scheduling of tasks is stored and maintained in the member schedule editor 302 while the member is adding or modifying task schedules. Upon a member finishing a member schedule editor 302 session, the task schedule information is passed, stored, and maintained in the database. FIG. 3A depicts the assigned tasks in the drop down list.

Figure 3B:
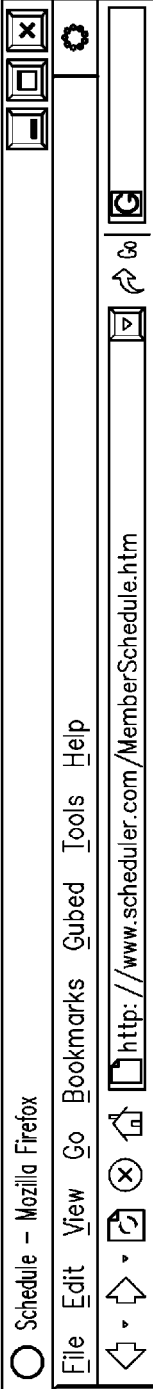
FIG. 3B is a screenshot of a sample of a member's schedule Web page.

In response to completion of a member schedule session, such as in response to a user selecting the "Finish" button on the member schedule editor 302 of FIG. 3A, a member schedule Web page 304 (labeled "Task Schedule" in the screen shot of FIG. 3B) is automatically created, at the Web server, for displaying a table for the member schedule. FIG. 3B is a screenshot of a sample of a member's schedule Web page. Individual schedule information entered and edited via the member schedule editor 302 is displayed in a form in a Web page when displayed in a Web browser. All the tasks' schedules are displayed within a table where each row corresponds to a task. The member schedule Web page 304 depicts the previous schedules (e.g., with strikethrough of previous dates) of each project task and subtask so that the project team can see the changes that occur in the schedule of a task.

In member schedule editor 302, buttons (Add Details, Add Rows At Bottom, Add Rows Above, Add Rows Below, Delete, Update, and Finish) are positioned near the table, which are used to perform various respective operations. The "Finish" button completes the member schedule editor session and submits the task schedule information to be stored and maintained in the database. Except for the "Update" button and the "Add Rows At Bottom" button, the other buttons perform an operation on a task that is selected by selecting the checkbox in the row corresponding to the task. The "Add Details" button adds rows beneath a task so the member can add subtasks (a task one level lower) to a task to give more details of the task. "Add Rows Above" and "Add Rows Below" buttons add rows above and below the row corresponding to the selected task so the member can add more tasks to the schedule at the same level. The number of rows added is set by the "number of rows" menu selection that is next to the "Add Rows Below" button. The "Delete" button deletes the selected task. The "Delete" button also removes a task, and all lower level tasks associated with the task, from the member's schedule. The "Add Rows At Bottom" button adds one or more highest level rows to the bottom of the schedule where the number of rows added is set in the "number of rows" menu selection. The "Update" button updates all the upper level task schedules with the lower level task schedules and updates the display of the member schedule editor 302 to depict the new dates.

The schedule information for a task includes the plan start and end dates and the actual start and end dates. The plan and actual dates can be set and modified for tasks in the member schedule editor 302. However, only the plan dates can be set for the project tasks in the project schedule editor 202 (FIG. 2A) when the task is scheduled for the first time. The plan dates are automatically updated and the actual dates are automatically set based on the information in the members' schedule for the plan and actual dates of the project subtask, when consolidated. Though not shown, the project schedule editor 202 can be modified so that the planned dates can be changed. However, whatever changes are made in the planned dates of the project task will be overridden by the consolidation of the planned dates of the members' schedule of the project subtasks. Information in the database is used to update the actual dates of the project task when the project manager either completes a project editor session or via the "Consolidate" button of the project schedule editor 202.

Figure 4:
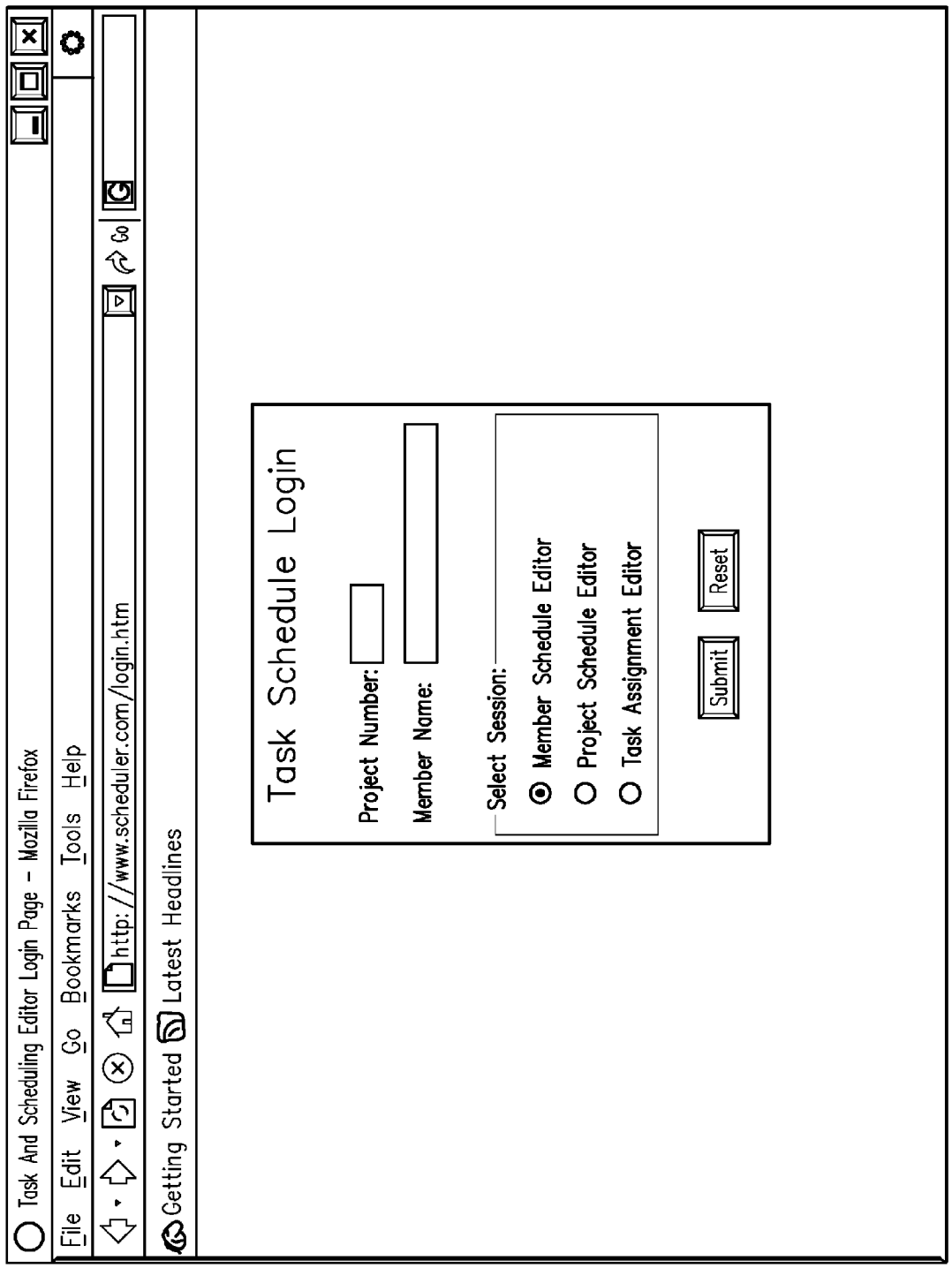
FIG. 4 is a screenshot of a login Web page for a project member to log on to one of the editors (task assignment, project schedule, member schedule).

FIG. 4 is a screenshot of a login Web page for a project member to log on to one of the editors (task assignment, project schedule, member schedule). The member enters the project number, member name, and selects the appropriate editor, and then submits the information to access the editor. The project schedule management system validates the input and determines if the member is a valid member of the project and has an access right for the selected editor. If not, the member will be denied access to the editor. For tighter security, the login Web page and editors can occur over secure HTTP (e.g., HTTPS) and the login page can require a password before logging in.

Project Schedule Management System

Figure 5:
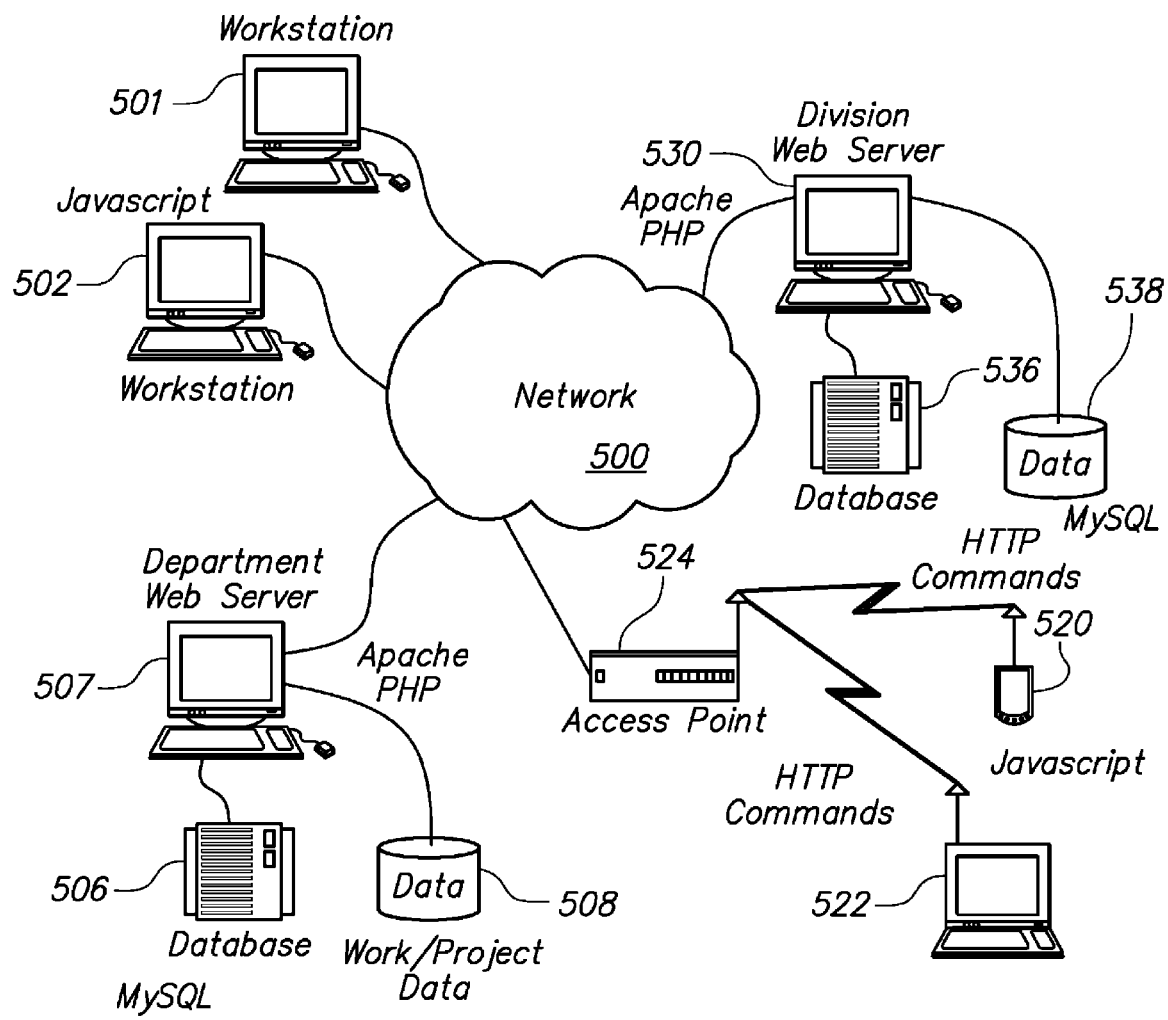
FIG. 5 is a diagram illustrating an operating environment in which an embodiment of the invention may be implemented.

FIG. 5 is a diagram illustrating an operating environment in which an embodiment of the invention may be implemented. The illustrated operating environment is illustrative of an overall system configuration for the project schedule management system described herein. The example operating environment comprises a plurality of workstations, one or more Web servers, and one or more associated databases, which are all connected directly or indirectly to a software development network for communication.

Generally, Web servers 507 and 530 comprise the resources for the display and management of the editors. The Web servers 507, 530 interact with databases 506, 536, respectively, to store, maintain, and manage task assignment and task schedule information, e.g., data 508, 538. The depiction of two Web servers and two databases is for purposes of example. Thus, the number of Web servers and databases used in a project schedule management system as described herein may vary from implementation to implementation. Web browsers on computer workstations 501, 502 access the resources on the Web servers 507, 530 to display the editors. Project members or managers can access the editors over the network 500 (LAN or WAN). The project management system can be used to manage projects at different levels within an organization, e.g., at project, department, division, and organization levels.

Figure 35:
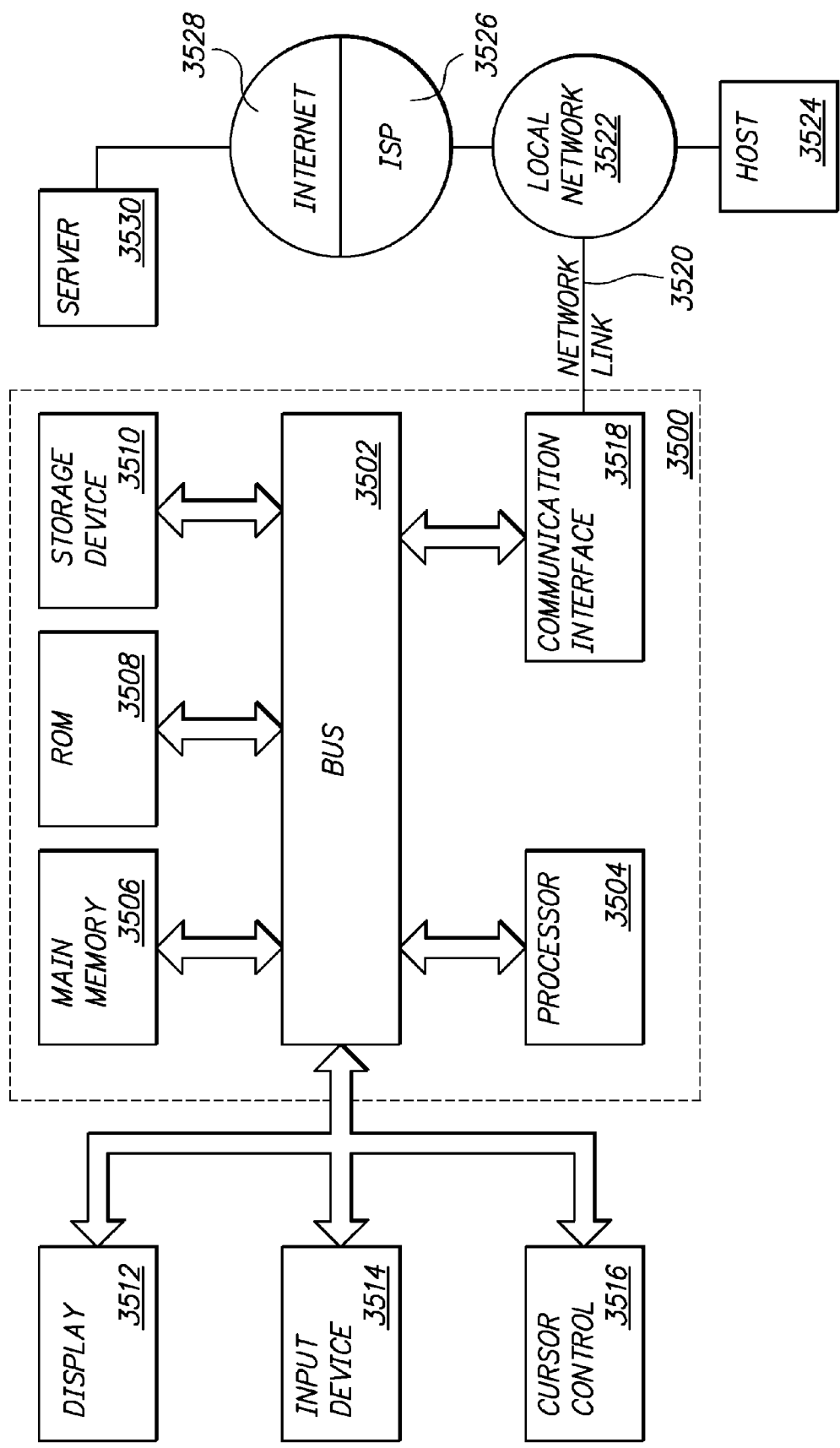
FIG. 35 is a block diagram that depicts a computer system upon which embodiments of the invention can be implemented.

Workstations 501, 502 are typically computer systems configured as illustrated by the computer system 3500 of FIG. 35, with one or more browsers, and are utilized, for example, by the engineers/developers to complete tasks associated with a product development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 501, 502 for accessing information to review and manage the progress of the project. The developers and managers transmit communications through the network 500 to the other connected components, e.g., Web servers 507, 530; databases 506, 536; and handheld device 520 and laptop 522, via access point(s) 524. The workstations 501 and 502, handheld devices 520, and laptop 522, which can access the Web pages from the Web servers 507 and 530, can process the JavaScript that the Web page contains to manage the editors in the browser. The browsers can process the JavaScript.

Web servers 507, 530 depict a typical Web server, which is a combination of computer hardware and software that, using the appropriate protocols (e.g., Hypertext Transfer Protocol [HTTP] and Transmission Control Protocol/Internet Protocol [TCP/IP]), serves the files that form Web pages (e.g., Hypertext Markup Language [HTML] or Extensible Markup Language [XML] files), to users, such as developers or managers at a workstation 501, 502. For a non-limiting example, an Apache Web server, which contains modules for the execution of PHP scripts, may be used as the Web server application for the Web server 507 and 530. In general, the majority of information exchanged and managed during the development project life cycle is served by the Web servers 507, 530 over the network 500. Furthermore, aspects of the techniques described herein may be implemented and executed on the Web servers 507, 530, although practice of the invention is not limited to such an implementation. The techniques could also be implemented on any other processing system, such as workstations 501, 502 or a similarly configured computer system as illustrated in FIG. 35.

Databases 506, 536 depict typical databases for storing data 508, 538 related to the development project, thus providing access to the information by authorized individuals at workstations 501, 502, through queries transmitted over the network 500. The type of data stored on databases 506, 536 is effectively limitless, wherein non-limiting examples include project initiation forms, member and project task schedules, specifications, software code, inspection reports, Web page files, and document directories and indexes.

Network 500 depicts a conventional network, e.g., a packet-switched network, for facilitating the exchange of information between and among various connected components, such as workstations 501, 502, Web servers 507, 530, and databases 506, 536. The network 500 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 500 may also be a Wide Area Network (WAN), such as the Internet, for facilitating communication with remote users through a Virtual Private Network (VPN), or the network 500 may represent a combination of a LAN and a WAN. In addition, network 500 can be formed using a variety of different mediums, including but not limited electrical wire or cable, optical, or wireless connections.

Figure 6:
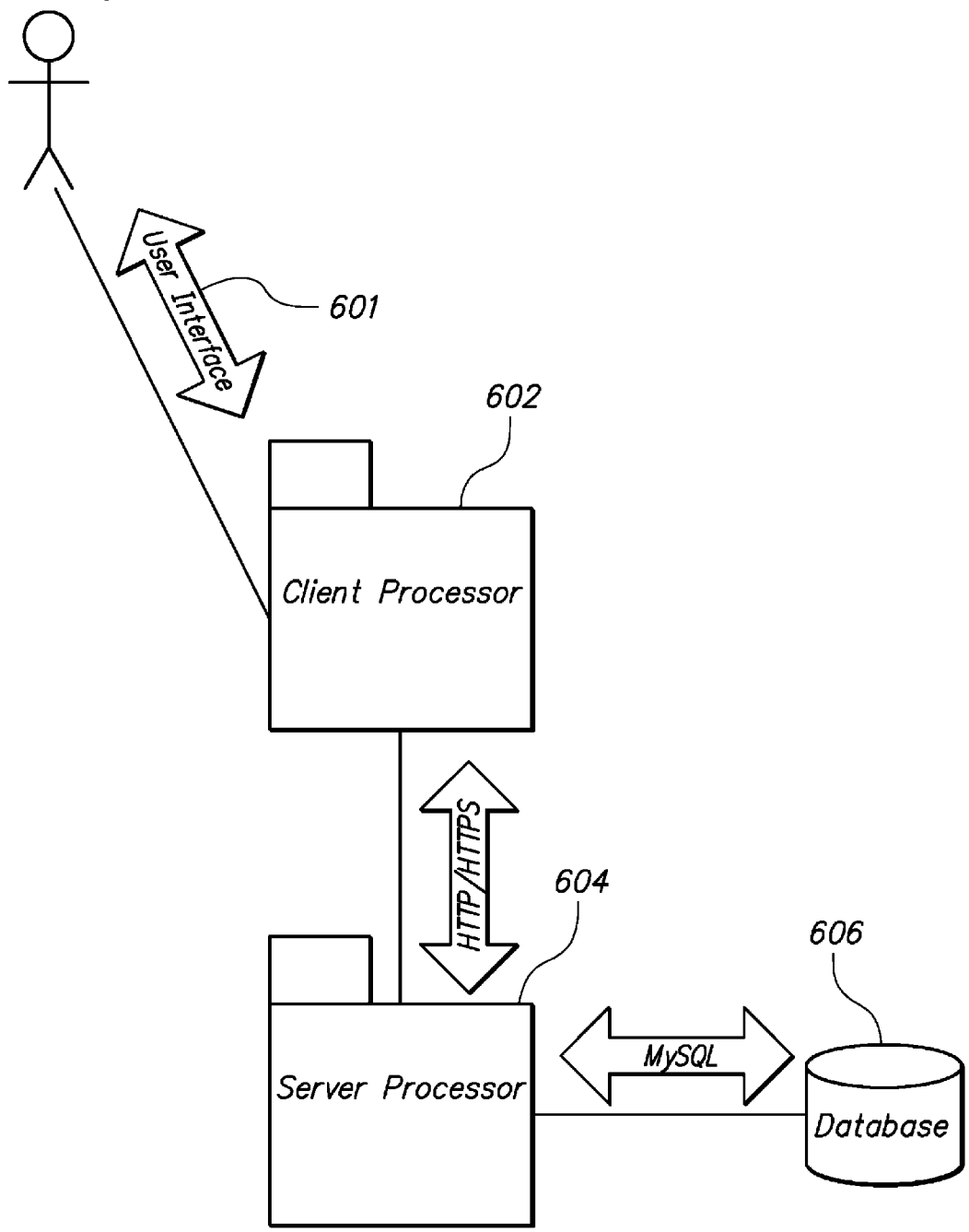
FIG. 6 is a diagram illustrating a communications architecture in which an embodiment of the invention may be implemented, including software components of an automated scheduling system.

FIG. 6 is a diagram illustrating a communications architecture in which an embodiment of the invention may be implemented, including software components of an automated scheduling system. The client processor 602 corresponds to a Web browser and the server processor 604 corresponds to a Web server, such as Web servers 507 and 530 (FIG. 5). A project member or manager interacts with the client processor 602 through a user interface 601. The client processor 602 manages and maintains the login Web page (FIG. 4) and the various editor Web pages (FIGS. 1A, 2A, 3A). The client processor 602 handles all events that occur in these Web pages. According to one embodiment, the client processor 602 interacts with the server processor 604 through the HTTP protocol. According to one embodiment, the client processor 602 interacts with the server processor 604 through the secure HTTPS protocol.

The server processor 604 provides information to the client processor 602 to display the login Web page (FIG. 4) and editor Web pages (FIGS. 1A, 2A, 3A). The server processor 604 also processes the information in the login and editor Web pages when the client processor 602 submits the information in these pages. The database 606 is a repository of project and task scheduling information. The server processor 604 interacts with the database 606 to obtain, add, or update information in the databases. According to one implementation, the server processor 604 interacts with the database 606. However, other databases and protocols can be used.

Client-Server Interfaces

Figure 7:
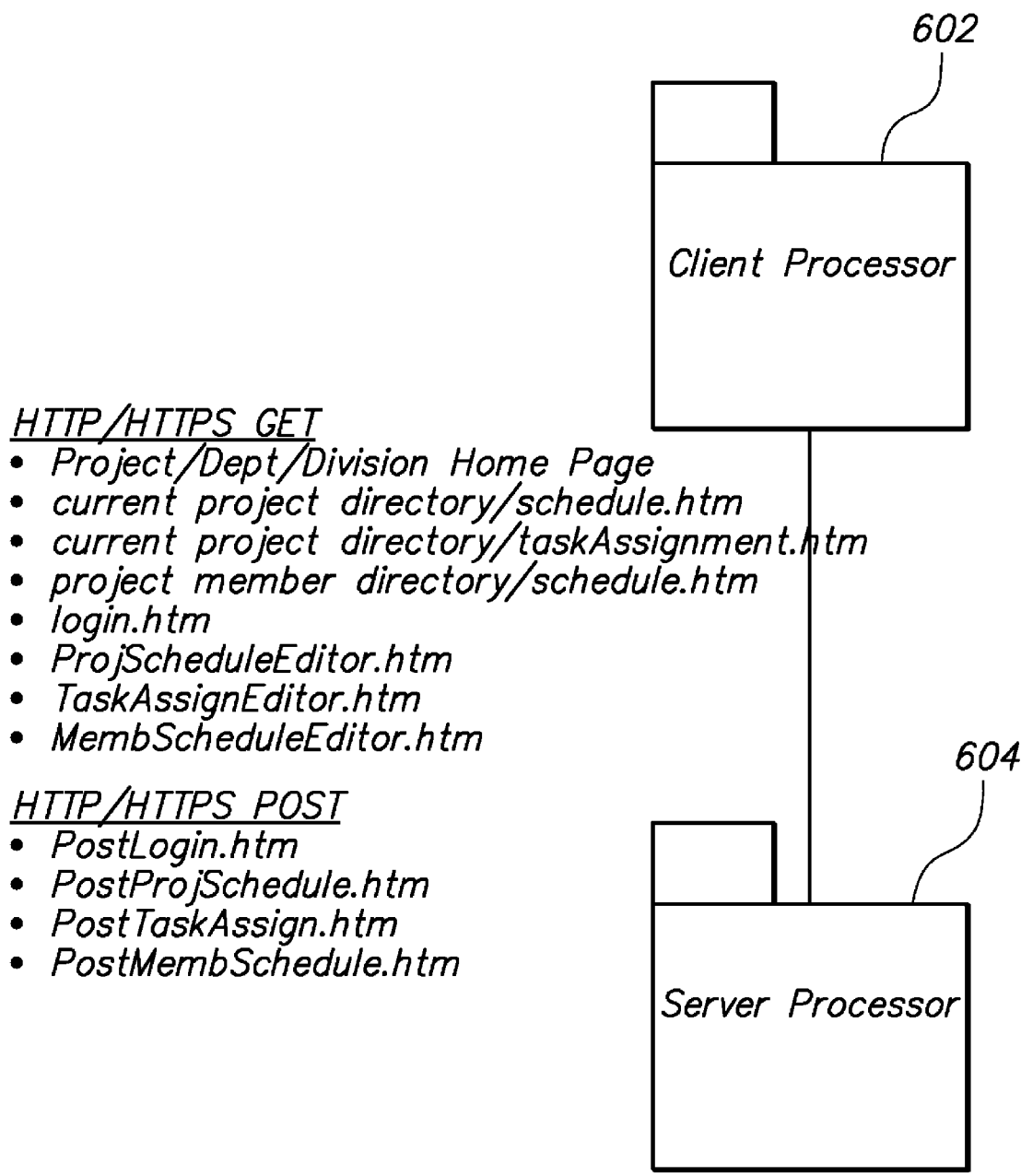
FIG. 7 is a diagram illustrating interfaces between the client processor and the server processor of the system.

FIG. 7 is a diagram illustrating interfaces between the client processor and the server processor of the system. The HTTP/HTTPS GET requests provide for the client processor 602 obtaining the home, login (FIG. 4), project schedule editor (FIG. 2A), member schedule editor (FIG. 3A), and task assignment editor (FIG. 1A) Web pages from the server processor 604. The HTTP/HTTPS POST requests provide for the client processor 602 submitting information entered in the login (FIG. 4) and editor Web pages (FIGS. 1A, 2A, 3A) to the server processor 604 for processing. The applicable HTTP/HTTPS GET and HTTP/HTTPS POST requests are described in greater detail hereafter.

HTTP/HTTPS GET Project/Dept/Division Home Page requests cause the server processor 604 to return to the client processor 602 a project home page associated with a department or division, respectively. The home page contains links (e.g., hyperlinks) for linking to and viewing the respective Web page for the schedules, task assignment, and login to the editors.

HTTP/HTTPS GET current project directory/schedule.htm requests cause the server processor 604 to return to the client processor 602 a Web page containing the project schedule for a current project, an example of which is depicted in FIG. 2B.

HTTP/HTTPS GET current project directory/taskAssignment.htm requests cause the server processor 604 to return to the client processor 602 a Web page containing the task assignments of project tasks for the current project, an example of which is depicted in FIG. 1B.

HTTP/HTTPS GET project member directory/schedule.htm requests causes the server processor 604 to return to the client processor 602 a Web page containing a project member's schedule for the current project, an example of which is depicted in FIG. 3B.

HTTP/HTTPS GET login.htm requests cause the server processor 604 to return to the client processor 602 a Web page that allows a project member or manager to log on to one of the editors (project schedule, member schedule, task assignment). The member or manager enters information about the project, member name, and editor session type. FIG. 4 depicts a Web page for logging into to one of the editors.

HTTP/HTTPS GET TaskAssignEditor.htm requests cause the server processor 604 to return to the client processor 602 a Web page for the task assignment editor, which is used to assign tasks to the project members for the current project. A project manager requires access privileges to assign tasks to the project members before the server processor 604 returns the task assignment editor Web page. This privilege is verified when the manager submits the information in the login Web page (FIG. 4). According to one embodiment, TaskAssignEditor.htm includes Javascripts to display, manage, and handle events in the task assignment editor. According to one embodiment, TaskAssignEditor.htm includes PHP scripts to obtain information from the databases 506, 536 and pass the information to the Javascripts so the information is displayed in the task assignment editor, an example of which is depicted in FIG. 1A.

HTTP/HTTPS GET ProjScheduleEditor.htm requests cause the server processor 604 to return to the client processor 602 a Web page for the project schedule editor, which is used to create or update the project schedule for the current project. A project manager must have access privileges to create the project schedule before the server processor 604 returns the project schedule editor. This privilege is verified when the manager submits the information in the login Web page (FIG. 4). According to one embodiment, ProjScheduleEditor.htm includes Javascripts to display, manage, and handle events in the project schedule editor Web page. According to one embodiment, ProjScheduleEditor.htm includes PHP scripts to obtain information from the databases 506, 536 and pass the information to the Javascripts so the information is displayed in the project schedule editor, an example of which is depicted in FIG. 2A.

HTTP/HTTPS GET MembScheduleEditor.htm requests cause the server processor 604 to return to the client processor 602 a Web page for the member schedule editor, which is used to create or update a project member's schedule for the current project. According to one embodiment, the schedule editor displays only uncompleted tasks if the project member's schedule has been previously created. A project member must have privileges to create or edit the schedule before the server processor 604 returns this Web page. This privilege is verified when the member submits the information in the login Web page (FIG. 4). According to one embodiment, MembScheduleEditor.htm includes Javascripts to display, manage, and handle events in the project member's schedule editor. According to one embodiment, MembScheduleEditor.htm includes PHP scripts to obtain information from the databases 506, 536 and pass the information to the Javascripts so the information is displayed in the member schedule editor, an example of which is depicted in FIG. 3A.

HTTP/HTTPS POST PostLogin.htm interface allow the client processor 602 to access and display the various editors (project schedule, member schedule, task assignment). This interface is called when the "Submit" button is selected from the Web page corresponding to login.htm. The information entered in login.htm is passed to PostLogin.htm in the server processor 604. The PostLogin.htm uses the information to validate the member for the project, and to determine if the member has access privileges to the requested editor. If the information is invalid or the member does not have access privilege to the editor, then PostLogin.htm returns a message to the client processor 602 that the project member cannot access the requested editor. Otherwise, PostLogin.htm returns the Web page corresponding to one of the editors, i.e., the Web browser is redirected to the Web page corresponding to the requested editor.

HTTP/HTTPS POST PostTaskAssign.htm allows the client processor 602 to submit all the information entered in the task assignment editor (FIG. 1A) to the server processor 604. This interface is called when the "Finish" button is selected from the Web page corresponding to TaskAssignEditor.htm. The information entered in the editor of TaskAssignEditor.htm is passed to PostTaskAssign.htm in the server processor 604. PostTaskAssign.htm adds and updates task assignment information in the appropriate database 506, 536. An appropriate message is displayed if any of the information entered is invalid or if the process fails to access or query the appropriate database. PostTaskAssign.htm also creates the task assignment Web page, an example of which is depicted in FIG. 1B.

HTTP/HTTPS POST PostProjSchedule.htm allows the client processor 602 to submit all the information entered in the project schedule editor (FIG. 2A) to the server processor 604. This interface is called when the "Finish" button is selected from the Web page corresponding to ProjScheduleEditor.htm. The information entered in the editor of ProjScheduleEditor.htm is passed to PostProjSchedule.htm in the server processor 604. PostProjSchedule.htm adds and updates task schedule information in the appropriate database 506, 536. An appropriate message is displayed if any of the information entered is invalid or if the process fails to access or query the appropriate database. PostProjSchedule.htm also creates the project schedule Web page, an example of which is depicted in FIG. 2B.

HTTP/HTTPS POST PostMembSchedule.htm allows the client processor 602 to submit all the information entered in the project member's schedule editor (FIG. 3A) to the server processor 604. This interface is called when the "Finish" button is selected from the Web page corresponding to MembScheduleEditor.htm. The information entered in the editor of MembScheduleEditor.htm is passed to PostMembSchedule.htm in the server processor 604. PostMembSchedule.htm adds and updates task schedule information in the appropriate database 506, 536. An appropriate message is displayed if any of the information entered is invalid or if the process fails to access or query the database. PostMembSchedule.htm also creates the member's schedule Web page, an example of which is depicted in FIG. 3B.

The Web pages for the various editors (TaskAssignEditor.htm, ProjScheduleEditor.htm, and MembScheduleEditor.htm) include files that contain Javascript or PHP script, according to one non-limiting embodiment. The scripting languages used to perform the various functions described herein may vary from implementation to implementation. When a Web browser (e.g., client processor 602) requests the Web page of an editor, the editor Web page and all the files corresponding to Javascript are passed to the Web browser, whereby the Web browser processes the Javascript. However, the files for the PHP script are not passed to the Web browser. The PHP script are processed in the Web server, such as Web servers 507, 530 of FIG. 5, where only what the PHP script writes onto the Web page is passed to the Web browser.

Figure 8:
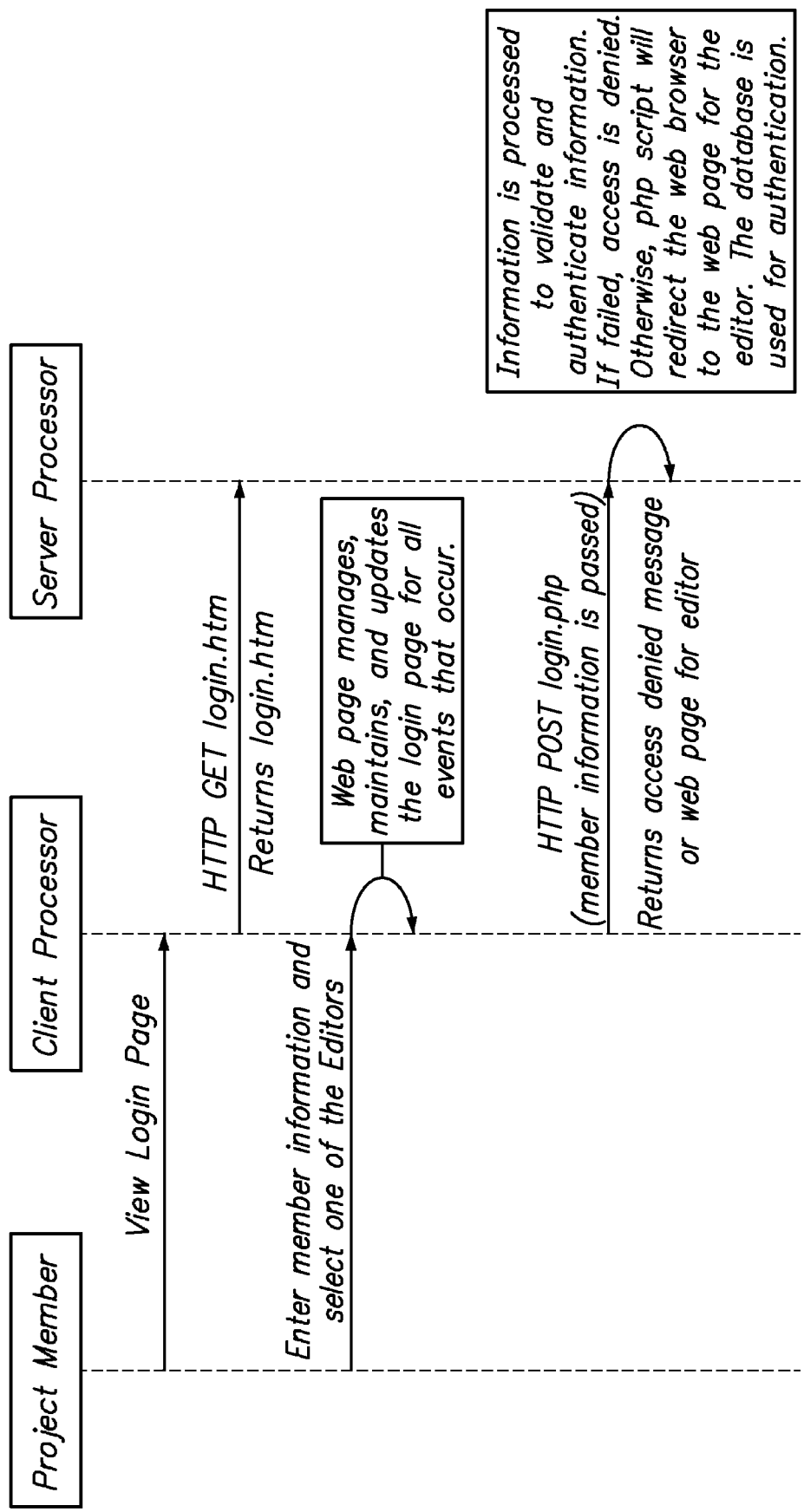
FIG. 8 depicts a sequence diagram for a project member or manager to log on to one of the editors using the login Web page.

FIG. 8 depicts a sequence diagram for a project member or manager to log on to one of the editors using the login Web page. The diagram depicts the information passed between the components of the system before the editor is displayed to the member or manager. Processing occurs within the client processor 602 to handle all the events that occur on the login Web page (FIG. 4). Processing occurs within the server processor 604 to validate the information entered in the login page and to verify the access privilege of the member for the editor. The server processor 604 obtains information from the appropriate database 506 or 536 for the verification of access privileges. Project members or managers perform this process before getting into any of the editors whose sequences are described in FIGS. 9-11.

Sequence Diagrams for Editors

Figure 9:
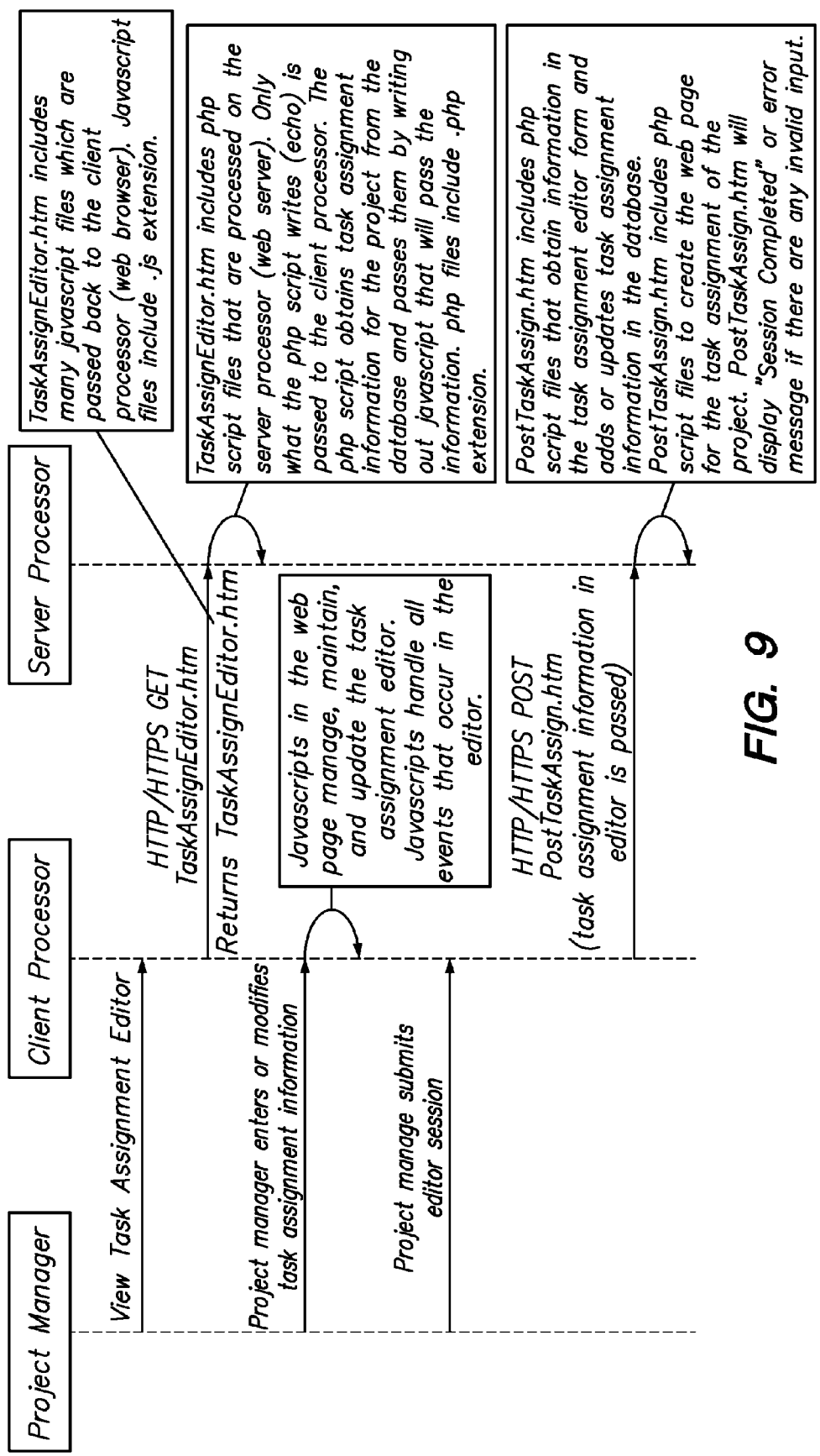
FIG. 9 depicts a sequence diagram for the project manager in a session with the task assignment editor.
Figure 10:
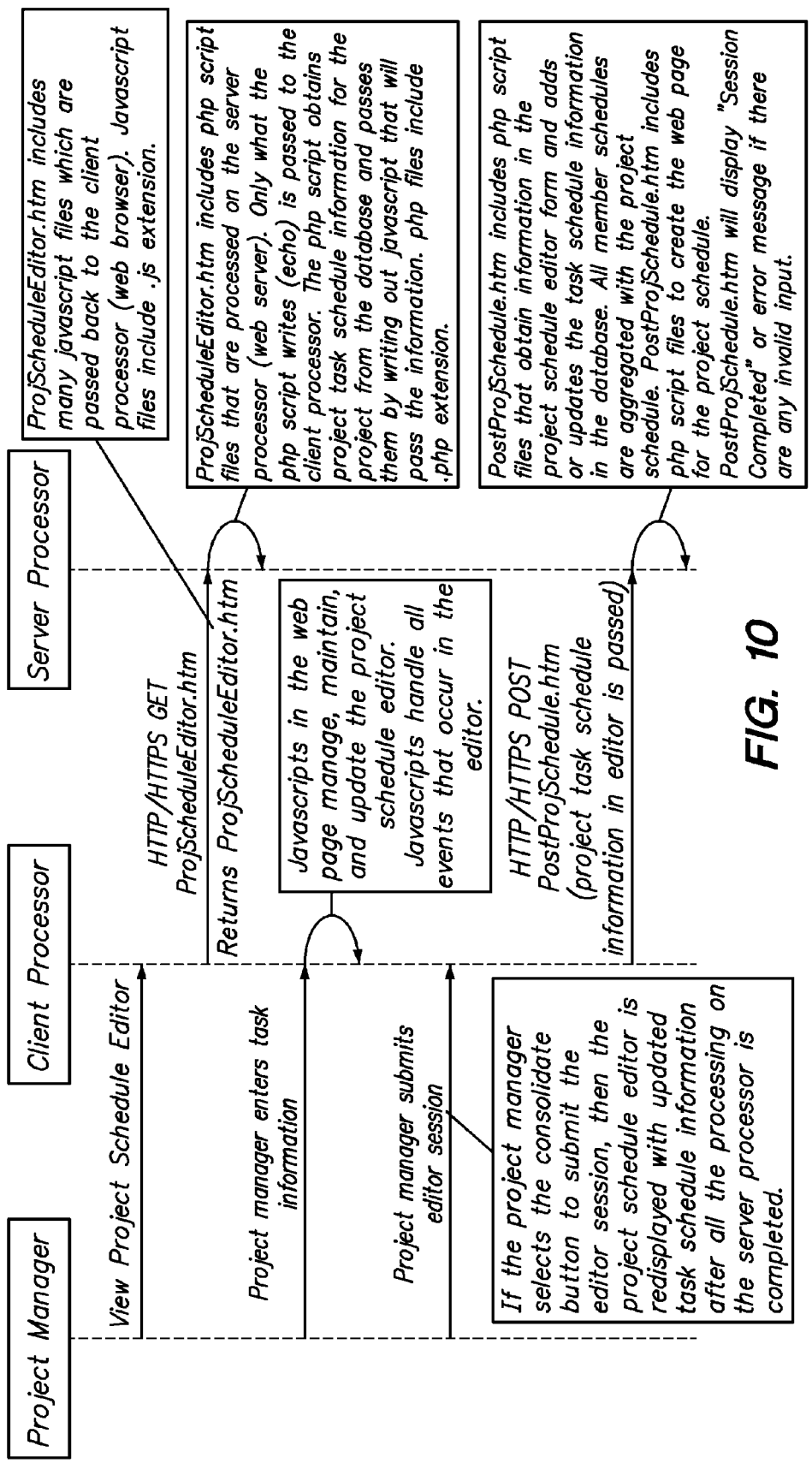
FIG. 10 depicts a sequence diagram for the project manager in a session with the project schedule editor.
Figure 11:
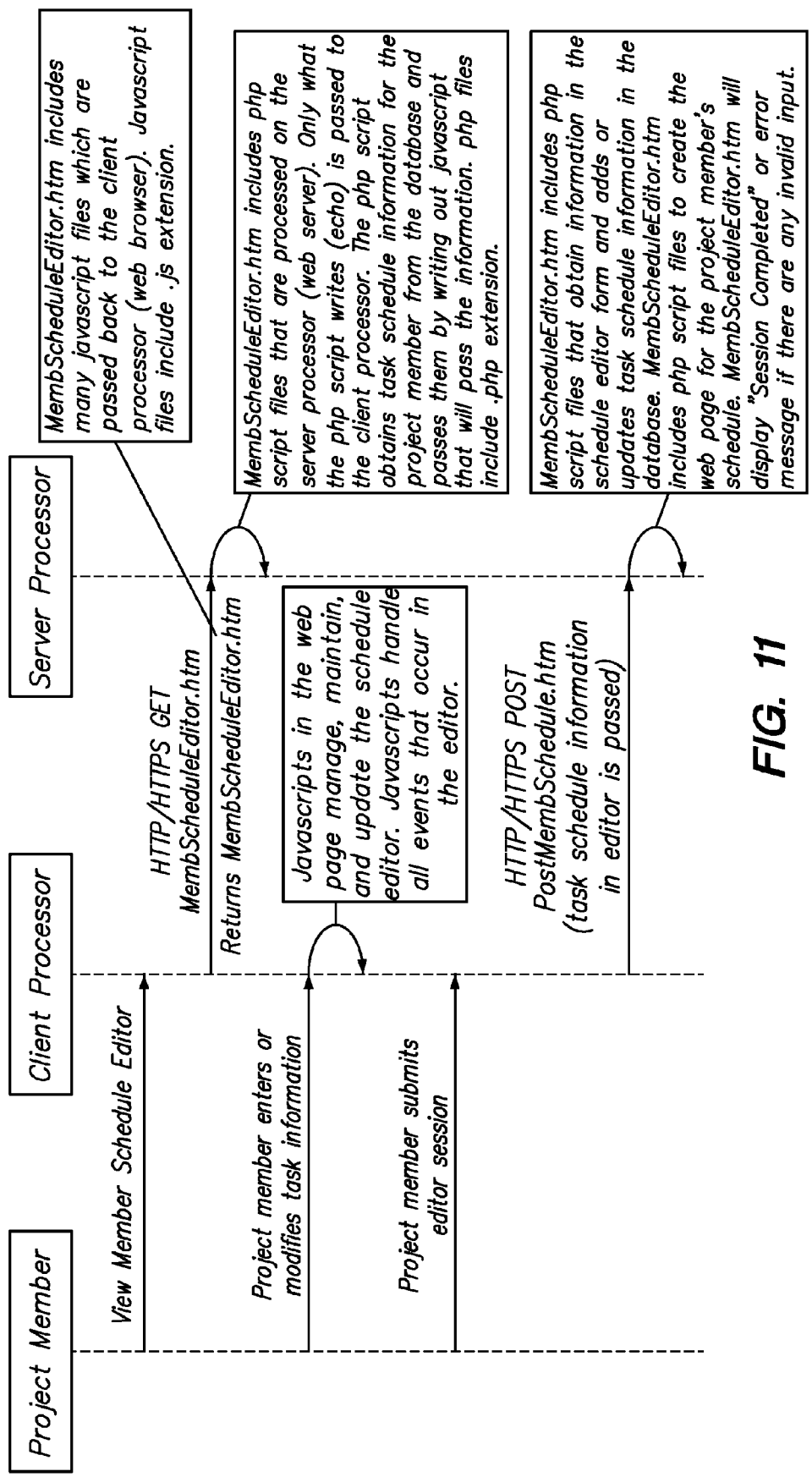
FIG. 11 depicts a sequence diagram for the project member in a session with the project member schedule editor (i.e., member schedule editor).

FIG. 9 (Task Assignment Editor), FIG. 10 (Project Schedule Editor) and FIG. 11 (Member Schedule Editor) depict the sequences for displaying the respective editors in the Web browser and for posting the information in the editors when a session is completed. All the editors follow a similar sequence. To obtain the initial display of an editor in the Web browser of the client processor, the appropriate task assignment/schedule information is obtained from the database in the server processor (using PHP script). The server processor will pass the Web page containing code (JavaScript) that the client processor can execute to manage and maintain the editor along with code that the server processor generates (using PHP script) that will display the initial editor in the client processor. The server processor will generate code to pass to the client processor the task assignment/schedule information the server processor obtained from the database.

FIG. 9 depicts a sequence diagram for the project manager in a session with the task assignment editor. When the client processor 602 requests TaskAssignEditor.htm, the file TaskAssignEditor.htm and all the included files containing Javascript (shown with js extension) are passed from the server processor 604 to the client processor 602. The included files containing PHP script (shown with .php extension) are processed in the server processor 604. The PHP script obtains task assignment information from the appropriate database 506 or 536 and writes Javascript into the Web page of TaskAssignEditor.htm, in order to pass the information to the client processor 602. The client processor 602 processes the Javascript in all the files it receives, in order to display the corresponding task assignment editor. All interactions between the project manager and the task assignment editor are handled by the Javascript to manage, maintain, and update the task assignment editor. When the project manager finishes the session (e.g., selects "Finish"), all task assignment information in the task assignment editor is passed from the client processor 602 to the server processor 604 through the interface PostTaskAssign.htm. The server processor 604 processes the information by adding or updating the information in the appropriate database. Using the task assignment information in the database, the server processor 604 automatically creates a Web page for the project task assignment, an example of which is depicted in FIG. 1B.

FIG. 10 depicts a sequence diagram for the project manager in a session with the project schedule editor. When the client processor 602 requests ProjScheduleEditor.htm, the file ProjScheduleEditor.htm and all the included files containing Javascript are passed from the server processor 604 to the client processor 602. The included files containing PHP script are processed in the server processor 604. The PHP script obtains project task schedule information from the appropriate database and writes Javascript into the Web page of ProjScheduleEditor.htm, in order to pass the information to the client processor 602. The client processor 602 processes the Javascript in the files it receives, in order to display the project schedule editor. All interactions between the project manager and the project schedule editor are handled by the Javascript, in order to manage, maintain, and update the editor. When the manager finishes the session (e.g., selects "Finish"), all project task schedule information in the project schedule editor is passed from the client processor 602 to the server processor 604 through the interface PostProjSchedule.htm. The server processor 604 processes the information by adding or updating the information in the appropriate database. The server processor 604 also automatically aggregates the project members' schedules with the project schedule and adds or updates the project schedule in the database. Using the project task schedule information in the database, the server processor 604 automatically creates a Web page for the project schedule, an example of which is depicted in FIG. 2B.

The behavior of the system in response to a selection of the "Consolidate" button is the same as for a selection of the "Finish" button. Both buttons cause (a) the addition and updating of the appropriate database with information from the project schedule editor, (b) the aggregation of the members' individual schedules with the project schedule, (c) the addition and updating of the project schedule in the database, and (d) the creation of the project schedule Web page. Further, "Consolidate" redisplays the project schedule editor with the updated project schedule by requesting ProjScheduleEditor.htm again.

FIG. 11 depicts a sequence diagram for the project member in a session with the project member schedule editor (i.e., member schedule editor). When the client processor 602 requests MembScheduleEditor.htm, the file MembScheduleEditor.htm and all the included files containing Javascript are passed from the server processor 604 to the client processor 602. The included files containing PHP script are processed in the server processor 604. The PHP script obtains member task schedule information from the appropriate database and writes Javascript into the Web page of MembScheduleEditor.htm, in order to pass the information to the client processor 602. The client processor 602 processes the Javascript in the files it receives, in order to display the member schedule editor. Interactions between the project member and the member schedule editor are handled by the Javascript, in order to manage, maintain, and update the member schedule editor. When the member finishes the session (e.g., selects "Finish"), member task schedule information in the member schedule editor is passed from the client processor 602 to the server processor 604 through the interface PostMembSchedule.htm. The server processor 604 processes the information by adding or updating the information in the appropriate database. Using the member task schedule information in the database, the server processor 604 automatically creates a Web page for the member schedule, an example of which is depicted in FIG. 3B.

Database Schema

Figure 12:
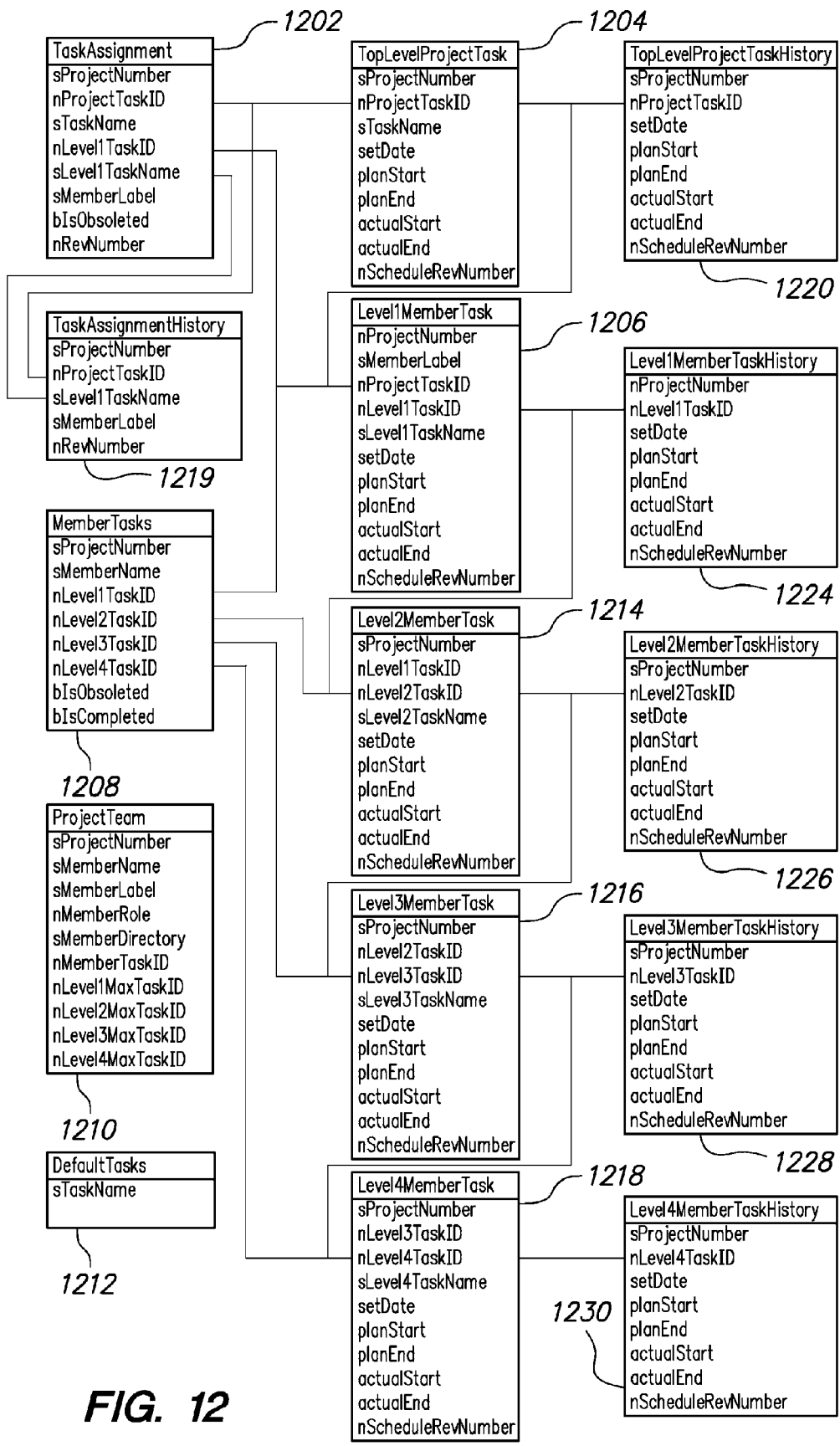
FIG. 12 depicts a schema of database tables used to store and manage task assignment and task schedule information for projects and project members.

FIG. 12 depicts a schema of database tables used to store and manage task assignment and task schedule information for projects and project members. The tables maintain information about the task assignments, the schedule for the project tasks, and the schedules for each project member. The tables are organized and linked such that the task assignments, project schedule, and members' schedule are all related.

The TaskAssignment table 1202 stores the project tasks and corresponding subtasks of a project along with the assignment of the subtasks to project members. The TaskAssignmentHistory table 1219 stores the history of the assignment of the subtasks to project members. The TopLevelProjectTask table 1204 stores the schedule of the project tasks that are in the TaskAssignment table 1202. The TopLevelProjectTaskHistory table 1220 stores the history of the schedule of the project tasks. The Level1MemberTask table 1206 stores the schedule of the member tasks which are assigned in the TaskAssignment table 1202 and links to the schedule of its corresponding project task in the TopLevelProjectTask table 1204. These links between the tables enable the automatic aggregation of the member schedules with the project schedule. The Level 1MemberTask table 1206 also stores the schedule of the member tasks that are not related to any project task. The Level1MemberTaskHistory table 1224 stores the history of the schedule of the member tasks. The LevelXMemberTask tables (where X is 1, 2, 3, and 4) and the MemberTasks table 1208 store and manage links between the various levels of tasks of a member. The lower level tasks are more detailed tasks of the upper level tasks. The organization of these tables maintains the schedule of a member. The LevelXMemberTaskHistory table (1226, 1228, and 1230) store the history of the schedule of the lower level tasks. The ProjectTeam table 1210 contains information about the project members. The project member information for a project member includes (a) a role, to determine access privileges to the various editors, (b) a directory for determining the location at which the member schedule Web page is stored, and (c) IDs used for determining the identifier of the member tasks at various levels.

The log in process uses information in the ProjectTeam table 1210 to determine access privileges to a requested editor before displaying the editor. The task assignment editor uses and/or updates information in the tables DefaultTasks 1212, TaskAssignment 1202, TaskAssignmentHistory 1219, TopLevelProjectTask 1204, and MemberTasks 1208. The project schedule editor uses and/or updates information in the tables DefaultTasks 1212, TaskAssignment 1202, TopLevelProjectTask 1204, TopLevelProjectTaskHistory 1220, MemberTasks 1208, and Level1MemberTask 1206. The member schedule editor uses and/or updates information in the tables ProjectTeam 1210, TaskAssignment 1202, TopLevelProjectTask 1204, MemberTasks 1208, LevelXMemberTask, and LevelXMemberTaskHistory.

Descriptions of the various tables depicted in FIG. 12, and used in an embodiment of the project schedule management system described herein, are as follows. However, the number and structure of the tables described in reference to FIG. 12 may vary from implementation to implementation.

DefaultTasks table 1212—this table contains the names of tasks that are typically tasks for all projects. In the context of software development projects, some examples of default tasks are Project Plans, Requirements, and Top Level Design.

ProjectTeam table 1210—this table contains information about project members for a project. sMemberLabel is a 2 to 4 character string used to identify a project member when displaying the project schedule, which depicts the project tasks and associated member tasks as depicted in FIGS. 1A and 1B. In one embodiment, the initials of the project member are used for sMemberLabel. nMemberRole is a number used for indicating the role of the project member. For example, project manager=1, project leader=2, project administrator=3, and project member=4. The role indicates who has access to the editors. For example, a project member whose role number is 1 has access to all the editors. However, a project member whose role number is 4 can only access the member's schedule editor. The system can be configured to determine which role numbers have access to the respective editors. sMemberDirectory is used to determine where the HTML file for the member schedule is stored so that the project team can view the member's schedule.

nMemberTaskID is a number assigned to a project member that is used to determine the ID of a task for that member. According to one embodiment, the nMemberTaskIDs are used as the start ID for a task. Depending upon the size of the project team, the ID can be MOD 10 (1, 2, . . . , 9) for a small team or MOD 100 (1, 2, . . . , 99) or higher for a large team. The task IDs are increments of the MOD. For example, if the nMemberTaskID of project member 'test1' is 1, then the task IDs of test1's task will be 11, 21, 31, and so forth (or 101, 201, 301, and so forth for a large team). The task ID uniquely identifies a task for a project member even if the name of some of the tasks are the same. The task ID also uniquely identifies a task at all levels. nLevelXMaxTaskID is a number used to maintain the highest task IDs that have been used so far for the different level tasks of a project member. These numbers provide the starting IDs used to determine the task IDs of tasks that are added in the member's schedule editor session. These values are retrieved and updated after each editor session. Except for the values for nLevelXMaxTaskID, the values for the other entries must be set prior to the beginning of a project.

TaskAssignment table 1202—this table contains information about the project tasks and its subtasks that are assigned to project members for a project. sTaskName is used for the names of the tasks and nProjectTaskID are the IDs associated with the tasks. The project start task ID is 0 so that the ID for its tasks will be increments of the MOD (10, 20, 30, . . . for small team). sLevel1TaskName is used for the names of the subtasks (member tasks) associated with the project tasks and nLevel1TaskID is used for the IDs associated with the subtasks. sMemberLabel is used to identify the project members that are assigned the subtasks. bIsObsoleted is used to indicate whether the task has been removed from the project. Even though a task is deleted from the schedule, information about the task is maintained in the database. Values for sTaskName, nProjectTaskID, sLevel1TaskName, and sMemberLabel can be added to the TaskAssignment table 1202 through a task assignment editor session. The project schedule editor session can add values for sTaskName and nProjectTaskID. Only the member schedule editor session can add values for nLevel1TaskID. nRevNumber is the revision number of the current assignment of the task. If no members are assigned to the task, nRevNumber is 0.

TopLevelProjectTask table 1204—this table contains information about the most current scheduling of project tasks. sTaskName is used for the names of the tasks and nProjectTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The most current revision number of a project task is maintained in the TopLevelProjectTask table 1204. The revision is incremented only when the planned dates are changed in the project schedule editor on different days. All values for nProjectTaskID, sTaskName, dates, and nScheduleRevNumber are added or updated in the TopLevelProjectTask table 1204 through a project schedule editor session or a task assignment editor session.

MemberTasks table 1208—this table contains information about all the tasks (tasks at all levels) for all the project members. Associated with each member (sMemberName) of a project are the task Ids, nLevelXTaskID, which identify all the tasks and their relationship with one another. As with the TaskAssignment table, bIsObsoleted indicates if the task has been removed from the project member's schedule. bIsCompleted indicates if the tasks is completed. nLevelXTaskID is used for the tasks which are added to the MemberTasks table 1208 and are determined from the nLevelXMaxTaskID of the ProjectTeam table 1210 when new tasks are added in the member's schedule editor session. Values in the table can be updated or modified (bIsObsoleted or bIsCompleted) from the results of any of the three editor sessions (member schedule, project schedule, task assignment). The MemberTasks table 1208 is important to provide a link between the lower level task schedules with the upper level task schedules.

LevelXMemberTask table (e.g., Level1MemberTask table 1206, Level2MemberTask table 1214, Level3MemberTask table 1216, Level4MemberTask table 1218)—this table contains information about the most current scheduling of member tasks. sLevelXTaskName is used for the name of the tasks and nLevelXTaskID is used for the IDs associated with the tasks. nLevelXTaskID for the tasks which are added to the table are determined from the nLevelXMaxTaskID of the ProjectTeam table 1210 when new tasks are added in the member's schedule editor session. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The most current revision number of a member task is maintained in the LevelXMemberTask table. According to one embodiment, the revision is incremented only when the planned dates are changed in the member schedule editor on different days. Each LevelXMemberTask table contains a task ID for upper level tasks (except for level 1, where a task either has a project task as its parent or no parent task). This provides for a task a link to its parent task and its child tasks. All values for parent task ID, sLevelXTaskName, nLevelXTaskID, dates, and nScheduleRevNumber are added or updated in the table through the member schedule editor session. Only Level1MemberTask table 1206 contains the sMemberLabel to provide a link to the TaskAssignment table 1202.

The database depicts only lower levels down to level 4. However, the database can be modified to include lower levels for greater details in the task schedule.

TaskAssignmentHistory table 1219—this table contains information about the history of the assignment to project members of tasks associated with project tasks. This table maintains information about the project members that were previously assigned the tasks before the tasks were reassigned to other project members. nProjectTaskID are the IDs associated with the tasks. sLevel1TaskName are the names of the subtasks (member tasks) associated with the project. sMemberLabel are the project members that are assigned the subtasks. nRevNumber is the revision numbers of the assignment of tasks to project members. The nRevNumber depicts the reassignment of the tasks in the project. The task assignment editor 102 (FIG. 1A) uses and/or updates information in the TaskAssignmentHistory table 1219.

The TopLevelProjectTaskHistory table 1222 contains information about the history of the schedule of project tasks. This table maintains all prior planned schedules of the project tasks. nProjectTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The more recent scheduling for a project task corresponds to the higher revision numbers. All previous scheduling of a project task are maintained in the TopLevelProjectTaskHistory table 1222 to track the changes in the project task's schedule. The TopLevelProjectTask table 1204 contains the current schedule of all the tasks in the TopLevelProjectTaskHistory table 1204.

LevelXMemberTaskHistory tables (e.g., Level1MemberTaskHistory table 1224, Level2MemberTaskHistory table 1226, Level3MemberTaskHistory table 1228, Level4MemberTaskHistory table 1230) contain information about the history of the schedule of member tasks. These tables maintain all prior planned schedules of the member tasks. nLevelXTaskID is used for the IDs associated with the tasks. planStart and planEnd are used for the expected dates for starting and completing the task. actualStart and actualEnd are used for the actual dates in which the task was started and completed. setDate is used for the date in which the task was added, planned dates were set, or planned dates were modified. If no planned dates are set for the task, then the revision number is 0. nScheduleRevNumber is used for the revision number of the task schedule. The more recent scheduling for a member task corresponds to the higher revision numbers. All previous scheduling of a member task are maintained in the LevelXMemberTaskHistory tables to track the changes in the member task's schedule. The LevelXMemberTask tables contain the current schedule of all the tasks in the LevelXMemberTaskHistory tables.

Programming Package Diagrams for the Server

Figure 13:
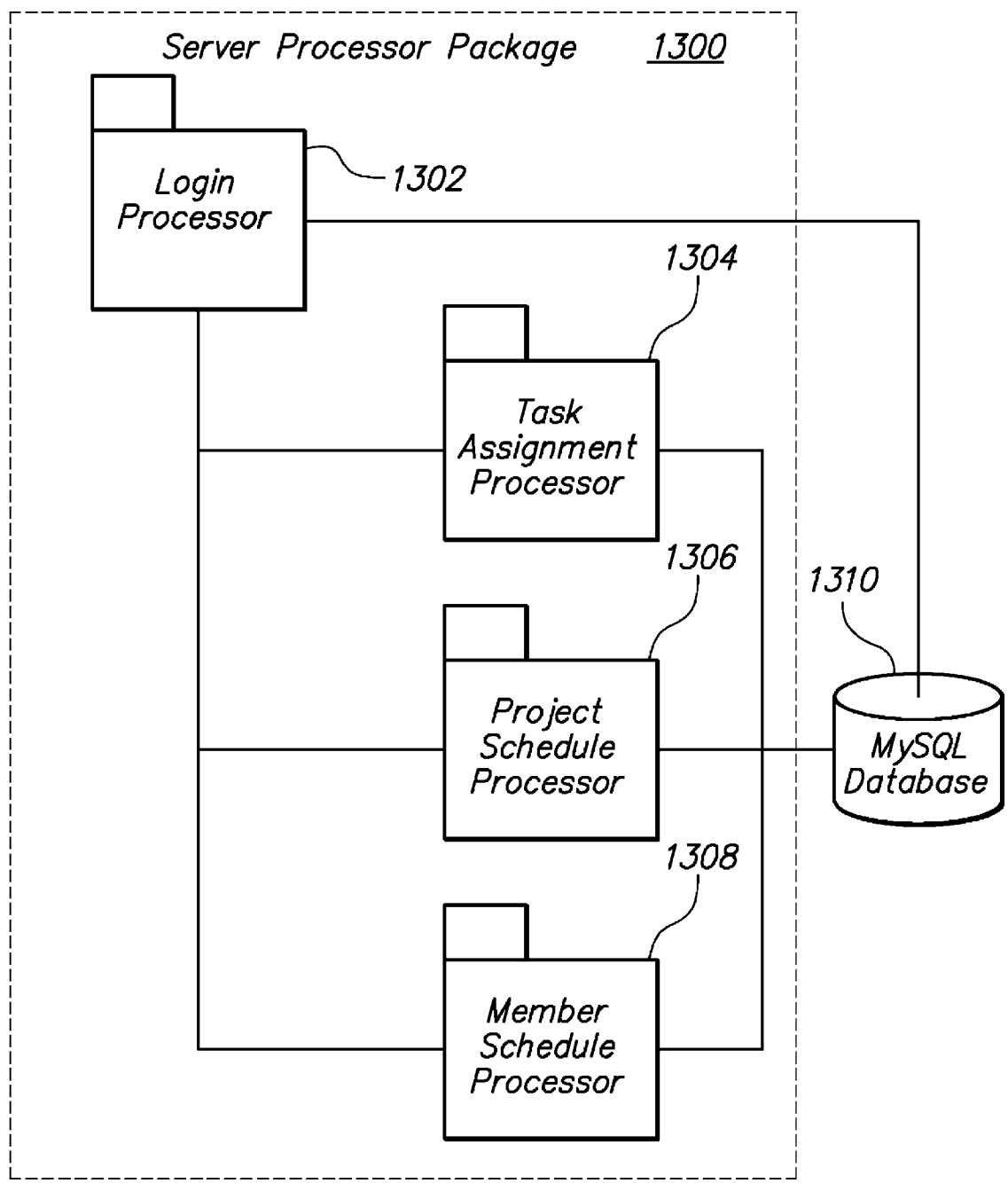
FIG. 13 is a diagram illustrating a programming package diagram of the server processor of FIG. 6.

FIG. 13 is a diagram illustrating a programming package diagram of the server processor 604 of FIG. 6. The server processor package 1300 contains four packages, whereby each package corresponds to a Web page/editor that is displayed to the user on the client processor 602 and through which the information entered by the user is processed when the user completes the login or editor session.

The LoginProcessor 1302 package provides the Web page to display the form that allows a project member to log in to one of the editors. When the member submits the form, the LoginProcessor 1302 package processes the information entered by the member to validate the information. If the information is valid and if the member has the appropriate access privilege, the LoginProcessor 1302 package redirects the system to one of the packages corresponding to the editors.

The TaskAssignmentProcessor 1304 package provides the Web page to display the task assignment editor 102 (FIG. 1A), which is used to add or modify the assignment of project tasks to project members. When the task assignment editor 102 is submitted, the TaskAssignmentProcessor 1304 package processes and stores the information from the task assignment editor 102 and creates the Web page for the latest task assignment.

The ProjectScheduleProcessor 1306 package provides the Web page to display the project schedule editor 202 (FIG. 2A), which is used to add or modify the schedule of project tasks. When the project schedule editor 202 is submitted, the ProjectScheduleProcessor 1306 package processes and stores the information from the project schedule editor 202 and creates the Web page for the latest project schedule.

The MemberScheduleProcessor 1308 package provides the Web page to display the member schedule editor 302 (FIG. 3A), which is used to add or modify the schedule of member tasks. When the member schedule editor 302 is submitted, the MemberScheduleProcessor 1308 package processes and stores the information from the member schedule editor 302 and creates the Web page for the latest member schedule.

Except for the redirection of the LoginProcessor 1302 package to the editor packages, the processor packages are independent of each other and, generally, there is no interaction between the editor packages. Each of the processor packages 1302-1308 interacts with a database 1310 (e.g., databases 506, 536 of FIG. 5) to obtain, add, or update information. The Login Processor 1302 package accesses the database 1310 to determine if the member has access privileges. Each of the other processor packages 1304-1308 accesses the database 1310 to obtain task information to display in the corresponding editors and in the corresponding Web page it generates, and to add or update corresponding task information. For a non-limiting example, the database 1310 may be implemented using MySQL; however, the database 1310 is not limited to implementation using MySQL.

According to an embodiment, each of the editor processor 1304-1308 packages comprises PHP script files, JavaScript files, and HTML files. The PHP script files obtain project and task information from the database 1310 and generate the JavaScript that displays the editor on the client processor 602 (FIG. 6). This allows the PHP script to interface with the JavaScript. JavaScript will create the editor and manage all the interactions between the editor and a project member. When the editor is submitted, the PHP script files process the information in the editors, and add or update the information in the database 1310, and create the Web page corresponding to the editor.

Figure 14:
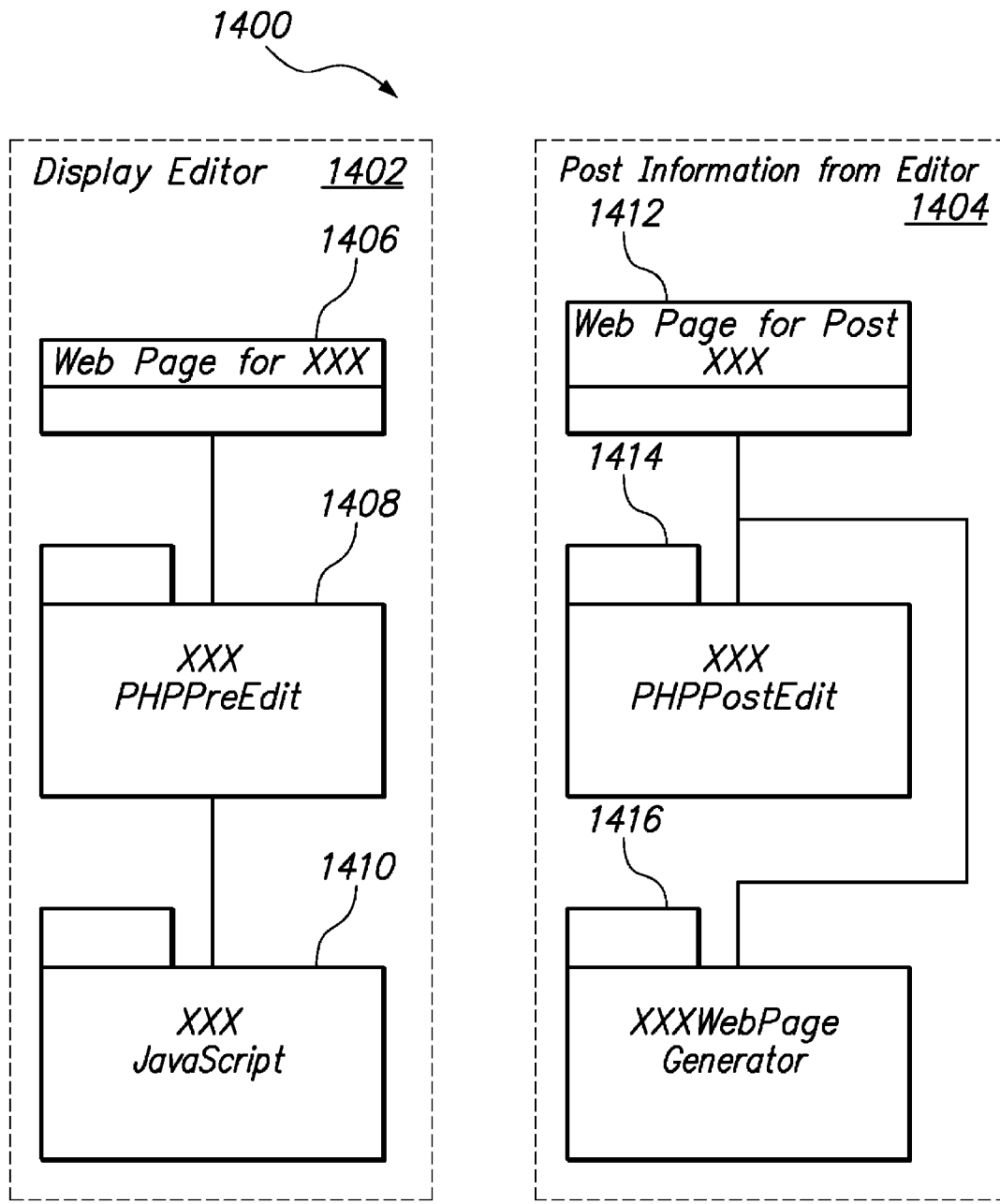
FIG. 14 is a diagram illustrating a programming package diagram of the editor processor packages.

FIG. 14 is a diagram illustrating a programming package diagram of the editor processor 1304-1308 packages. According to an embodiment, the TaskAssignmentProcessor 1304, ProjectScheduleProcessor 1306, and MemberScheduleProcessor 1308 package all use this package diagram illustrated in FIG. 14. The package is divided into two major parts, the display editor 1402 being responsible for the display and management of the editor and the post information from editor 1404 being responsible for posting information in the editor and generating the Web page.

The Web Page for XXX 1406 (where "XXX" refers to either TaskAssignment, ProjectSchedule, or MemberSchedule) integrates the following packages to display the editor. The Web page 1406 includes all the PHP script files of a XXXPHPPreEdit 1408 package and all the javascript files of a XXXJavaScript 1410 package to display and manage the editor. All the PHP script files are processed on the Web server (e.g., Web server 507, 530 of FIG. 5) to obtain the task information from the database, and generate the Javascript that will interface with the XXXJavaScript 1410 package. All the Javascript is executed in the Web browser of the client processor 602 (FIG. 6) to provide for the initial display of the editor. All the JavaScript files are passed to the Web browser of the client processor 602 to manage the editor, i.e., to handle all corresponding editing events.

The Web Page for PostXXX 1412 integrates the following packages that post the information and generate the post Web page. The Web Page for PostXXX 1412 includes all the PHP script files of XXXPHPPostEdit 1414 package to post the information from the editor and all the PHP script files of XXXWebPageGenerator 1416 package to create the Web page. The XXXPHPPostEdit 1414 package obtains all the task information from the editor and adds or updates the task information in the database. The XXXWebPageGenerator 1416 package obtains task information from the database to generate the appropriate Web page.

Each of the packages of FIG. 14 provides a class that provides the interface for the package and manages the classes within the package. This allows the design within the package to be easily changed without affecting the other packages.

Member Schedule Processor Package

FIGS. 15 through 18 illustrate the class diagrams of the packages of FIG. 14 corresponding to the MemberScheduleProcessor 1308 package of FIG. 13, corresponding to the member schedule editor 302 (FIG. 3). These figures depict the class design corresponding to the four packages of the display editor 1402 and the post information from editor 1404. The XXXPHPPreEdit 1408 (FIG. 14) package obtains task assignment/schedule information from the database and generates the code for the initial display of the editor in the server processor 604 (FIG. 6). The XXXJavaScript 1410 (FIG. 14) package displays, manages, and maintains the editor in client processor 602 (FIG. 6). The XXXPHPPostEdit 1414 (FIG. 14) package post all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate Web page that will display the task information. These figures depict the similarity in the design of the four packages among the three editors. Although the editors perform different tasks, the editors all follow a similar design pattern.

Figure 15:
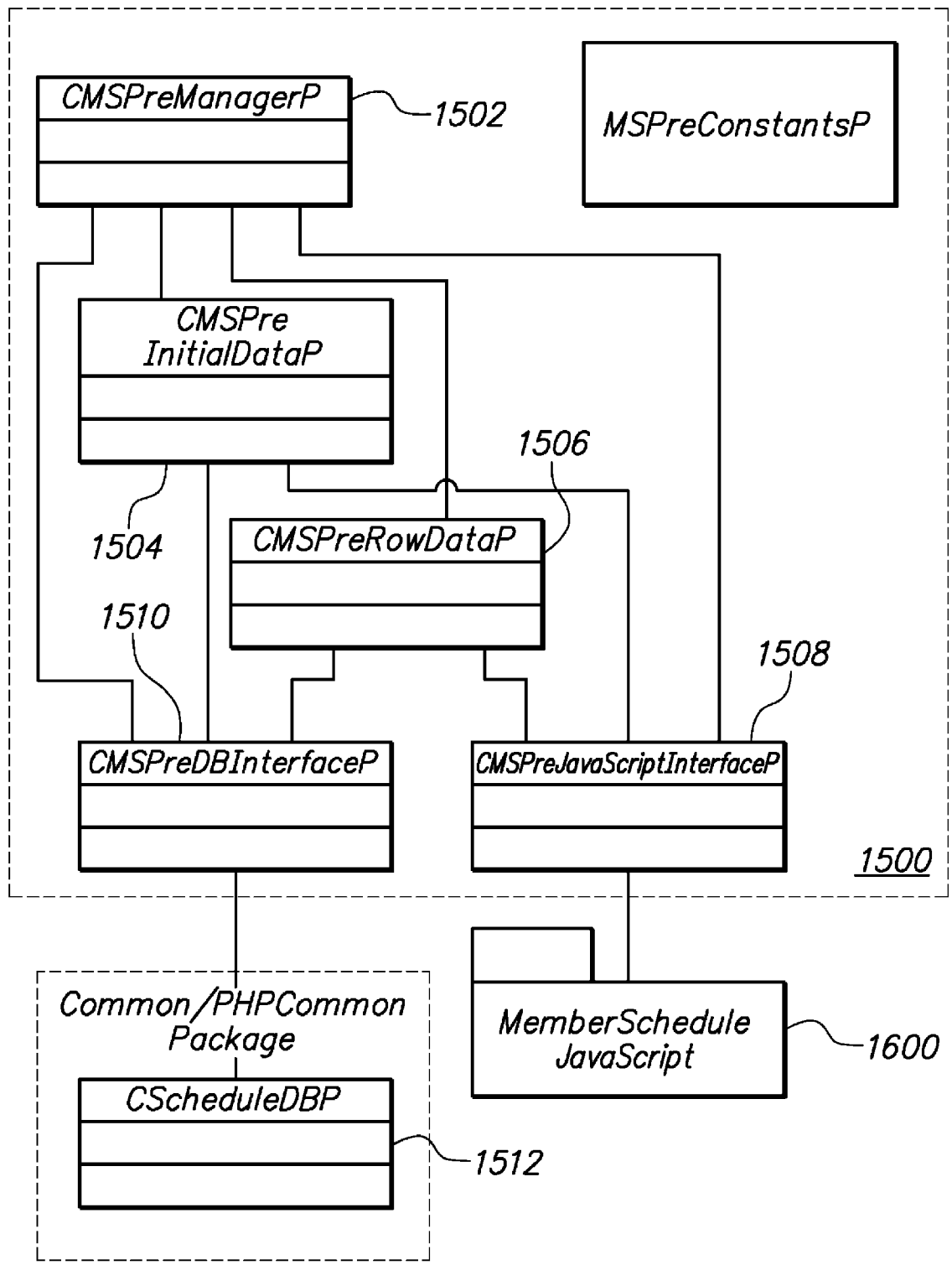
FIG. 15 depicts a class diagram of the MemberSchedulePHPPreEdit package.

FIG. 15 depicts a class diagram of the MemberSchedulePHPPreEdit package 1500 (e.g., XXXPHPPreEdit 1408 of FIG. 14). The MemberSchedulePHPPreEdit package 1500 generates the Javascript interface that will display the initial member schedule editor 302 (FIG. 3A) in the Web browser of the client processor 602 (FIG. 6).

The CMSPreManagerP 1502 class provides an interface for the MemberSchedulePHPPreEdit package 1500 and manages the classes in the MemberSchedulePHPPreEdit package 1500 to generate the Javascript. The CMSPreInitialDataP 1504 class generates the Javascript for setting the initial data in the editor. The initial data is the member tasks that are assigned to the project member, which the member can add to their schedule. The CMSPreRowDataP 1506 class generates the Javascript for displaying rows of member tasks that have been added to the member's schedule in previous editor sessions. The CMSPreJavaScriptInterfaceP 1508 class generates the sequence of Javascript that creates the initial editor in the Web browser and will interface with the MemberScheduleJavaScript 1600 package of FIG. 16. The CMSPreDBInterfaceP 1510 class accesses information from the database that will be displayed in the editor. CMSPreDBInterfaceP 1510 generates the appropriate database queries to obtain the desired information for display. CMSPreDBInterfaceP 1510 interfaces with CScheduleDBP 1512 to access the database. CMSPreInitialDataP 1504 and CMSPreRowDataP 1506 obtain task information from the database through CMSPreDBInterfaceP 1510. According to one embodiment, the foregoing classes for MemberSchedulePHPPreEdit package are implemented in PHP script.

Figure 16:
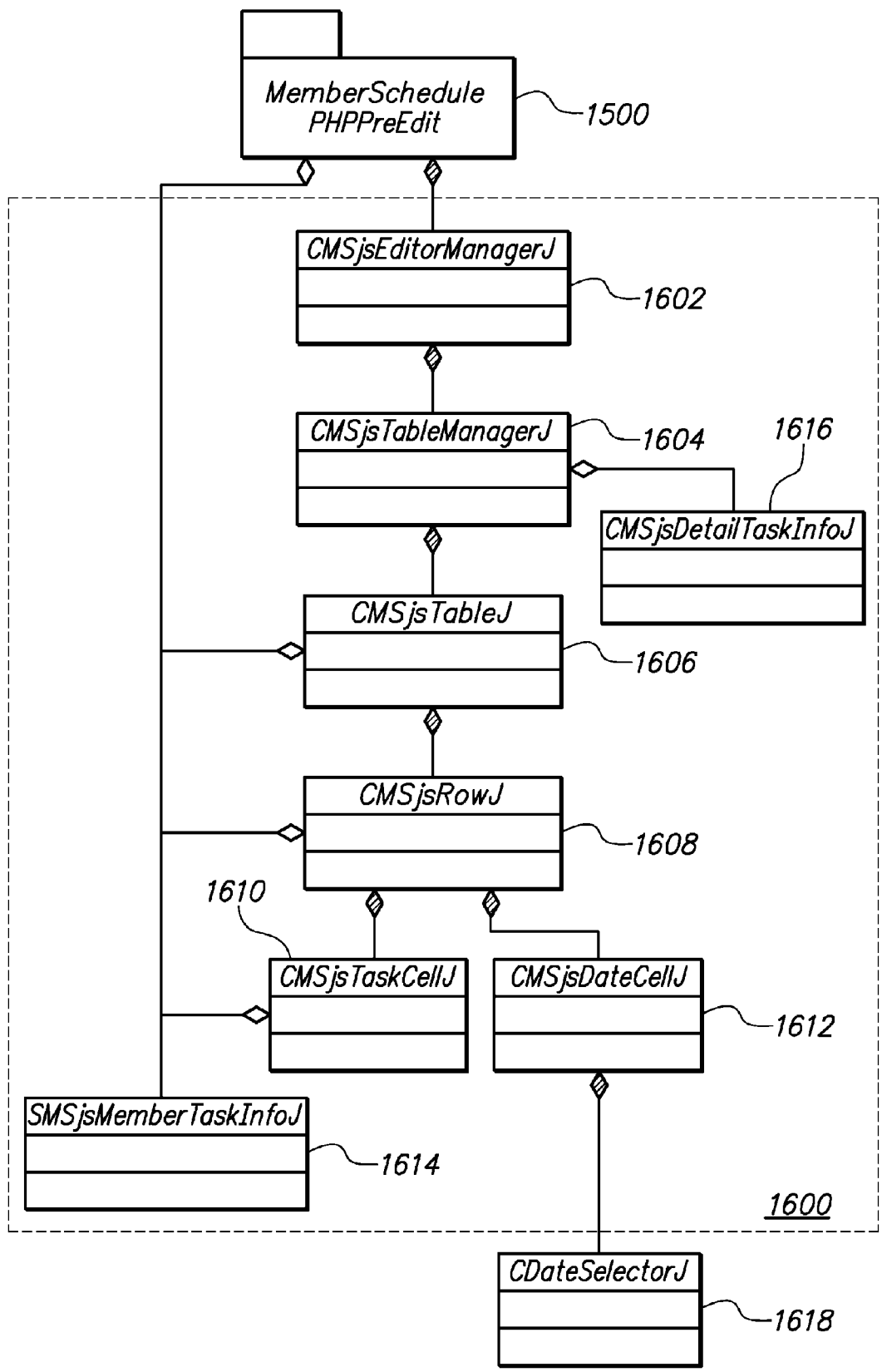
FIG. 16 depicts a class diagram of the MemberScheduleJavaScript package.

FIG. 16 depicts a class diagram of the MemberScheduleJavaScript package 1600 (e.g., XXXJavaScript 1410 of FIG. 14). The MemberScheduleJavaScript package 1600 manages the member schedule editor 302 (FIG. 3A) in the Web browser of the client processor 602 (FIG. 6).

The CMSjsEditorManagerJ 1602 class provides the interface for this package and creates the Web page and form for the member schedule editor 302. The CMSjsTableManagerJ 1604 class creates the table for the member schedule editor 302 and manages all events that affect the table. The CMSjsTableJ 1606 class initializes and manages the table for the member schedule editor 302 and creates and manages the rows of the table. The CMSjsRowJ 1608 class initializes and manages a row of the table for the member schedule editor 302, manages all events that affect the row, and creates and manages the cells in the row. The CMSjsTaskCellJ 1610 class initializes and manages the task cell of a row and maintains information about a task. The CMSjsDateCellJ 1612 class initializes and manages the date cell of a row and maintains information about the schedule of a task. The structure SMSjsMemberTaskInfoJ 1614 allows member task information to be passed from the MemberSchedulePHPPreEdit 1500 package to the MemberScheduleJavaScript 1600 package to display the tasks in the editor. The CMSjsDetailTaskInfoJ 1616 class stores and maintains information about the detailed tasks of a task and is used to update the schedule of a task with its subtasks. CMSjsDateCellJ 1612 contains CDateSelectorJ 1618 to display month, day, and year menu selections in the date cells. According to one embodiment, all the foregoing classes and structures of the MemberScheduleJavaScript 1600 package are implemented in Javascript.

Figure 17:
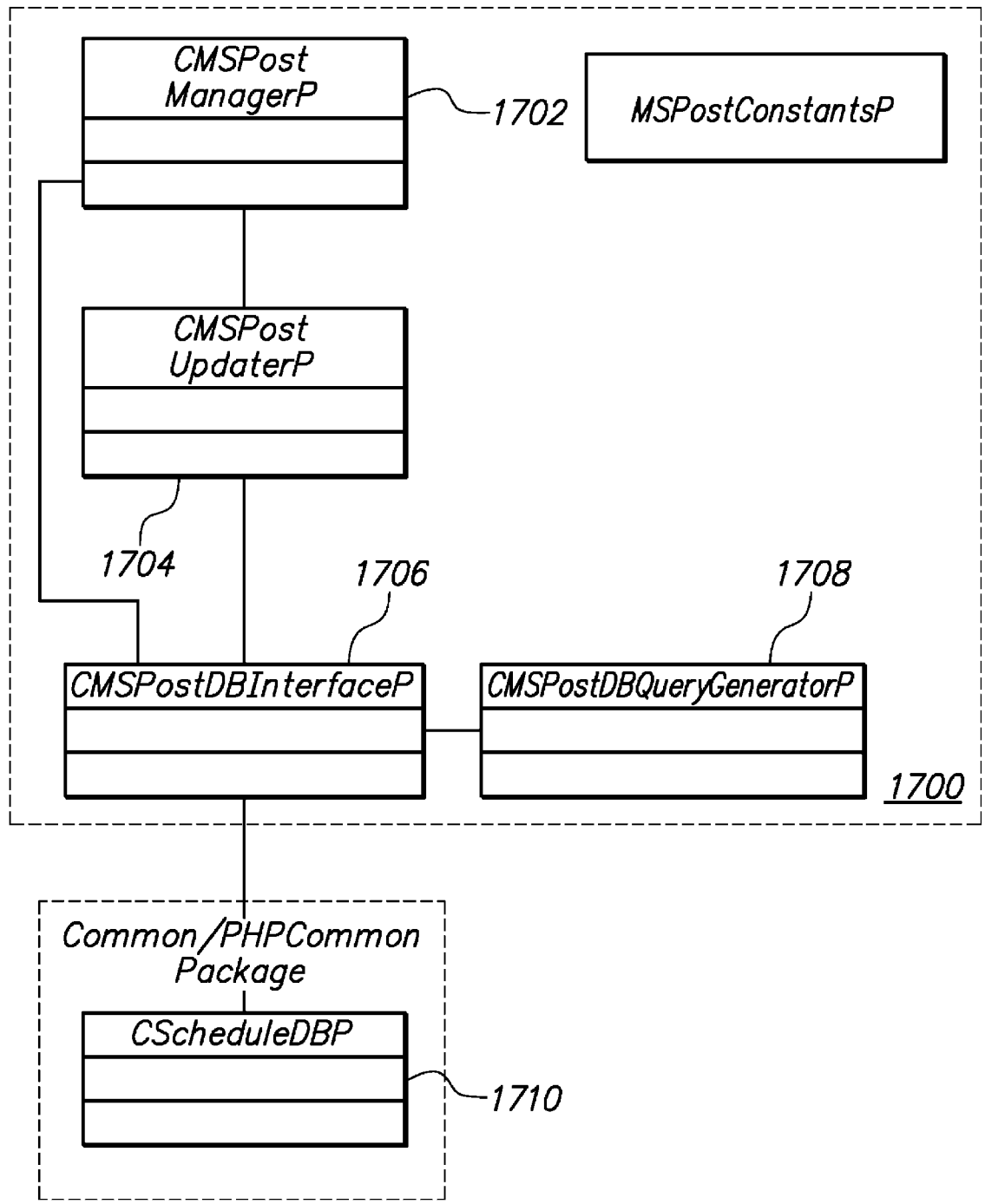
FIG. 17 depicts a class diagram of the MemberSchedulePHPPostEdit package.

FIG. 17 depicts a class diagram of the MemberSchedulePHPPostEdit package 1700 (e.g., XXXPHPPostEdit 1414 of FIG. 14). The CMSPostManagerP 1702 class provides the interface for this package and manages all other classes in the package. CMSPostManagerP 1702 determines the actions to perform on each task from the editor. The CMSPostUpdaterP 1704 class updates the schedule of a task in the database. The updates include editing the plan dates, updating the actual dates, obsoleting a task, and adding a new task. The class CMSPostDBInterfaceP 1706 provides an interface for the classes to obtain information and update information in the database. The CMSPostDBQueryGeneratorP 1708 class creates the SQL database queries for CMSPostDBInterfaceP 1706. CMSPostDBInterfaceP 1706 interfaces with the CScheduleDBP 1710 to access the database. CMSPostUpdaterP 1704 updates task information in the database through CMSPostDBInterfaceP 1706. According to an embodiment, the foregoing classes of the MemberSchedulePHPPostEdit package 1700 are implemented in PHP script.

Figure 18:
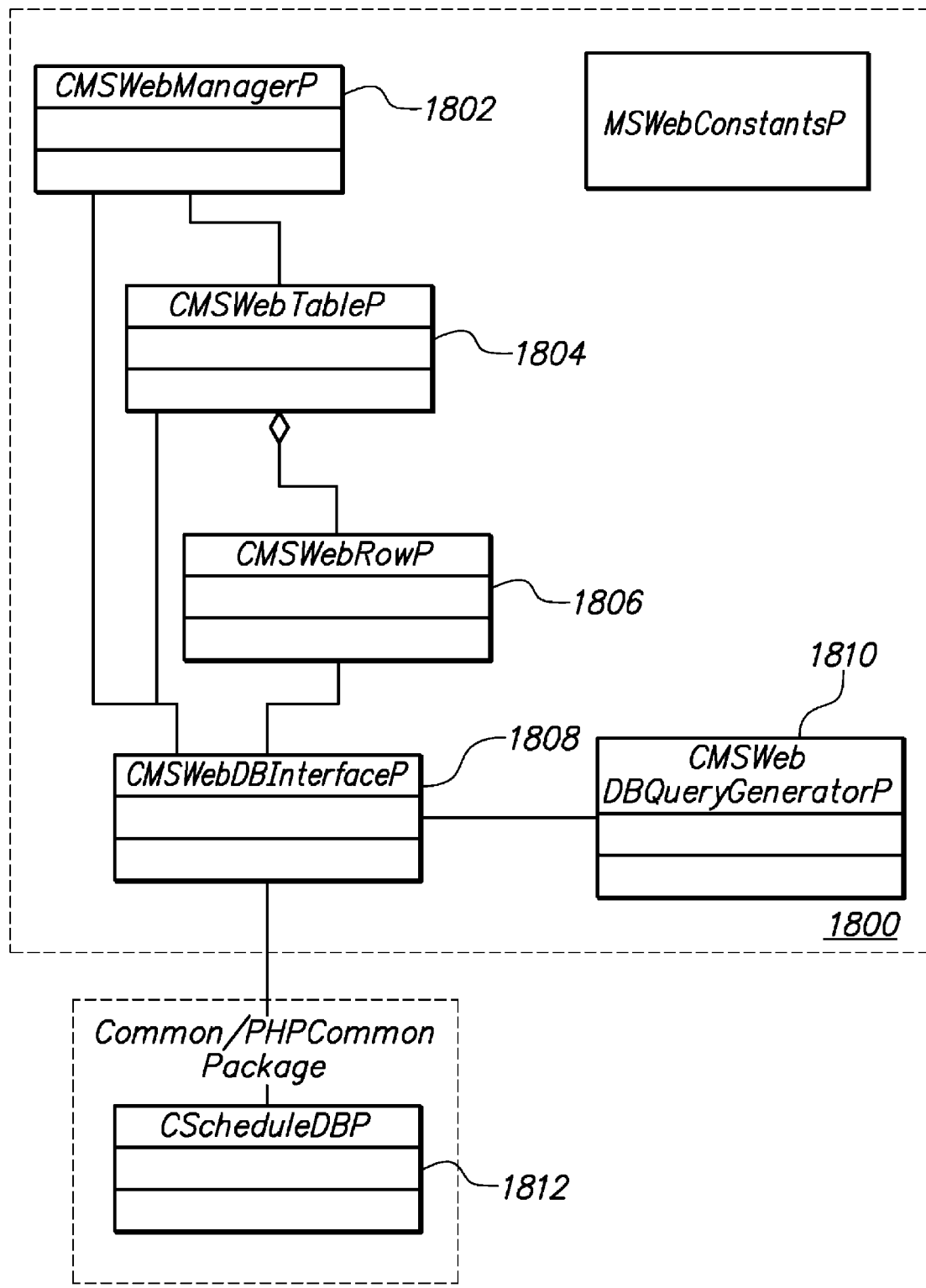
FIG. 18 depicts a class diagram of the MemberScheduleWebPageGenerator package.

FIG. 18 depicts a class diagram of the MemberScheduleWebPageGenerator package 1800 (e.g., XXXWebPageGenerator 1416 of FIG. 14). The CMSWebManagerP 1802 class provides the interface for this package to generate the member schedule Web page. CMSWebTableP 1804 creates the table for the member schedule Web page. The CMSWebRowP 1806 creates the task rows within the table. The class CMSWebDBInterfaceP 1808 provides an interface for the classes to obtain information in the database. The class CMSWebDBQueryGeneratorP 1810 creates the SQL database queries for CMSWebDBInterfaceP 1808. CMSWebDBInterfaceP 1808 interfaces with the CScheduleDBP 1812 to access the database. CMSWebTableP 1804 and CMSWebRowP 1806 obtain task information from the database through CMSWebDBInterfaceP 1808. According to an embodiment, the foregoing classes of the MemberScheduleWebPageGenerator 1800 package are implemented in PHP script.

Table 1 depicts a document object model representation of the member schedule editor 302 (FIG. 3). Table 1 describes the elements that make up the member schedule editor 302 and corresponding element names and id properties. Some of the elements correspond to parts of the editor that are displayed in the editor such as the table element, row element, cell element, checkbox input element, input text element, and select element. Some of the elements are used to store rather than display information such as the hidden input elements. The elements that store information or receive information from the user are important for passing information to the server processor to post task information from the editor session. The Document Object Model (DOM) is described in "JavaScript: the Definitive Guide", Fourth Edition, by David Flanagan and published by O'Reilly & Associates, Inc., the content of which is incorporated by reference in its entirety for all purposes as if fully set forth herein.

Each element constituent to an editor can be accessed through its id and the properties of the elements can be set to change the value and/or the display of the element. According to an embodiment, for each of the elements in the member schedule editor 302, the element is wrapped within one of the classes of the MemberScheduleJavaScript 1600 package of FIG. 16. The elements are attributes of the class. Hence, the member functions of the class have direct access to the elements and modify their properties as needed. With the class having direct access to the elements, there is no need to obtain the elements using their ids.

TABLE 1

Form Element
id = "MemberScheduleFormID"
Table Element
id = "MemberScheduleTableID"
Row Element
id = row_id + "_RowID"

| Task Cell Element | Set Date Cell Element | Planned Start Date Cell Element | Planned End Date Cell Element | Actual Start Date Cell Element | Actual End Date Cell Element |
|---|---|---|---|---|---|
| id = row_id + "_TaskCellID" CheckBox Element id = row_id + "_CheckBoxID" name = row_id + "_CheckBox" Project Task Selection Element id = row_id + "_ProjectTaskSelectID" name = row_id + "_ProjectTaskSelect" Task Name Input Text Element id = row_id + "_TaskInputBoxID" name = row_id + "_TaskInputBox" Action On Task Hidden Input Element id = row_id + "_HID_ActionOnTaskID" name = row_id + "_HID_ActionOnTask" ID of Task Hidden Input Element id = row_id + "_HID_IDofTaskID" name = row_id + "_HID_IDofTask" ID of Parent Task Hidden Input Element id = row_id + | id = row_id + "_SetDate-CellID" Set Date Hidden Input Element id = row_id + "_HID_SetDateID" name = row_id + "_HID_SetDate" | id = row_id + "_PlanStartDateCellID" Planned Start Date Hidden Input Element id = row_id + "_HID_PlanStartDateID" name = row_id + "_HID_PlanStartDate" Selection Element id = row_id + "_PlanStartMonthID" name = row_id + "_PlanStartMonth" Selection Element id = row_id + "_PlanStartDayID" name = row_id + "_PlanStartDay" Selection Element id = row_id + "_PlanStartYearID" name = row_id + "_PlanStartYear" | id = row_id + "_PlanEndCellID" Planned End Date Hidden Input Element id = row_id + "_HID_PlanEndDateID" name = row_id + "_HID_PlanEndDate" Selection Element id = row_id + "_PlanEndMonthID" name = row_id + "_PlanEndMonth" Selection Element id = row_id + "_PlanEndDayID" name = row_id + "_PlanEndDay" Selection Element id = row_id + "_PlanEndYearID" name = row_id + "_PlanEndYear" | id = row_id + "_ActualStartCellID" Actual Start Date Hidden Input Element id = row_id + "_HID_ActualStartDateID" name = row_id + "_HID_ActualStartDate" Selection Element id = row_id + "_ActualStartMonthID" name = row_id + "_ActualStartMonth" Selection Element id = row_id + "_ActualStartDayID" name = row_id + "_ActualStartDay" Selection Element id = row_id + "_ActualStartYearID" name = row_id + "_ActualStartYear" | id = row_id + "_ActualEndCellID" Actual End Date Hidden Input Element id = row_id + "_HID_ActualEndDateID" name = row_id + "_HID_ActualEndDate" Selection Element id = row_id + "_ActualEndMonthID" name = row_id + "_ActualEndMonth" Selection Element id = row_id + "_ActualEndDayID" name = row_id + "_ActualEndDay" Selection Element id = row_id + "_ActualEndYearID" name = row_id + "_ActualEndYear" |

TABLE 1-continued

"\_HID\_\_IDofParentTaskID"
name = row\_\_id +
"\_HID\_\_IDofParentTask"
Revision Number of Task
Hidden Element
id = row\_\_id +
"\_HID\_\_RevNumberID"
name = row\_\_id +
"\_HID\_\_RevNumber"
Name of Task Hidden
Input Element
id = row\_\_id +
"\_HID\_\_TaskNameID"
name = row\_\_id +
"\_HID\_\_TaskName"
Level of Task Hidden
Input Element
id = row\_\_id +
"\_HID\_\_TaskLevelID"
name = row\_\_id +
"\_HID\_\_TaskLevel"
Number of Detailed Task
Hidden Input Element
id = row\_\_id +
"\_HID\_\_NumOfDetailed
TaskID"
name = row\_\_id +
"\_HID\_\_NumOfDetailed-
Task"

Number of Rows Menu Selection Element
id = "AddRowSelectID"

Table 2 below depicts the attribute members of the CMSjsTaskCellJ 1610 class of the MemberScheduleJavaScript 1600 package shown in FIG. 16. CMSjsTaskCellJ 1610 can obtain and set values of the properties of all the elements it contains.

TABLE 2

| Type | Attribute Name | Description |
| --- | --- | --- |
| HTMLCellElement | m\_TaskCellElement | This attribute member is an object for the cell element that contains task information |
| HTMLInputElement | m\_TaskNameHiddenElement | This attribute member is an object for the hidden input element containing information about the task name. |
| HTMLInputElement | m\_LevelOfTaskHiddenElement | This attribute member is an object for the hidden input element containing information about the level of the task. |
| HTMLInputElement | m\_NumOfDetailsHiddenElement | This attribute member is an object for the hidden input element containing information about the highest possible number of detail tasks the task currently has. A task can have from 0 to the value of the hidden element of detailed tasks. |
| HTMLInputElement | m\_ActionOnTaskHiddenElement | This attribute member is an object for the hidden input element containing information about the action taken on the task. |
| HTMLInputElement | m\_IDOfTaskHiddenElement | This attribute member is an object for the hidden input element containing information about the ID of the task. |
| HTMLInputElement | m\_IDOfParentTaskHiddenElement | This attribute member is an object for the hidden input element containing information about the task ID of its parent task. |
| HTMLInputElement | m\_SelectedIndexHiddenElement | This attribute member is an object for the hidden input element containing information about the index of the selected task in the task select element. |
| HTMLInputElement | m\_TaskNameInputElement | This attribute member is an object for the input element corresponding to an input text box that lets the project member input a task. |
| HTMLSelectElement | m\_TaskNameSelectElement | This attribute member is an object for the select element that lets the project member select a project task to schedule. This element is initialized with unscheduled project tasks obtained from the database during the setup of the editor. |

TABLE 2-continued

| Type | Attribute Name | Description |
| --- | --- | --- |
| TextNode | m_TaskNameTextNode | This attribute member is an object for the text node that will display the task name in the task cell. |
| String | m_sRowID | This attribute member is a string for the row id of the row. |

Project Schedule Processor Package

FIGS. 19 through 22 illustrate the class diagrams of the packages of FIG. 14 corresponding to the ProjectScheduleProcessor 1310 package of FIG. 13, corresponding to the project schedule editor 202 (FIG. 2A). These FIGS. depict the class design corresponding to the four packages of the display editor 1402 and the post information from editor 1404. The XXXPHPPreEdit 1408 (FIG. 14) package obtains task assignment/schedule information from the database and generates the code for the initial display of the editor in the server processor 604 (FIG. 6). The XXXJavaScript 1410 (FIG. 14) package displays, manages, and maintains the editor in client processor 602 (FIG. 6). The XXXPHPPostEdit 1414 (FIG. 14) package posts all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate Web page that will display the task information. These figures depict the similarity in the design of the four packages among the three editors. Although the editors perform different tasks, they all follow a similar design pattern.

Figure 19:
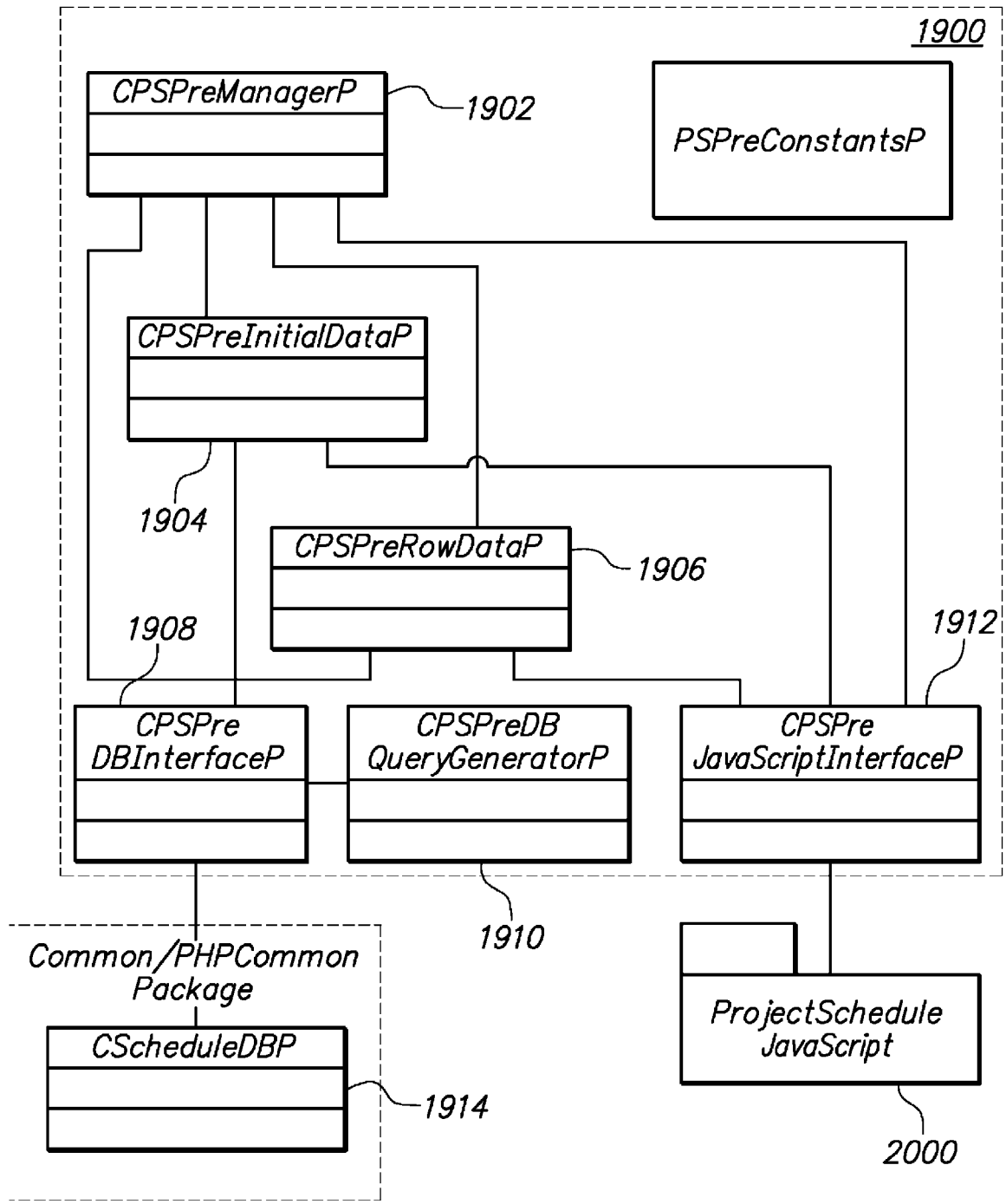
FIG. 19 depicts a class diagram of the ProjectSchedulePHPPreEdit package.

FIG. 19 depicts a class diagram of the ProjectSchedulePHPPreEdit package 1900 (e.g., XXXPHPPreEdit 1408 of FIG. 14). The ProjectSchedulePHPPreEdit package 1900 generates the Javascript interface that will display the initial project schedule editor 202 (FIG. 2A) in the Web browser of the client processor 602 (FIG. 6).

The CPSPreManagerP 1902 class provides an interface for the ProjectSchedulePHPPreEdit package 1900 and manages the classes in the ProjectSchedulePHPPreEdit package 1900 to generate the Javascript. The CPSPreInitialDataP 1904 class generates the Javascript for setting the initial data in the editor. The initial data is the project tasks that can be added to the project schedule. The CPSPreRowDataP 1906 class generates the Javascript for displaying rows of project tasks along with corresponding member tasks that have been added to the member's schedule in previous editor sessions. The CPSPreJavaScriptInterfaceP 1912 class generates the sequence of Javascript that creates the initial editor in the Web browser and interfaces with the ProjectScheduleJavaScript 2000 package. The CPSPreDBInterfaceP 1908 class accesses information from the database that will be displayed in the editor. The CPSPreDBQueryGeneratorP 1910 class creates the SQL database queries for CPSPreDBInterfaceP 1908. CPSPreDBInterfaceP 1908 interfaces with CScheduleDBP 1914 to access the database. CPSPreInitialDataP 1904 and CPSPreRowDataP 1906 obtain task information from the database through CPSPreDBInterfaceP 1908. According to an embodiment, the foregoing classes for ProjectSchedulePHPPreEdit 1900 package are implemented in PHP script.

Figure 20:
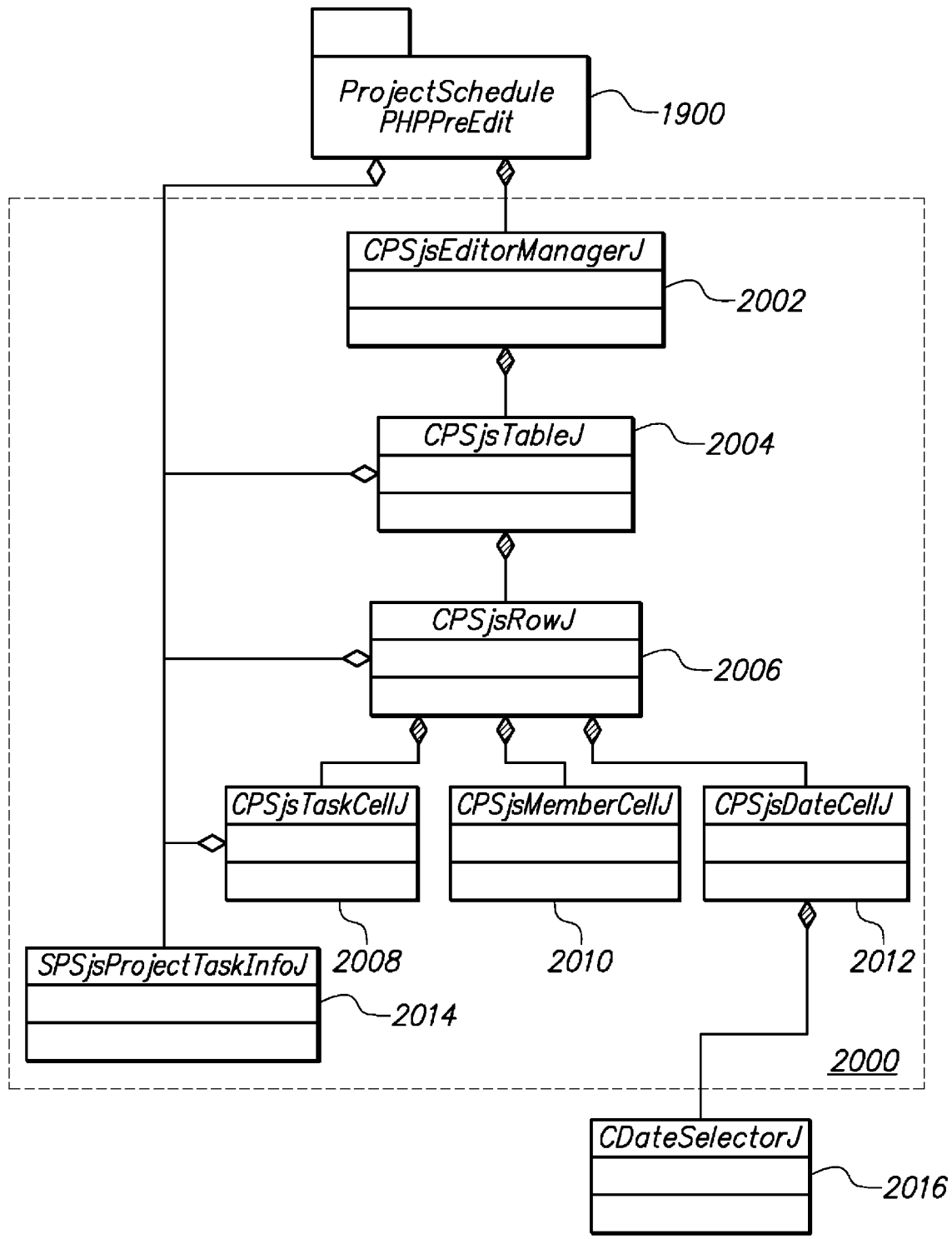
FIG. 20 depicts a class diagram of the ProjectScheduleJavaScript package.

FIG. 20 depicts a class diagram of the ProjectScheduleJavaScript package 2000 (e.g., XXXJavaScript 1410 of FIG. 14). The ProjectScheduleJavaScript package 2000 manages the project schedule editor 202 (FIG. 2A) in the browser. The CPSjsEditorManagerJ 2002 class provides the interface for this package and creates the Web page and form for the project schedule editor 202. The CPSjsTableJ 2004 class creates, initializes, and manages the table for the project schedule editor 202 and manages all events that affect the table. CPSjsTableJ 2004 also creates and manages the rows of the table. The CPSjsRowJ 2006 class initializes and manages a row of the table for the project schedule editor 202, manages all events that affect the row, and creates and manages the cells in the row. The CPSjsTaskCellJ 2008 class initializes and manages the task cell of a row. The CPSjsMemberCellJ 2010 class initializes and manages the member cell of a row. The CPSjsDateCellJ 2012 class initializes and manages the date cell of a row. The structure SPSjsProjectTaskInfo 2014 allows project/member task information to be passed from the ProjectSchedulePHPPreEdit 1900 package to the ProjectScheduleJavaScript 2000 package to display the project task and its member task schedule in the project schedule editor 202. CPSjsDateCellJ 2012 contains CDateSelectorJ 2016 to display month, day, and year menu selections in the plan/actual date cells. According to an embodiment, the foregoing classes and structures of the ProjectScheduleJavaScript package 2000 are implemented in Javascript.

Figure 21:
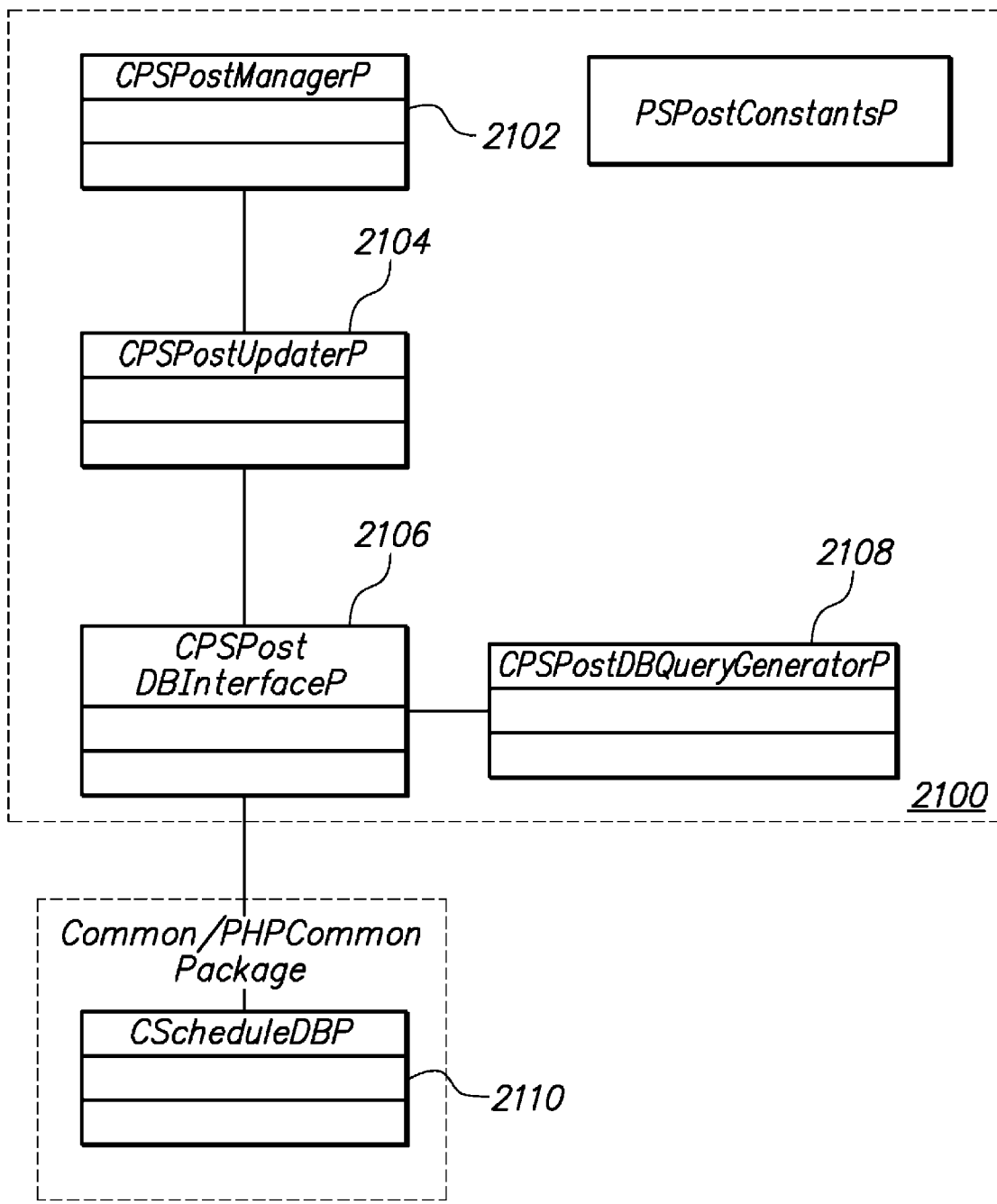
FIG. 21 depicts a class diagram of the ProjectSchedulePHPPostEdit package.

FIG. 21 depicts a class diagram of the ProjectSchedulePHPPostEdit 2100 package (e.g., XXXPHPPostEdit 1414 of FIG. 14). The CPSPostManagerP 2102 class provides the interface for this package and manages all other classes in the package. CPSPostManagerP 2102 determines the actions to perform on each project task from the project schedule editor 202. The CPSPostUpdaterP 2104 class updates the schedule of a project task in the database. The updates include adding or updating the schedule of a project task. The CPSPostUpdaterP 2104 class consolidates the project tasks with the members' tasks and updates the project tasks in the database. The CPSPostDBInterfaceP 2106 provides an interface for the classes to obtain information and update information in the database. The CPSPostDBQueryGeneratorP 2108 class creates the SQL database queries for CPSPostDBInterfaceP 2106. CPSPostDBInterfaceP 2106 interfaces with the CScheduleDBP 2110 to access the database. CPSPostUpdaterP 2104 updates task information in the database through CPSPostDBInterfaceP 2106. According to an embodiment, the foregoing classes for ProjectSchedulePHPPostEdit 2100 package are implemented in PHP script.

Figure 22:
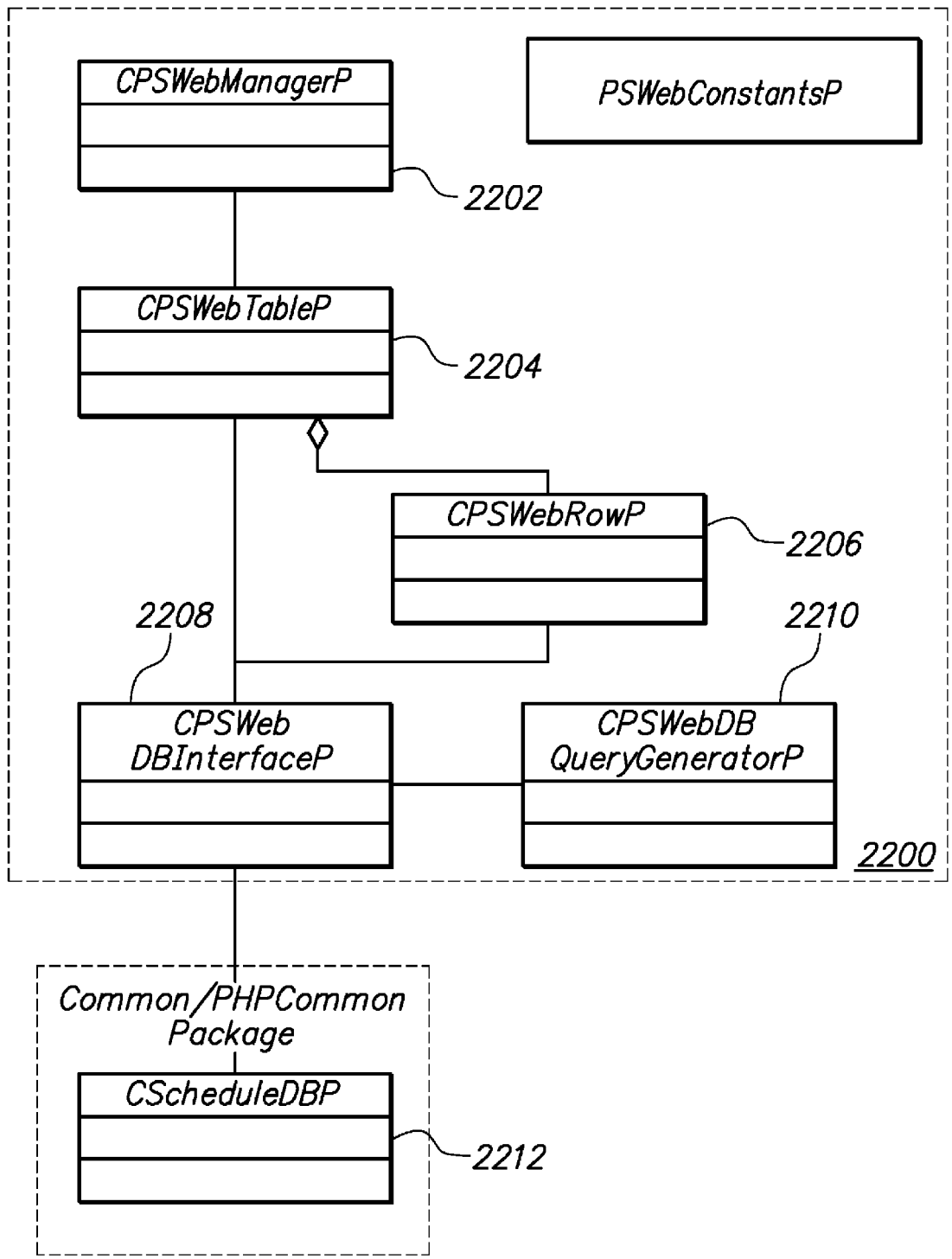
FIG. 22 depicts a class diagram of the ProjectScheduleWebPageGenerator package.

FIG. 22 depicts a class diagram of the ProjectScheduleWebPageGenerator 2200 package (e.g., XXXWebPageGenerator 1416 of FIG. 14). The CPSWebManagerP 2202 class provides the interface for this package to generate the project schedule Web page. CPSWebTableP 2204 creates the table for the project schedule Web page. The CPSWebRowP 2206 class creates the project and member task rows within the table. The CPSWebDBInterfaceP 2208 class provides an interface for the classes to obtain information from the database. The CPSWebDBQueryGeneratorP 2210 class creates the SQL database queries for CPSWebDBInterfaceP 2208. CPSWebDBInterfaceP 2208 interfaces with CScheduleDBP 2212 to access the database. CPSWebTableP 2204 and CPSWebRowP 2206 obtain task information from the database through CPSWebDBInterfaceP 2208. According to an embodiment, the foregoing classes for the ProjectScheduleWebPageGenerator 2200 package are implemented in PHP script.

Table 3 depicts the document object model representation of the project schedule editor 202 (FIG. 2A). Table 3 describes the elements that make up the project schedule editor 202 and corresponding element names and id properties. Each element can be accessed through its id and the properties of the element can be set to change the value and/or the display of the element. According to an embodiment, for each of the elements in the project schedule editor 202, the element is wrapped within one of the classes of the ProjectScheduleJavaScript 2000 package of FIG. 20. The elements are attributes of the class. Hence, the member functions of the class will have direct access to the elements and modify their properties as needed. With the class having direct access to the elements, there is no need to obtain the elements using their ids.

TABLE 3

| | | Form Element<br>id = "ProjectScheduleFormID"<br>Table Element<br>id = "ProjectScheduleTableID"<br>Row Element<br>id = row_id + "_RowID" | | | |
|---|---|---|---|---|---|
| Task Cell Element<br>id = row_id + "_TaskCellID<br>CheckBox Element<br>id = row_id + "_CheckBoxID"<br>name = row_id + "_CheckBox"<br>Project Task Selection Element<br>id = row_id + "_ProjectTaskSelectID"<br>name = row_id + "_ProjectTaskSelect"<br>Task Name Input Text Element<br>id = row_id + "_TaskInputBoxID"<br>name = row_id + "_TaskInputBox"<br>Action On Task Hidden Input Element<br>id = row_id + "_HID_ActionOnTaskID"<br>name = row_id + "_HID_ActionOnTask"<br>ID of Task Hidden Input Element<br>id = row_id + "_HID_IDofTaskID"<br>name = row_id + "_HID_IDofTask"<br>Name of Task Hidden Input Element<br>id = row_id + "_HID_TaskNameID"<br>name = row_id + "_HID_TaskName"<br>Number of Detailed Task Hidden Input Element<br>id = row_id + "_HID_NumOfDetailedTaskID"<br>name = row_id + "_HID_NumOfDetailedTask"<br>Member Label Cell Element<br>id = row_id + "_MemberLabelCellID"<br>Member Label Hidden Input Element<br>id = row_id + "_HID_MemberLabelCellID"<br>name = row_id + "_HID_MemberLabelCell" | Set Date Cell Element<br>id = row_id + "_SetDateCellID"<br>Set Date Hidden Input Element<br>id = row_id + "_HID_SetDateID"<br>name = row_id + "_HID_SetDate" | Planned Start Date Cell Element<br>id = row_id + "_PlanStartDateCellID"<br>Planned Start Date Hidden Input Element<br>id = row_id + "_HID_PlanStartDateID"<br>name = row_id + "_HID_PlanStartDate"<br>Selection Element<br>id = row_id + "_PlanStartMonthID"<br>name = row_id + "_PlanStartMonth"<br>Selection Element<br>id = row_id + "_PlanStartDayID"<br>name = row_id + "_PlanStartDay"<br>Selection Element<br>id = row_id + "_PlanStartYearID"<br>name = row_id + "_PlanStartYear" | Planned End Date Cell Element<br>id = row_id + "_PlanEndCellID"<br>Planned End Date Hidden Input Element<br>id = row_id + "_HID_PlanEndDateID"<br>name = row_id + "_HID_PlanEndDate"<br>Selection Element<br>id = row_id + "_PlanEndMonthID"<br>name = row_id + "_PlanEndMonth"<br>Selection Element<br>id = row_id + "_PlanEndDayID"<br>name = row_id + "_PlanEndDay"<br>Selection Element<br>id = row_id + "_PlanEndYearID"<br>name = row_id + "_PlanEndYear" | Actual Start Date Cell Element<br>id = row_id + "_ActualStartCellID"<br>Actual Start Date Hidden Input Element<br>id = row_id + "_HID_ActualStartDateID"<br>name = row_id + "_HID_ActualStartDate" | Actual End Date Cell Element<br>id = row_id + "_ActualEndCellID"<br>Actual End Date Hidden Input Element<br>id = row_id + "_HID_ActualEndDateID"<br>name = row_id + "_HID_ActualEndDate" |
| | | Number of Rows Menu Selection Element<br>id = "AddRowSelectID" | | | |

Table 4 depicts the attribute members of the class CPSjsTaskCellJ 2008 of the ProjectScheduleJavaScript 2000 package shown in FIG. 20. CPSjsTaskCellJ 2008 can obtain and set values of the properties of all the elements it contains.

TABLE 4

| Type | Attribute Name | Description |
| --- | --- | --- |
| HTMLCellElement | m_TaskCellElement | This attribute member is an object for the cell element that contains task information |
| HTMLInputElement | m_TaskNameHiddenElement | This attribute member is an object for the hidden input element containing information about the task name. |
| HTMLInputElement | m_NumOfDetailsHiddenElement | This attribute member is an object for the hidden input element containing information about the number of member tasks the project task has. |
| HTMLInputElement | m_ActionOnTaskHiddenElement | This attribute member is an object for the hidden input element containing information about the action taken on the task. |
| HTMLInputElement | m_IDOfTaskHiddenElement | This attribute member is an object for the hidden input element containing information about the ID of the task. |
| HTMLInputElement | m_SelectedIndexHiddenElement | This attribute member is an object for the hidden input element containing information about the index of the selected task in the task select element. |
| HTMLInputElement | m_TaskNameInputElement | This attribute member is an object for the input element corresponding to an input text box that lets the project member input a task. |
| HTMLSelectElement | m_TaskNameSelectElement | This attribute member is an object for the select element that lets the project member select a project task to schedule. This element is initialized with unassigned project tasks obtained from the database during the setup of the editor. |
| String | m_sRowID | This attribute member is a string for the row id of the row. |

Task Assignment Processor Package

FIGS. 23 through 26 illustrate the class diagrams of the packages of FIG. 14 corresponding to the TaskAssignmentProcessor package of FIG. 13, corresponding to the task assignment editor 102 (FIG. 1A). These figures depict the class design corresponding to the four packages of the display editor 1402 and the post information from editor 1404. The XXXPHPPreEdit 1408 (FIG. 14) package obtains task assignment/schedule information from the database and generates the code for the initial display of the editor in the server processor 604 (FIG. 6). The XXXJavaScript 1410 (FIG. 14) package displays, manages, and maintains the editor in client processor 602 (FIG. 6). The XXXPHPPostEdit 1414 (FIG. 14) package posts all the task assignment/schedule information from the editor session of the client processor 602 into the database of the server processor 604. The XXXWebPageGenerator 1416 (FIG. 14) package obtains the task assignment/schedule information from the database of the server processor 604 to generate the appropriate Web page that will display the task information. These figures depict the similarity in the design of the four packages among the three editors. Although the editors perform different tasks, they all follow a similar design pattern.

Figure 23:
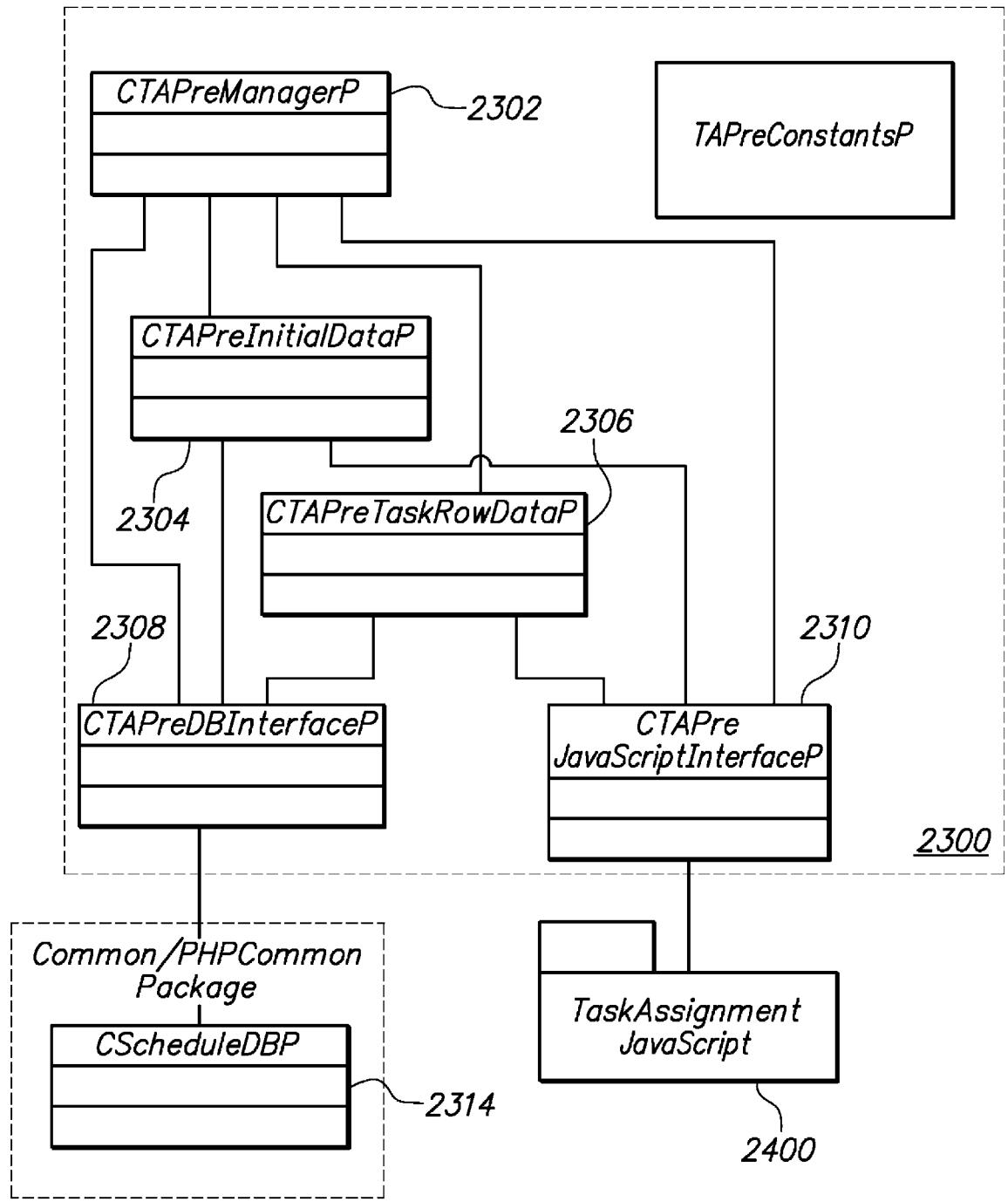
FIG. 23 depicts a class diagram of the TaskAssignmentPHPPreEdit package.

FIG. 23 depicts a class diagram of the TaskAssignmentPHPPreEdit 2300 package (e.g., XXXPHPPreEdit 1408 of FIG. 14). The TaskAssignmentPHPPreEdit 2300 package generates the Javascript interface that will display the initial task assignment editor 102 (FIG. 1A) in the Web browser of the client processor 602 (FIG. 6).

The CTAPreManagerP 2302 class provides an interface for the TaskAssignmentPHPPreEdit 2300 package and manages all classes in the package to generate the Javascript. The CTAPreInitialDataP 2304 class generates the Javascript for setting the initial data in the task assignment editor 102 (FIG. 1A). The initial data is the project tasks that can be added to the project schedule and be assigned to members. The CTAPreTaskRowDataP 2306 class generates the Javascript for displaying rows of project tasks along with its member tasks and the member assigned to the tasks that have been assigned in previous editor sessions. The CTAPreJavaScriptInterfaceP 2310 class generates the sequence of Javascript that creates the initial task assignment editor 102 in the Web browser and interfaces with the TaskAssignmentJavaScript 2400 package. The CTAPreDBInterfaceP 2308 accesses information from the database that will be displayed in the editor. CTAPreDBInterfaceP 2308 generates the appropriate queries to obtain the desired information for display. CTAPreDBInterfaceP 2308 interfaces with CScheduleDBP 2314 to access the database. CTAPreInitialDataP 2304 and CTAPreTaskRowDataP 2306 obtain task information from the database through CTAPreDBInterfaceP 2308. According to an embodiment, the foregoing classes for the TaskAssignmentPHPPreEdit 2300 package are implemented in PHP script.

Figure 24:
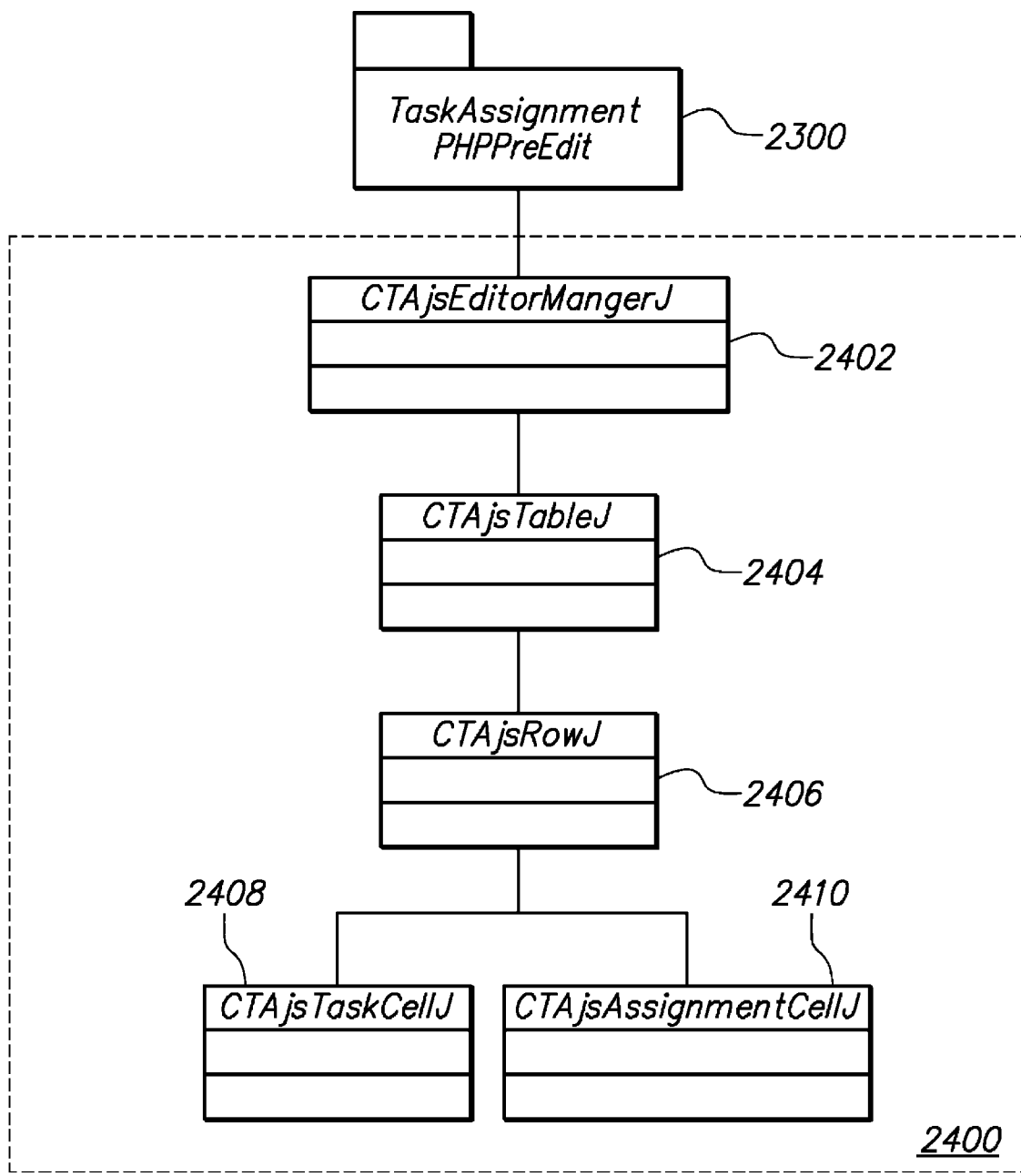
FIG. 24 depicts a class diagram of the TaskAssignmentJavaScript package.

FIG. 24 depicts a class diagram of the TaskAssignmentJavaScript 2400 package (e.g., XXXJavaScript 1410 of FIG. 14). The TaskAssignmentJavaScript 2400 package manages the task assignment editor 102 (FIG. 1A) in the browser. The CTAjsEditorManagerJ 2402 class provides the interface for this package and creates the Web page and form for the task assignment editor 102. The CTAjsTableJ 2404 class creates, initializes, and manages the table for the task assignment editor 102 and manages all events that affect the table. CTAjsTableJ 2404 also creates and manages the rows of the table. The CTAjsRowJ 2406 class initializes and manages a row of the table for the task assignment editor 102, manages all events that affect the row, and creates and manages the cells in the row. The CTAjsTaskCellJ 2408 class initializes and manages the task cell of a row. The CTAjsAssignmentCellJ 2410 class initializes and manages the assignment cell of a row. According to an embodiment, the foregoing classes and structures for the TaskAssignmentJavaScript 2400 package are implemented in Javascript.

Figure 25:
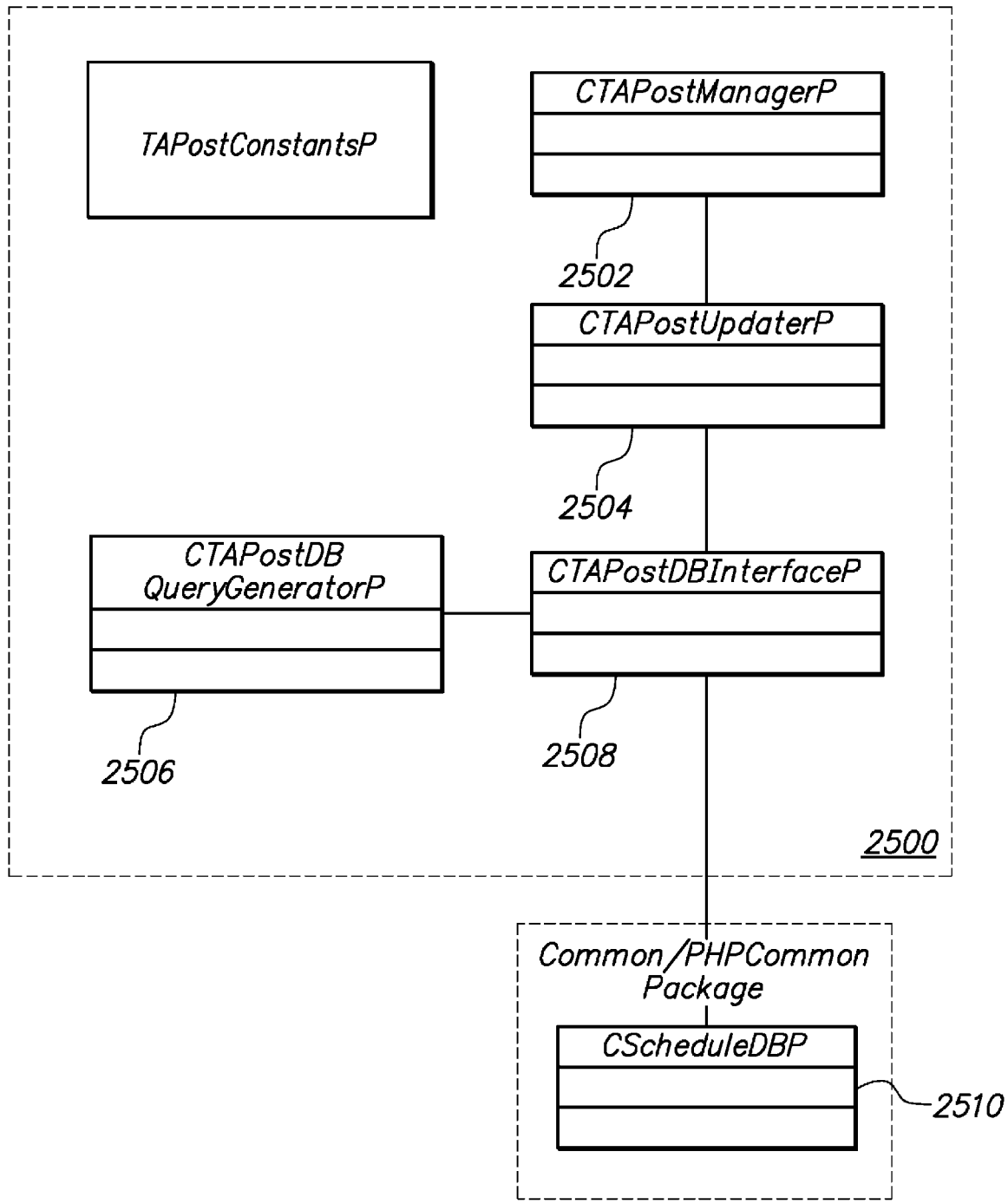
FIG. 25 depicts a class diagram of the TaskAssignmentPHPPostEdit package.

FIG. 25 depicts a class diagram of the TaskAssignmentPHPPostEdit 2500 package (e.g., XXXPHPPostEdit 1414 of FIG. 14). The CTAPostManagerP 2502 class provides the interface for this package and manages all other classes in the package. CTAPostManagerP 2502 determines the actions to perform on each project task from the task assignment editor 102 (FIG. 1A). The CTAPostUpdaterP 2504 class updates the assignment of a project task in the database. The updates include adding or obsoleting the assignment of a project task. The CTAPostDBInterfaceP 2508 class provides an interface for the class to obtain information and update information in the database. The CTAPostDBQueryGeneratorP 2506 class creates the SQL database queries for CTAPostDBInterfaceP 2508. CTAPostDBInterfaceP 2508 interfaces with the CScheduleDBP 2510 to access the database. CTAPostUpdaterP 2504 updates task information in the database through CTAPostDBInterfaceP 2508. According to an embodiment, the foregoing classes for the TaskAssignmentPHPPostEdit 2500 package are implemented in PHP script.

Figure 26:
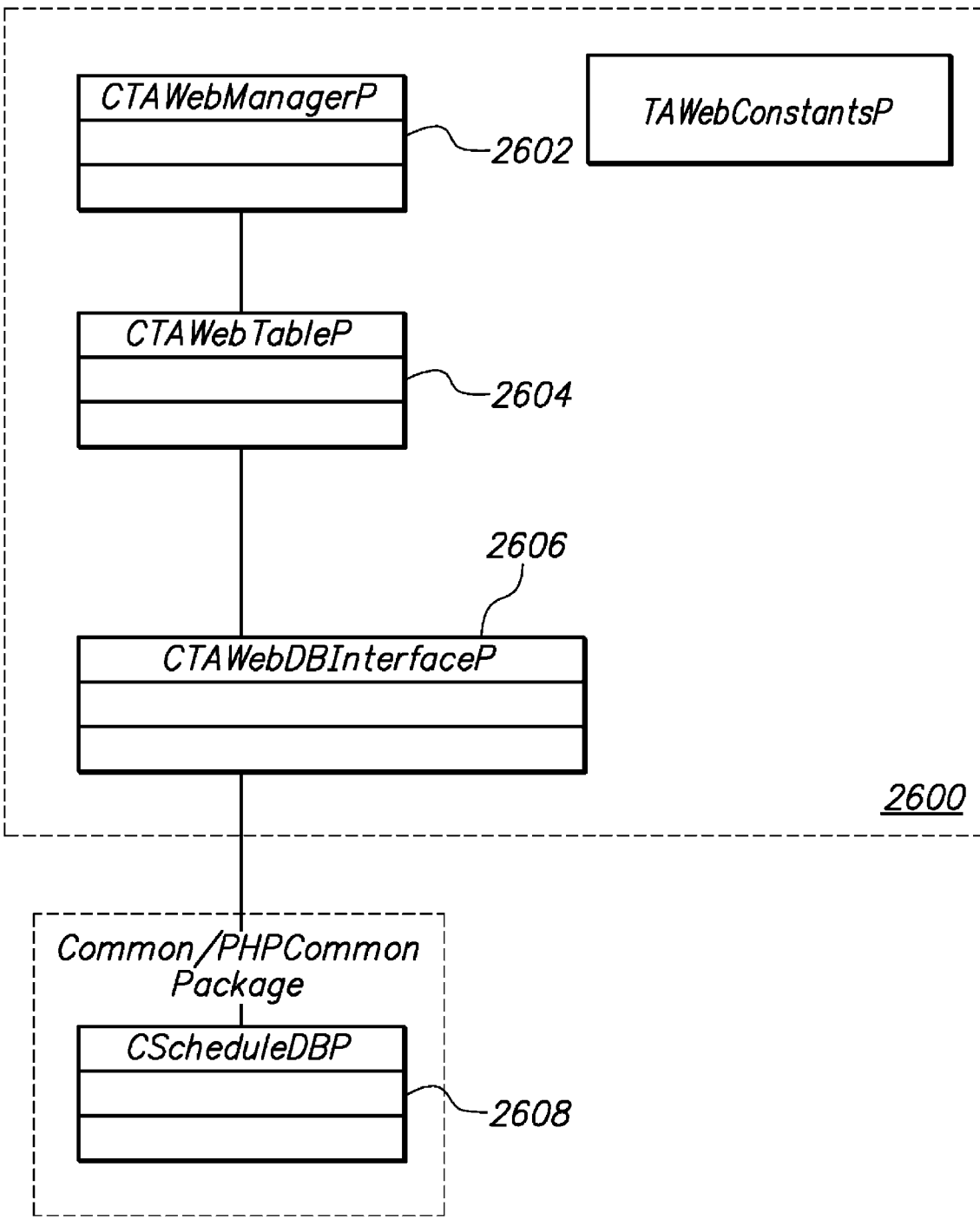
FIG. 26 depicts a class diagram of the TaskAssignmentWebPageGenerator package.

FIG. 26 depicts a class diagram of the TaskAssignmentWebPageGenerator 2600 package (e.g., XXXWebPageGenerator 1416 of FIG. 14). The CTAWebManagerP 2602 class provides the interface for this package to generate the task assignment Web page. CTAWebTableP 2604 class creates the table for the task assignment Web page. The CTAWebDBInterfaceP 2606 class provides an interface for the classes to obtain information from the database. CTAWebDBInterfaceP 2606 generates the appropriate queries to obtain the desired information. CTAWebDBInterfaceP 2606 interfaces with CScheduleDBP 2608 to access the database. CTAWebTableP 2604 obtains task information from the database through CTAWebDBInterfaceP 2606. According to an embodiment, the foregoing classes for the TaskAssignmentWebPageGenerator 2600 package are implemented in PHP script.

Table 5 depicts the document object model representation of the task assignment editor 102 (FIG. 1A). Table 5 describes the elements that make up the task assignment editor 102 and corresponding element names and id properties. Each element can be accessed through its id and the properties of the element can be set to change the value and/or the display of the element. According to an embodiment, for each of the elements in the task assignment editor 102, the element is wrapped within one of the classes of the TaskAssignmentJavaScript 2400 package of FIG. 24. The elements are attributes of the class. Hence, the member functions of the class will have direct access to the elements and modify its properties as needed. With the class having direct access to the elements, there is no need to obtain the elements using their ids.

TABLE 5

Form Element
id = "TaskAssignmentFormID"
Table Element
id = "TaskAssignmentTableID"
    Row Element
    id = row_id + "_RowID"

| Task Cell Element | Member Assignment Cell Element |
|---|---|
| id = row_id + "_TaskCellID | id = row_id + "_MemberAssignmentCellID" |
| CheckBox Element | Member Assignment Hidden Input Element |
| id = row_id + "_CheckBoxID" | id = row_id + "_HID_MemberAssignmentID" |
| name = row_id + "_CheckBox" | name = row_id + "_HID_MemberAssignment" |
| Project Task Selection Element | Member Assignment Selection Element |
| id = row_id + "_ProjectTaskSelectID" | id = row_id + "_MemberAssignmentID" |
| name = row_id + "_ProjectTaskSelect" | name = row_id + "_MemberAssignment" |
| Task Name Input Text Element | |
| id = row_id + "_TaskInputBoxID" | |
| name = row_id + "_TaskInputBox" | |
| Action On Task Hidden Input Element | |
| id = row_id + "_HID_ActionOnTaskID" | |
| name = row_id + "_HID_ActionOnTask" | |
| ID of Task Hidden Input Element | |
| id = row_id + "_HID_IDofTaskID" | |
| name = row_id + "_HID_IDofTask" | |
| ID of Parent Task Hidden Input Element | |
| id = row_id + "_HID_IDofParentTaskID" | |
| name = row_id + "_HID_IDofParentTask" | |
| Name of Task Hidden Input Element | |
| id = row_id + "_HID_TaskNameID" | |
| name = row_id + "_HID_TaskName" | |
| Number of Detailed Task Hidden Element | |
| id = row_id + "_HID_NumOfDetailedTaskID" | |
| name = row_id + "_HID_NumOfDetailedTask" | |

Number of Rows Menu Selection Element
    id = "AddRowSelectID"

Table 6 below depicts the attribute members of the class CTAjsTaskCellJ 2408 of the TaskAssignmentJavaScript package shown in FIG. 24. CTAjsTaskCellJ 2408 can obtain and set values of the properties of all the elements it contains.

TABLE 6

| Type | Attribute Name | Description |
| --- | --- | --- |
| HTMLCellElement | m_TaskCellElement | This attribute member is an object for the cell element that contains task information |
| HTMLInputElement | m_TaskNameHiddenElement | This attribute member is an object for the hidden input element containing information about the task name. |
| HTMLInputElement | m_LevelOfTaskHiddenElement | This attribute member is an object for the hidden input element containing information about the level of the task. |
| HTMLInputElement | m_NumOfDetailsHiddenElement | This attribute member is an object for the hidden input element containing information about the highest possible number of detail tasks the task currently has. A task can have from 0 to the value of the hidden element of detailed tasks. |
| HTMLInputElement | m_ActionOnTaskHiddenElement | This attribute member is an object for the hidden input element containing information about the action taken on the task. |
| HTMLInputElement | m_IDOfTaskHiddenElement | This attribute member is an object for the hidden input element containing information about the ID of the task. |
| HTMLInputElement | m_IDOfParentTaskHiddenElement | This attribute member is an object for the hidden input element containing information about the task ID of its parent task. |
| HTMLInputElement | m_SelectedIndexHiddenElement | This attribute member is an object for the hidden input element containing information about the index of the selected task in the task select element. |
| HTMLInputElement | m_TaskNameInputElement | This attribute member is an object for the input element corresponding to an input text box that lets the project member input a task. |
| HTMLSelectElement | m_TaskNameSelectElement | This attribute member is an object for the select element that lets the project member select a project task to schedule. This element is initialized with unscheduled project tasks obtained from the database during the setup of the editor. |
| TextNode | m_TaskNameTextNode | This attribute member is an object for the text node that will display the task name in the task cell. |
| String | m_sRowID | This attribute member is a string for the row id of the row. |

As depicted from FIGS. 15 through 26, which describe the XXXPHPPreEdit, XXXJavaScript, XXXPHPPostEdit, and XXXWebPageGenerator packages for each of the member schedule editor 302 (FIG. 3A), project schedule editor 202 (FIG. 2A), and task assignment editor 102 (FIG. 1A), the design of each editor follows a similar pattern. Hence, any new editors that are added to the system may also follow a similar design pattern.

Table 7 depicts the indexing of the software design specification of the object-oriented scheduling system described herein, to see the similarity in design. Table 7 lists the packages and classes within the packages, and shows the similarity of the design of the three editors.

TABLE 7

| Common | PHP Common | CScheduleDBP, DateUtilityP, ErrorHandlingUtilityP, DebugUtilityP, phpSystemConstants |
| --- | --- | --- |
| | JavaScript Common | CDateSelectorJ, EditorUtilityJ, DateUtilityJ, CalendarUtilityJ, ErrorHandlingUtilityJ, DebugUtilityJ, JavaScriptSystemConstants |
| Login Processor | login.htm, PostLogin.htm, CLoginPostFormP, CLoginProjectTeamDataP, LoginConstantsP | |
| Task Assignment Processor | TaskAssignEditor.htm, PostTaskAssignment.htm | |
| | TaskAssignmentPHPPreEdit | CTAPreManagerP, CTAPreInitialDataP, CTAPreTaskRowDataP, CTAPreJavaScriptInterfaceP CTAPreDBInterfaceP, TAPreConstantsP |
| | TaskAssignmentJavaScript | CTAjsEditorManagerJ, CTAjsTableJ, CTAjsRowJ, CTAjsTaskCellJ, CTAjsAssignmentCellJ |

TABLE 7-continued

| | | |
|---|---|---|
| | TaskAssignmentPHPPostEdit | CTAPostManagerP, CTAPostUpdaterP, CTAPostDBInterfaceP, CTAPostDBQueryGeneratorP, TAPostConstantsP |
| | TaskAssignmentWebPageGenerator | CTAWebManagerP, CTAWebTableP, CTAWebDBInterfaceP, TAWebConstantsP |
| Project Schedule Processor | ProjScheduleEditor.htm, PostProjSchedule.htm | |
| | ProjectSchedulePHPPreEdit | CPSPreManagerP, CPSPreInitialDataP, CPSPreRowDataP, CPSPreDBInterfaceP, CPSPreDBQueryGeneratorP, CPSPreJavaScriptInterfaceP, PSPreConstantsP |
| | ProjectScheduleJavaScript | CPSjsEditorManagerJ, CPSjsTableJ, CPSjsRowJ, CPSjsTaskCellJ, CPSjsMemberCellJ, CPSjsDateCellJ, SPSjsProjectTaskInfo |
| | ProjectSchedulePHPPostEdit | CPSPostManagerP, CPSPostUpdaterP, CPSPostDBInterfaceP, CPSPostDBQueryGeneratorP, PSPostConstantsP |
| | ProjectScheduleWebPageGenerator | CPSWebManagerP, CPSWebTableP, CPSWebRowP, CPSWebDBInterfaceP, CPSWebDBQueryGeneratorP, PSWebConstantsP |
| Member Schedule Processor | MembScheduleEditor.htm, PostMembSchedule.htm | |
| | MemberSchedulePHPPreEdit | CMSPreManagerP, CMSPreInitialDataP, CMSPreRowDataP, CMSPreDBInterfaceP, CMSPreJavaScriptInterfaceP, MSPreConstantsP |
| | MemberScheduleJavaScript | CMSjsEditorManagerJ, CMSjsTableManagerJ, CMSjsTableJ, CMSjsRowJ, CMSjsTaskCellJ, CMSjsDateCellJ, CMSjsDetailTaskInfoJ, SMSjsMemberTaskInfoJ |
| | MemberSchedulePHPPostEdit | CMSPostManagerP, CMSPostUpdaterP, CMSPostDBInterfaceP, CMSPostDBQueryGeneratorP, MSPostConstantsP |
| | MemberScheduleWebPageGenerator | CMSWebManagerP, CMSWebTableP, CMSWebRowP, CMSWebDBInterfaceP, CMSWebDBQueryGeneratorP, MSWebConstantsP |

Database Query Generation from Constant Strings with Placeholder Strings

FIG. 27 depicts example constant strings that are used to generate database queries. Two types of constant strings are used. The "constant query string" contains the entire query string with placeholder strings, where the placeholder strings are replaced with values for a given query. The constant query string shows the entire query and the placeholder strings depict what values need to be put into the query. The "constant for placeholder strings" are used for searching and for replacing the placeholder strings in the constant query string with actual values. The placeholder strings in the query apply restrictions to limit the results of a query. The example shown in FIG. 27 corresponds to PHP script but can be used in any language.

Using constant query strings having placeholder strings provides an improvement from building the string through a series of string concatenations, which is difficult to read and comprehend. Each of the class diagrams for packages which access the database contain package constants that are used within the package, as shown in FIGS. 15, 17, 18, 19, 21, 22, 23, 25, and 26. The constant query strings are defined within the package so that they are easy to locate. Another advantage of constant query strings is testing them in a database tool such as Navicat MySQL. The constant query string can be copied into such a tool with the placeholder strings replaced with values, to test if the query string is a valid string.

FIG. 28 depicts an example script used to generate the database query from the constant strings of FIG. 27. The example shown in FIG. 28 corresponds to PHP script but any language can be used to implement the sequence. The example shows the value of the query string after each statement of the script is executed. In the execution of the first statement, the constant string is assigned to a variable string, $loc_sQuery. The variable $loc_sQuery will contain the query that will be used to for the database query. In the execution of the second, third, and fourth statements, the placeholder strings "%% ProjectNumber %%", "%% MemberLabel %%", and "%% ProjectTaskID %%" are replaced with the values "J17", "T1", and "40" respectively. The execution of the fourth step shows the resulting query string. This example shows the replacement of the placeholder by a simple value such as project number, member label, and project task id. Some values that replace the placeholder strings are static, such as the project number and member label, which do not change over a session with the editors. The example query is restricted to the records of the table of the database with the specified project number, member label, and project task id.

Figure 29:
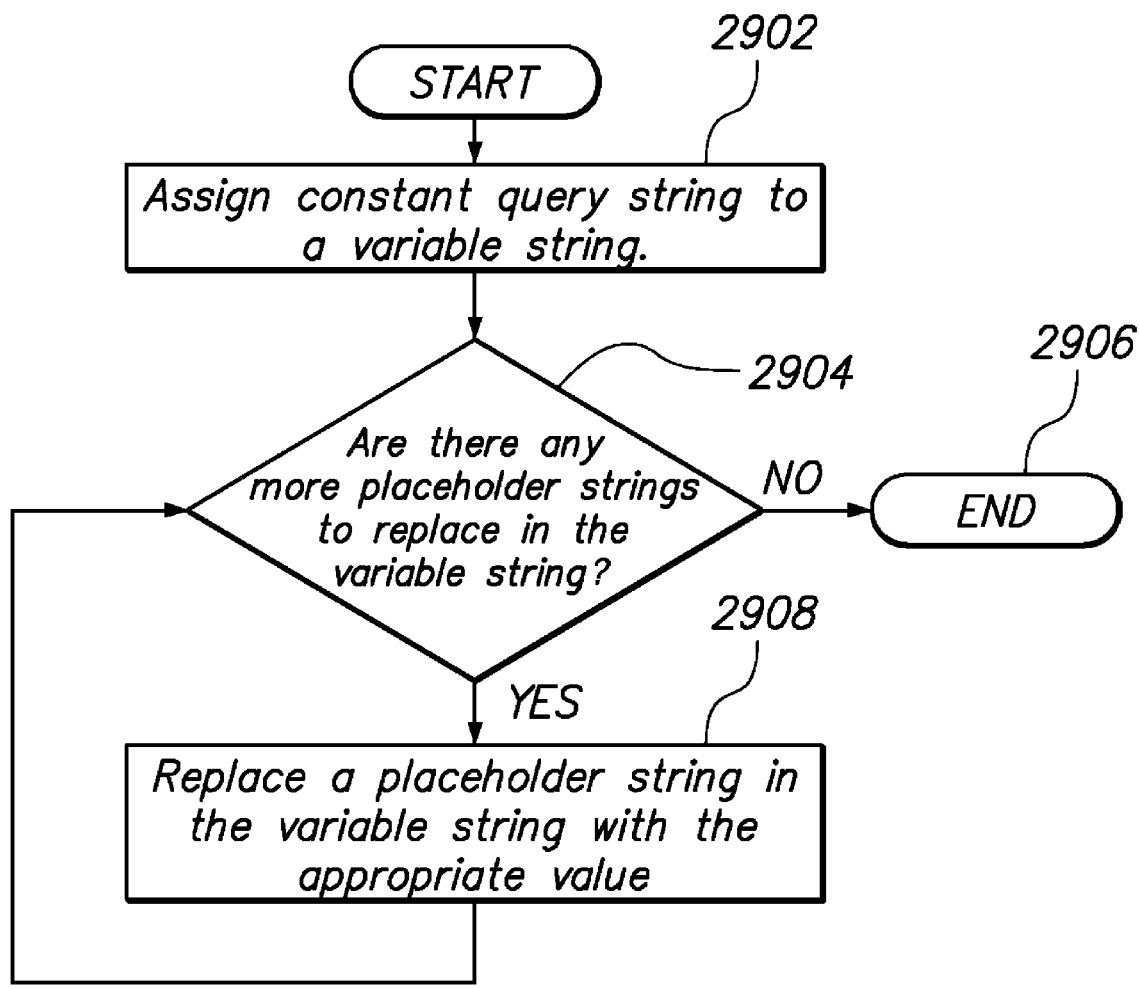
FIG. 29 is a flow diagram illustrating a process for generating a query string from a constant string.

FIG. 29 is a flow diagram illustrating a process for generating a query string from a constant string. At block 2902, a constant query string is assigned to a variable string. A variable string is needed to allow the replacement of the placeholder strings with values, whereas the values of the constant string do not change. At block 2904, the variable string is checked to see if it contains any placeholder strings. If the variable string does not contain any more placeholder strings, then the query string corresponds to the original constant query string, and the process ends at block 2906. If the variable string does contain more placeholder strings, then at block 2908 a placeholder string in the variable string is replaced with a value. After the replacement of block 2908, control returns to block 2904 to determine whether the variable string contains any more placeholder strings. When all the placeholder strings in the variable are replaced with values, the query string is generated and is ready for submission to the database. Once the query is submitted to the database, the database produces results which can be returned to the requester, passed to another process, or otherwise processed as appropriate for the purpose.

The CXXXDBInterfaceP class (e.g., CMSPostDBInterfaceP 1706 class from FIG. 17 and CMSWebDBInterfaceP 1808 class of FIG. 18) and the CYYYDBQueryGeneratorP class (e.g., CMSPostDBQueryGeneratorP 1708 class from FIG. 17 and CMSWebDBQueryGeneratorP 1810 class of FIG. 18) create and use the query. In some cases, the CXXXDBInterfaceP class contains private functions that generate the query strings from the constants and values obtained from the user, via the editor, and from the database. An example is CMSPreDBInterfaceP 1510 of FIG. 15. In most cases, the CXXXDBInterfaceP class will use the public functions of CYYYDBQueryGeneratorP to generate the query string. An example is CMSPostDBInterfaceP 1706 and CMSPostDBQueryGeneratorP 1708 of FIG. 17.

Editor Web Page Components

Figure 30:
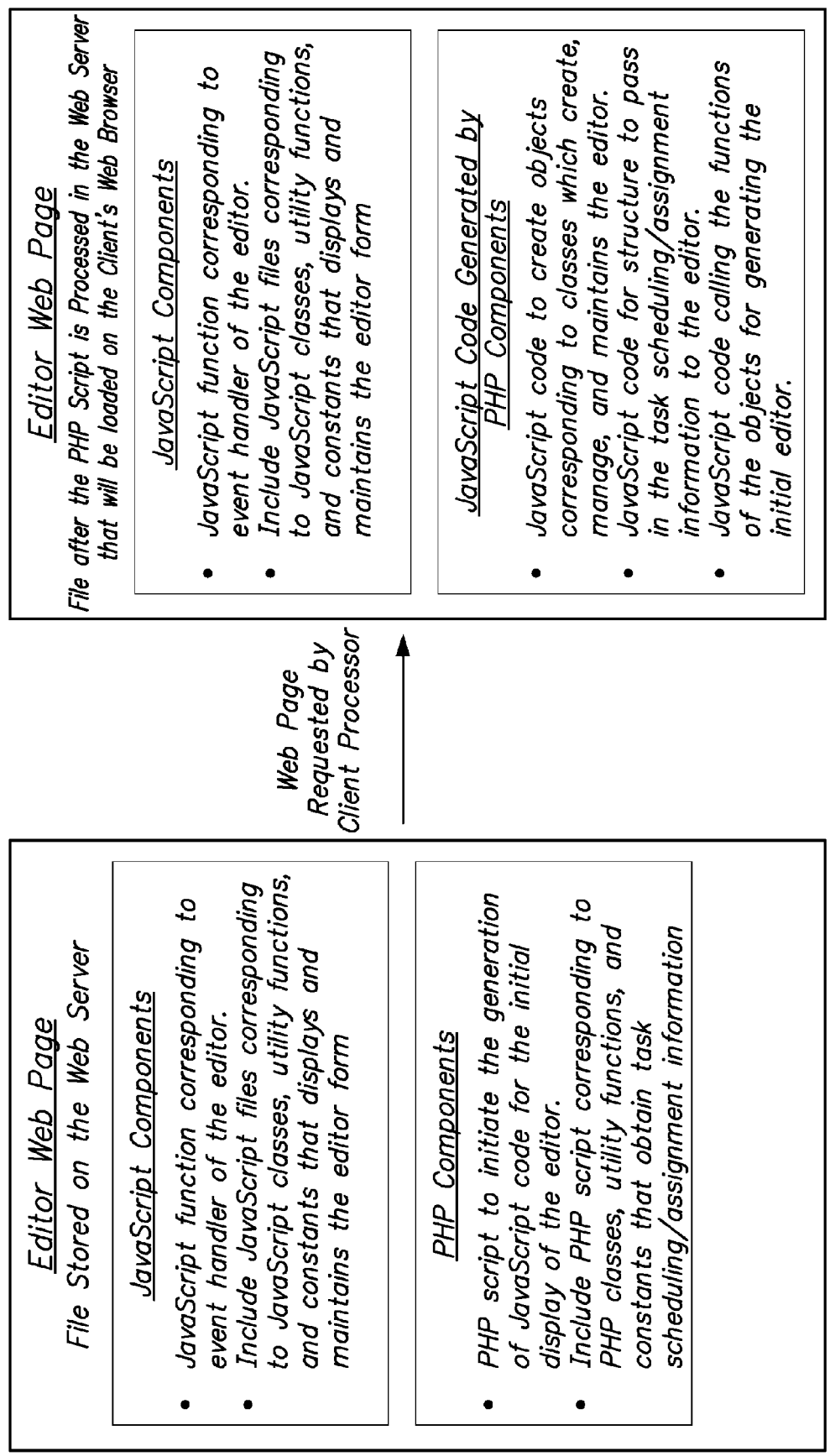
FIG. 30 depicts the components of the Web page for the editors (e.g., the member schedule editor, project schedule editor, and task assignment editor).

FIG. 30 depicts the components of the Web page for the editors (e.g., the member schedule editor 302, project schedule editor 202, and task assignment editor 102). The Web page is a file stored in the server processor 604 (FIG. 6), such as a Web server. The Web page contains a JavaScript component and a PHP component. The JavaScript component contains JavaScript functions that handle events that occur in the editor. The JavaScript component includes other JavaScript files that correspond to classes, utilities, and constants for the display, management, and maintenance of the editor. The PHP component of the Web page contains PHP script to initiate the generation of JavaScript code that will display, in the editor, task assignment/schedule information obtained from the database. The PHP component includes files with PHP script that correspond to classes, utilities, and constants to obtain task assignment/schedule information from the database and to generate the JavaScript code for the editor.

When the Web page is requested by the client processor 602 (FIG. 6), such as a Web browser requesting an editor Web page, only the PHP component of the Web page is processed by the server processor 604. For example, the PHP script is executed in the Web server, such as Web servers 507 and 530 (FIG. 5). The PHP script accesses and obtains task assignment/schedule information from the database. The PHP script generates structures in JavaScript code to store and pass the task information to JavaScript. The PHP script generates JavaScript code that will create the object of a JavaScript class that creates, manages, and maintains the editor, and calls the member functions of the object to create the initial display of the editor with the task information. The JavaScript code generated by the PHP script is added to the editor Web page as the Web page is passed to the client processor 602. The PHP code will not be in the Web page as it is passed to the client processor 602. The client processor executes all the JavaScript code in the Web page to display the initial editor and to manage and maintain the editor as the user interacts with the editor. The PHP script is not passed to the client processor 602, but is server-side code.

Figure 31:
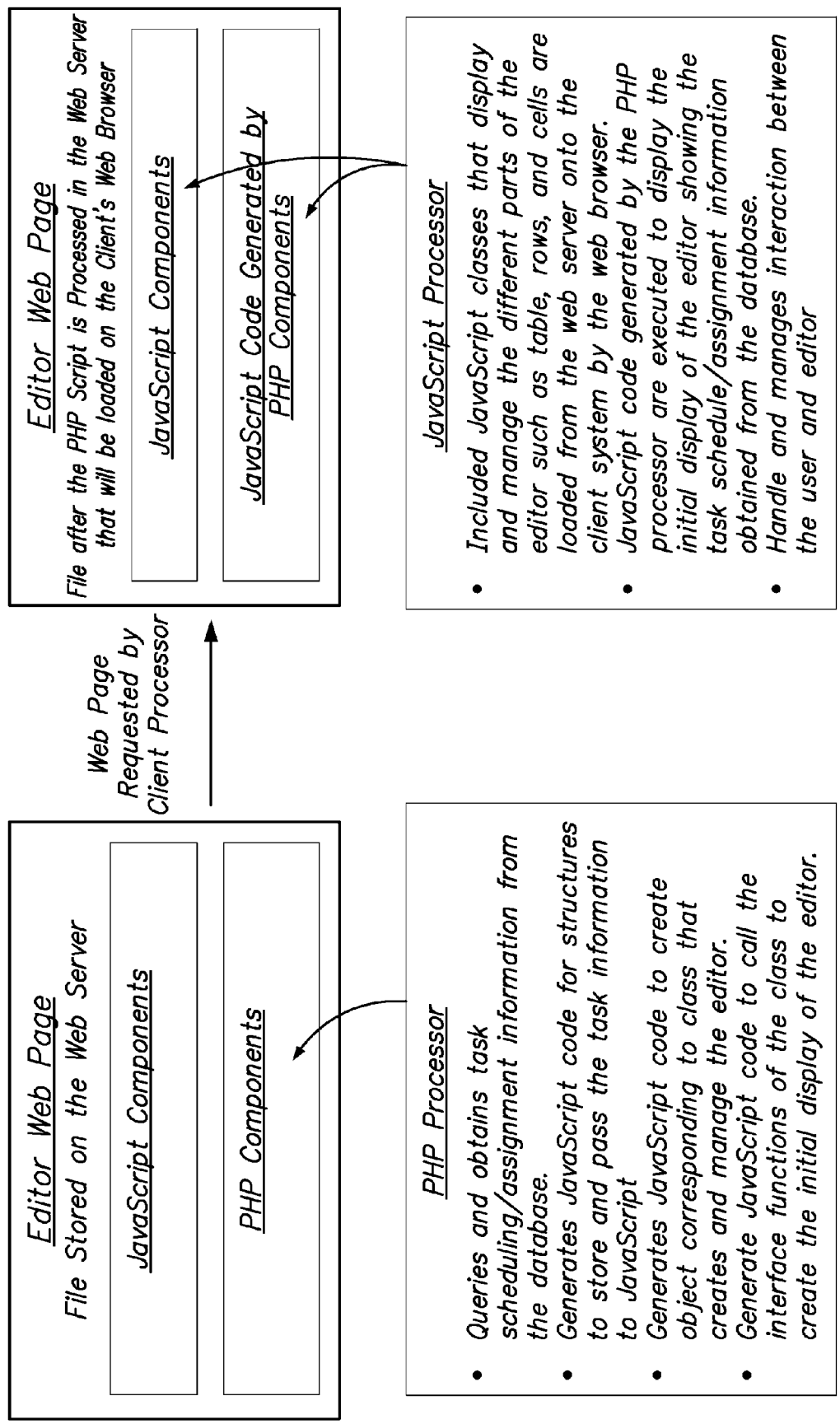
FIG. 31 depicts components of the Web page for the editors.

FIG. 31 depicts components of the Web page for the editors (e.g., the member schedule editor 302, project schedule editor 202, and task assignment editor 102), along with the processors that process the components of the Web page. The PHP processor occurs on the server side and the JavaScript processor occurs on the client side. The PHP processor on the server executes the PHP components to generate the JavaScript code that will be executed by the JavaScript processor on the client.

Figure 32:
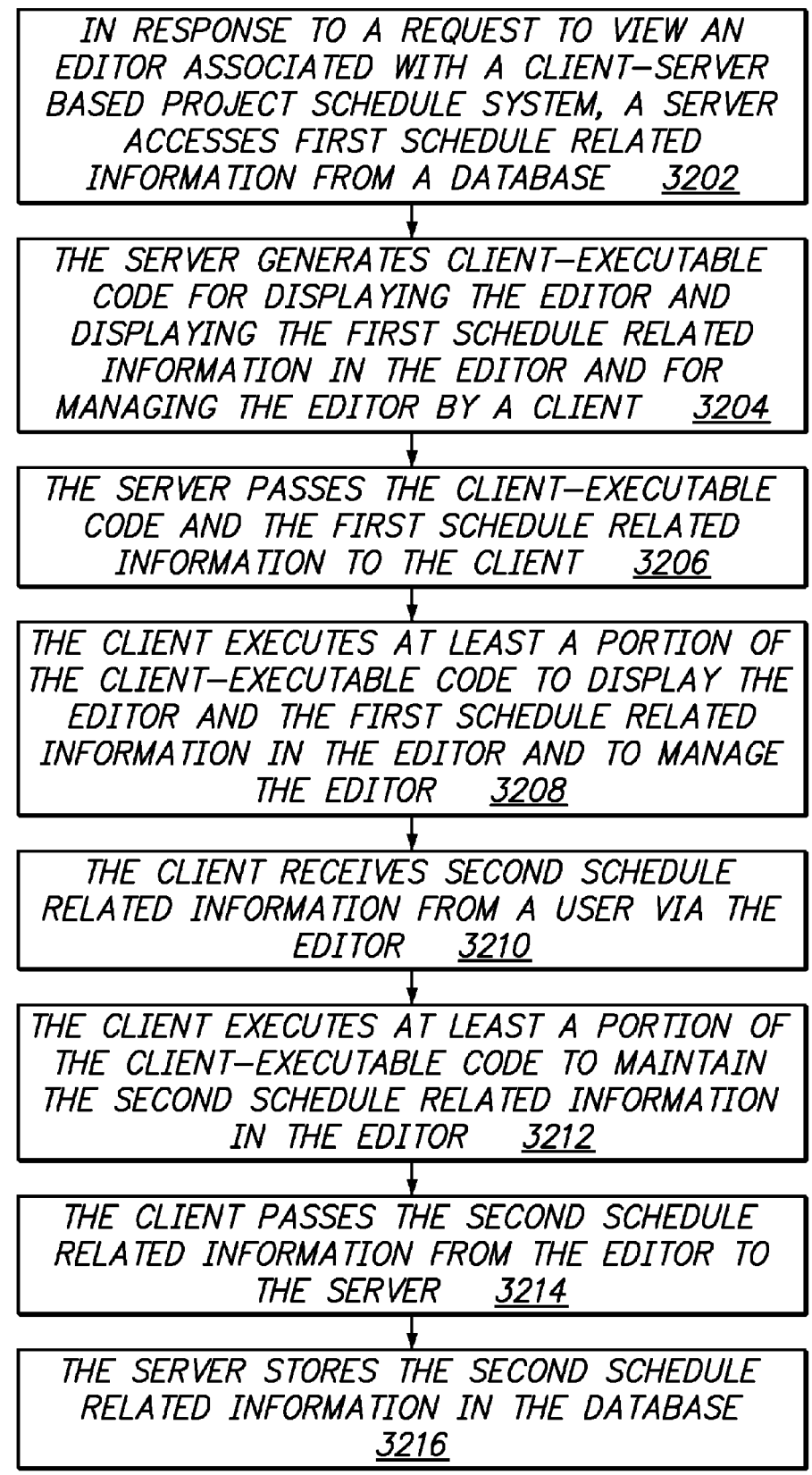
FIG. 32 is a flow diagram illustrating a method for managing a project schedule with a client-server based project schedule management system.

A Method for Managing a Project Schedule with a Client-Server Based Project Schedule System FIG. 32 is a flow diagram illustrating a method for managing a project schedule with a client-server based project schedule management system. An embodiment of the method depicted in FIG. 32 is implemented as a computer and/or machine-implemented method in which a computer or machine performs the method steps, such as by one or more processors executing instructions. For example, the method may be performed on or by a computer system such as computer system 3500 of FIG. 35.

At block 3202, in response to a request to view an editor associated with a client-server based project schedule system, a server accesses first schedule-related information from a database. For example, a user at client processor 602 (FIG. 6) interacts with a user interface to request one of the task assignment editor 102 (FIG. 1A), member schedule editor 302 (FIG. 3A), or project schedule editor 202 (FIG. 2A). In response to the request, server processor 604 (FIG. 6) accesses data from a database, such as data 508 (FIG. 5) from database 506 (FIG. 5) and/or data 536 (FIG. 5) from database 538 (FIG. 5). For example, server processor 604 executes PHP script code to retrieve the appropriate data from the database for populating the requested editor specifically for the requesting user and corresponding project. The data that the server retrieves from the database is specific to the editor that the user requested, and specific to various information input by the user in association with the request, such as the user id and project id. The data that the server retrieves from the database in response to a request for an editor includes initial information, if any, for populating fields in the requested editor.

At block 3204, the server generates client-executable code for execution by the requesting client. This client-executable code generated by the server is for displaying the requested editor at the client, displaying the retrieved information in the appropriate fields of the editor, and for managing the editor at the client. For example, server processor 604 (FIG. 6) executes PHP script code to convert the retrieved data into a format that the client processor 602 (FIG. 6) can use. For example, the client processor 602 does not understand server script code so the server needs to process the retrieved information into a format that the client does understand and can use, such as wrapping the information in JavaScript code executable by the client processor 602. At block 3206, the server passes the client-executable code and the first schedule-related information to the client for execution.

Appendices A, C, and E present example code listings for the respective editors, where the example code listings depict the JavaScript denoted by the <script> tag and the PHP script enclosed within <?php and ?> tag. The editor pages are stored in the server processor 604, such as Web servers 507, 530 (FIG. 5). When the client processor 602, such as a Web browser, accesses the editor pages, the PHP script is executed in the server processor 604 and the entire PHP script is replaced with JavaScript code that the PHP script generates. All the JavaScript code, including that generated by the PHP script, is passed to the client processor 602 for execution.

At block 3208, the client executes the client-executable code, or at least some of such code, in order to display the first schedule-related information in the requested editor and to manage the data and editor, generally. Thus, initial display of the requested editor is now complete, based on the foregoing actions associated with each of the client and server processors.

Once the editor page is loaded at the client by executing the client-executable code (e.g., JavaScript) generated by the server, the user can begin to edit and/or add information associated with the editor. Thus, at block 3210, the client receives second schedule-related information from a user via the editor. For example, depending on the particular editor, the client processor 602 (FIG. 6) receives task assignment information, member schedule information, or project schedule information from a user, which was input via the editor.

At block 3212, the client executes at least some of the client-executable code to manage and/or maintain the second schedule-related information in the editor at the client side. For example, execution of the code creates data structures and associations for managing the new or updated data at the client prior to submission of such data to the server, and provides the functionalities embodied in the editor page objects (e.g., HTML buttons, text entry objects, etc.).

At block 3214, the client passes the second schedule-related information from the editor to the server. Thus, at block 3216, the server stores the second schedule-related information in the database, from which it can be subsequently accessed for passing back to clients in response to requests. For example, schedule-related information may be passed from the server to a client in response to a request for a respective editor page (e.g., FIGS. 1A, 2A, 3A) or a request for a Web page associated with a respective editor (e.g., FIGS. 1B, 2B, 3B).

A Method for Automatic Generation of Database Queries in a Network-Based Project Schedule System FIG. 33 is a flow diagram illustrating a method for automatically generating a database query in a network-based project schedule management system. An embodiment of the method depicted in FIG. 33 is implemented as a computer and/or machine-implemented method in which a computer or machine performs the method steps, such as by one or more processors executing instructions. For example, the method may be performed on or by a computer system such as computer system 3500 of FIG. 35.

At block 3302, in response to a request associated with a particular editor of a network-based project schedule system, a particular query string associated with the particular editor is located. The query string, also referred to herein as a "constant query string" (e.g., FIGS. 27 through 29), contains one or more placeholder strings. The placeholder strings function as placeholders, within the constant query string, for values that are passed in as replacements for the placeholder strings. Thus, each placeholder string identifies the type of value with which the placeholder string is replaced in order to generate a query for submission to a database, such as database 506 and/or database 536. The "type of value" is not referring to a data type but to a variable name corresponding to which a value is used to replace a corresponding placeholder string. Referring to FIGS. 27 and 28 for an example, the placeholder string '%% ProjectNumber %%' is to be replaced with a value for the project number (e.g., the value "J17"); the placeholder string '%% MemberLabel %%' is to be replaced with a value for the label of a project member (e.g., the value "T1"); the placeholder string '%% ProjectTaskID %%' is to be replaced with a value for the id of the project task (e.g., the value "40"), and so on as illustrated in these figures. The constants for the placeholder strings such as C_ProjectNumberKey, C_MemberLabelKey, and C_ProjectTaskIDKey will be used by a string function (e.g., str_replace( ) for PHP) to locate the placeholder strings in the constant query strings to replace the placeholder strings with the appropriate value.

At block 3304, a database query is generated by automatically replacing the one or more placeholder strings in the particular query string with corresponding values. For example, the placeholder string '%% ProjectNumber %%' is replaced with value "J17"; the placeholder string '%% MemberLabel %%' is replaced with the value "T1"; and the placeholder string '%% ProjectTaskID %%' is replaced with the value "40."

As discussed in reference to FIG. 27 and according to an embodiment, the "constant for placeholder strings" are used to search the "constant query string" for any placeholder strings and to replace placeholder strings with a value.

As discussed in reference to FIG. 29 and according to an embodiment, the CXXXDBInterfaceP class and the CYYYDBQueryGeneratorP class, which are associated with server processor 604 (FIG. 6), are used to create the database query at block 3304, where the query generation process may be based on private functions of the CXXXDBInterfaceP class or may be based on public functions of the CYYYDBQueryGeneratorP class. According to an embodiment, the particular query string is assigned to a variable string (e.g., "$loc_sQuery" of FIG. 28) to allow replacement of the placeholder strings while not changing the underlying constant query string which functions as a reusable query template for automatically generating similar database queries for accessioning data from the database.

At block 3306, the automatically generated database query is submitted to the database and, at block 3308, results of the database query are returned in response to the request.

A Method for Managing Tasks in a Project Schedule System

FIG. 34 is a flow diagram illustrating a method for managing tasks in a project schedule management system. An embodiment of the method depicted in FIG. 34 is implemented as a computer and/or machine-implemented method in which a computer or machine performs the method steps, such as by one or more processors executing instructions. For example, the method may be performed on or by a computer system such as computer system 3500 of FIG. 35.

At block 3402, in response to an event that affects a row of a display table of an editor, a class object corresponding to the affected row directly accesses one or more attributes, of the class object, which correspond to elements of an editor associated with a project schedule system. Each row of the display table corresponds to a schedule task associated with a project schedule and displays values corresponding to elements of the editor. Significantly, the class object can directly access the attributes because the elements of the editor are configured as attributes of the class object. Thus, the class object does not have to construct the element id for the affected elements of the affected row and does not have to obtain such elements.

For example, a user edits schedule data for a particular task via the member schedule editor 302 (FIG. 3A). The user edit comprises an event that affects a row in the table of the member schedule editor. A member function of a class (e.g., CMSPreRowDataP1506 of FIG. 15) of the XXXJavaScript 1410 (FIG. 14) for the member schedule editor 302 has direct access to the elements, as attributes of an object of the class, for modifying the properties of the elements as appropriate based on the event. The elements maintain information about the task in the row that can be passed to the server processor when the editor session is completed.

At block 3404, the class object corresponding to the affected row directly manipulates a value for each of the one or more attributes of the class object based on the event. Continuing with the example, a member function of an object of the CMSPreRowDataP1506 class of the XXXJavaScript 1410 for the member schedule editor 302 sets the values of attributes of the object and thereby manipulates the values of elements of the member schedule editor 302.

At block 3406, a client transmits to a server the value for each of the one or more attributes, including the values for the attributes that were manipulated at block 3404. For example, the client processor 602 (FIG. 6), which comprises the XXXJavaScript 1410 for the member schedule editor 302, posts the manipulated data to the server processor 604 (FIG. 6). At block 3408, the server stores the value for each of the one or more attributes in a database. For example, the server processor 604 stores the data back in a database such as databases 506, 536 (FIG. 5). When the editor session is completed, the tasks for which the event on the rows of a table changed, or added information about the tasks, are updated or added to the database.

Design Pattern

"Design Pattern" refers to a general design that addresses a recurring design problem in object-oriented systems. The general design of the member schedule editor is applied to the task assignment editor and project schedule editor. Design Pattern is described in "Design Patterns: Elements of Reusable Object-Oriented Software" by Erich Gamma, et al., published by Addison-Wesley, the content of which is incorporated by reference in its entirety for all purposes as if fully set forth herein. FIGS. 15 to 18 depict the design of the classes of the various packages of the member schedule editor. The design is similarly used in the project schedule editor as shown in FIGS. 19 to 22 and the task assignment editor as shown in FIGS. 23 to 26. Though the characteristics and behavior of the editors differ, the design pattern can be used by all editors in the system. If additional editors are added to the project schedule management system, the effort and work in the design and implementation of the new editors can be greatly reduced by following the design pattern of the existing editors.

FIGS. 36A-36C is a diagram illustrating part of the indexing of Table 7 focusing on the three major packages of the system corresponding to the editors. Each editor has four subpackages as described in FIG. 14. Each of the subpackages has similar class structures to perform their processes. A description of the classes from the different packages helps to illustrate the design pattern of the editors.

Classes CTAPreTaskRowDataP 3602, CPSPreRowDataP 3612, and CMSTaskRowDataP 3622 are parts of their respective XXXPHPPreEdit packages that obtain task information from the database and generate the client code to display the task information in a row in its corresponding editor. CTAPreTaskRowDataP 3602 obtains information about the project tasks and corresponding member tasks and the assignment of the member task to a member. CTAPreTaskRowDataP 3602 generates the client code to display the project task rows and the member task rows with member assignment in the task assignment editor. CPSPreRowDataP 3612 obtains information about the project tasks and corresponding member tasks and the schedule of the tasks. CPSPreRowDataP 3612 generates the client code to display the row for the project task schedules along with corresponding member task schedules in the project schedule editor. CMSTaskRowDataP 3622 obtains information about the member tasks and all detailed tasks (down to level 4 tasks) and the schedule of the tasks. CMSTaskRowDataP 3622 generates the client code to display the rows for the member task schedules along with corresponding detailed task schedules in the member schedule editor. The package XXXPHPPreEdit for each editor uses a class to generate code to display the task row in the editor in the client processor even though the information is different.

Classes CTAjsTableJ 3604, CPSjsTableJ 3614, and the combination of CMSjsTableManagerJ and CMSjsTableJ 3624 are parts of their respective XXXJavaScript packages that create, manage, and maintain the table and rows of a corresponding editor. Since the member schedule editor is relatively more complex (i.e., adding and deleting tasks at different levels, setting actual dates, updating lower level task schedules with higher level task schedules) than the task assignment editor and project schedule editor, two classes are used to manage the table and rows. The components of the table and the type of events that can occur in the table of the editors differ, but can all be represented by one or two classes in the design of the package. The XXXJavaScript packages contain classes corresponding to the different parts of the editors such as table, rows, and cells.

Classes CTAPostUpdaterP 3606, CPSPostUpdaterP 3616, and CMSPostUpdaterP 3626 are parts of their respective XXXPHPPostEdit packages that update the task information in the database with the information passed from the corresponding editor sessions on the client processor. Depending upon the action performed on a task in the editor, the appropriate action is taken to update the information about the task in the database. The type of action varies among the different editors and the details of the action are handled within the design of the class, whereas the overall function of the class is to update the task information in the database. Therefore, the design pattern can be used for posting the information from the editor session to the database for all the editors.

Classes CTAWebManagerP 3608, CPSWebManagerP 3618, and CMSWebManagerP 3628 are parts of their respective XXXWebPageGenerator packages that manage the classes that generate the Web page for the task assignment, project schedule, and member schedule, respectively. CTAWebManagerP 3608 uses various classes to create the Web page with a table showing the project tasks and member tasks, where the member tasks depict the member assigned to the tasks and the tasks' history.

CPSWebManagerP 3618 uses the various classes to create the Web page with a table showing the project task schedule and its member task schedules along with the history of the schedules. CMSWebManagerP 3628 uses the various classes to create the Web page with tables showing the task schedule with its detailed task along with the history of the schedule. The same design pattern is used by all the editors that generate Web pages containing different information.

Classes CTAWebDBInterfaceP 3610, the combination of CPSWebDBInterfaceP and CPSWebDBQueryGeneratorP 3620, and the combination of CMSWebDBInterfaceP and CMSWebDBQueryGeneratorP 3630 are part of respective XXXWebPageGenerator packages that handle the interface with the database, to access task information needed for generating the Web pages for the task assignment, project schedule, and member schedule, respectively. Each class or combination of classes for the editors represents a database interface that generates the database queries and obtains information in response to the queries.

In the description of the classes of the packages of FIG. 36A-36C, classes in the member schedule editor have similar classes in the other editors. Thus, the design pattern used in the member schedule can be used in the other editors. Each of the packages for the editors has different behaviors, however, the same design pattern can still be used.

Appendices

Appendix A includes an example code listing of a Web page for the project schedule editor. The example code listing shows the JavaScript denoted by the <script> tag and the PHP script enclosed within <?php and ?> tag. The Web page is stored in the server processor 604 (FIG. 6), such as Web servers 507, 530 (FIG. 5). When the client processor 602 (FIG. 6), such as a Web browser, accesses the Web page, the PHP script is executed in the server processor 604 and the entire PHP script is replaced with JavaScript code that the PHP script generates. All the JavaScript code, including that generated by the PHP script, is passed to the client processor 602 for execution.

APPENDIX A

```
<!--//////////////////////////////////////////////////////////
//                 Copyright 2006 by Ricoh Corporation
//                        All Rights Reserved
//                    Confidential and Proprietary
////////////////////////////////////////////////////////////
// File:              ProjScheduleEditor.htm
//_____
// Description:      This file is the Web page for the project schedule
//                   editor.
// Author:
// History:
///////////////////////////////////////////////////////////-->
<html>
<head>
    <title>Project Schedule Editor</title>
</head>
<script>
const C_DEBUG = true;
</script>
<script src="ProjectScheduleJavaScript/cPSjsEditorManagerJ.js"></script>
<script src="ProjectScheduleJavaScript/cPSjsTableJ.js"></script>
<script src="ProjectScheduleJavaScript/cPSjsRowJ.js"></script>
<script
<script src="ProjectScheduleJavaScript/cPSjsTaskCellJ.js"></script>
<script src="ProjectScheduleJavaScript/cPSjsDateCellJ.js"></script>
<script src="ProjectScheduleJavaScript/sPSjsProjectTaskInfoJ.js"></script>
<script src="../Common/JavaScriptCommon/debugUtilityJ.js"></script>
<script src="../Common/JavaScriptCommon/dateUtilityJ.js"></script>
<script src="../Common/JavaScriptCommon/editorUtilityJ.js"></script>
<script src="../Common/JavaScriptCommon/errorHandlingUtilityJ.js"></script>
<script
src="../Common/JavaScriptCommon/javaScriptSystemConstants.js"></script>
<script src="../Common/JavaScriptCommon/cDateSelectorJ.js"></script>
<script src="../Common/JavaScriptCommon/calendarUtilityJ.js"></script>
<script>
///////////////////////////////////////////////////////////
// Global Function:  fglo_deleteTask( )
//-------------------------------------------------------------------
// Description:      This function is the event handler for Delete button
//                   that will delete the selected project task and its
//                   member subtasks.
// Input:            None
// Output:           None
// Preconditions:    glo_EditorManager cannot be null.
// Postconditions:   None
// Security:         None
// Algorithm:
//                   1   if preconditions are not met, return.
//                   2   call glo_EditorManager.deleteSelectedTask( ).
///////////////////////////////////////////////////////////
function fglo_deleteTask( )  {
    fglo_PrintDebug("fglo_deleteTasks)");
    if (glo_EditorManager == null)  {
        return;
    }
    glo_EditorManager.deleteSelectedTask( );
}
///////////////////////////////////////////////////////////
// Global Function:  fglo_addTasks( )
//-------------------------------------------------------------------
// Description:      This function is the event handler for the AddXXX button.
//                   This function adds empty task rows to the editor for
//                   the project to add project tasks to the schedule.
// Input:            None
// Output:           None
// Preconditions:    glo_EditorManager cannot be null.
// Postconditions:   None
// Security:         None
// Algorithm:
//                   1   if preconditions are not met, return.
//                   2   if this.name is empty, return
//                   3   call glo_EditorManager.addTasks(this.name).
///////////////////////////////////////////////////////////
function fglo_addTasks( )  {
    fglo_PrintDebug("fglo_addTasks( )");
    if (glo_EditorManager == null)  {
        return;
    }
    if (this.name.length == 0)  {
        return;
```

APPENDIX A-continued

```
    }
        glo_EditorManager.addTasks(this.name);
}
////////////////////////////////////////////////////////////////
// Global Function:   fglo_consolidateSchedule( )
//-------------------------------------------------------------
// Description:       This function is the event handler for Consolidate
//                    button which consolidate the project schedule with the
//                    member schedules and redisplays the project schedule
//                    editor after posting the project schedule.
// Input:             None
// Output:            None
// Preconditions:     glo_EditorManager cannot be null.
// Postconditions:    None
// Security:          None
// Algorithm:
//                    1  if preconditions are not met, return.
//                    2  call glo_EditorManager.consolidateSchedule( ).
////////////////////////////////////////////////////////////////
function fglo_consolidateSchedule( )  {
    fglo_PrintDebug("fglo_consolidateSchedule( )");
    if (glo_EditorManager == null)  {
        return;
    }
    glo_EditorManager.consolidateSchedule( );
}
////////////////////////////////////////////////////////////////
// Global Function:   fglo_submitSchedule( )
//-------------------------------------------------------------
// Description:       This function is the onsubmit event handler when the
//                    Finish or Consolidate button is selected for posting
//                    the project schedule.  This function validates the
//                    schedule.
// Input:             None
// Output:            bool indicating if the task schedule is valid.
// Preconditions:     glo_EditorManager cannot be null.
// Postconditions:    None
// Security:          None
// Algorithm:
//                    1  if preconditions are not met, return false.
//                    2  return glo_EditorManager.submitSchedule( ).
////////////////////////////////////////////////////////////////
function fglo_submitSchedule( )  {
    fglo_PrintDebug("fglo_submitSchedule( )");
    if (glo_EditorManager == null)  {
        return false;
    }
    return glo_EditorManager.submitSchedule( );
}
</script>
<style type="text/css">
<!--
span.label {color:black;width:30;height:16;text-align:center;margin-
top:0;background:#ffF;font:bold 13px Arial}
span.c1 {cursor:hand;color:black;width:30;height:16;text-align:center;margin-
top:0;background:#ffF;font:bold 13px Arial}
span.c2 {cursor:hand;color:red;width:30;height:16;text-align:center;margin-
top:0;background:#ffF;font:bold 13px Arial}
span.c3 {cursor:hand;color:#b0b0b0;width:30;height:16;text-
align:center;margin-top:0;background:#ffF;font:bold 12px Arial}
-->
</style>
<body id="ProjSchedBodyID">
    <p id="WorkingID" align="center"><font size="7">Working ....</font><br>
        <img border="0" src="working.gif" width="59" height="52"><br>
    </p>
    <?php
        include_once("ProjectSchedulePHPPreEdit/cPSPreManagerP.php");
include_once("ProjectSchedulePHPPreEdit/cPSPreInitialDataP.php");
include_once("ProjectSchedulePHPPreEdit/cPSPreTaskRowDataP.php");
include_once("ProjectSchedulePHPPreEdit/cPSPreDBInterfaceP.php");
include_once("ProjectSchedulePHPPreEdit/cPSPreDBQueryGeneratorP.php");
include_once("ProjectSchedulePHPPreEdit/cPSPreJavaScriptInterfaceP.php");
include_once("ProjectSchedulePHPPreEdit/PSPreConstantsP.php");
include_once("../Common/PHPCommon/debugUtilityP.php");
include_once("../Common/PHPCommon/errorHandlingUtilityP.php");
include_once("../Common/PHPCommon/phpSystemConstants.php");
include_once("../Common/PHPCommon/dateUtilityP.php");
include_once("../Common/PHPCommon/cScheduleDBP.php");
////////////////////////////////////////////////////////////////
```

APPENDIX A-continued

```
// Main
//-----------------------------------------------------------------------
// Description:    This function will create the object that will generate
//                 the initial display of the project schedule editor.
// Input:          None
// Output:         None
// Preconditions:  None
// Postconditions: None
// Security:       None
// Algorithm:
//              1  create and assign a CPSPreManagerP object
//                 to $glo__ProjectScheduleManager.
//              2  call createProjectScheduleEditor( ) of
//                 $glo__ProjectScheduleManager.
////////////////////////////////////////////////////////////////////////
fglo__debugPrint("ProjScheduleEditor.htm Main");
fglo__debugPrintVar("$_GET", $_GET);
$glo__ProjectScheduleManager = new CPSPreManagerP( );
$glo__ProjectScheduleManager->createProjectScheduleEditor( );
?>
<p align="center">
    <script type=text/javascript>
////////////////////////////////////////////////////////////////////////
// Main
//-----------------------------------------------------------------------
// Description:    This function removes the working display and displays
//                 the calendar at the bottom of the Web page.
// Input:          None
// Output:         None
// Preconditions:  None
// Postconditions: None
// Security:       None
// Algorithm:
//              1  get the body element and assign it to a local
//                 element loc__BodyElement.
//              2  get the paragraph element containing the working
//                 display and assign it to a local element
//                 loc__ParagraphElement.
//              3  call loc__BodyElement.removeChild( ) with
//                 loc__ParagraphElement passed in.
//              4  call writeCalendar( ).
////////////////////////////////////////////////////////////////////////
var loc__BodyElement = document.getElementById("ProjSchedBodyID");
var loc__ParagraphElement = document.getElementById("WorkingID");
loc__BodyElement.removeChild(loc__ParagraphElement);
writeCalendar( );
    </script>
</p>
</body>
</html>
```

Appendix B includes example JavaScript code generated by the PHP script of Appendix A. The JavaScript code replaces the PHP code in the Web page. The JavaScript code includes task scheduling information obtained from the database. The task information is assigned to a data structure to pass the information to JavaScript for processing (for example, var glo_ProjectTaskInfo=new SPSjsProjectTaskInfo( ) and glo_ProjectTaskInfo.xxx="value"). Also, JavaScript code is generated to create an object and to call the member function of the object to provide the initial display of the project schedule editor (for example, var glo_EditorManager=new CPSjsEditorManagerJ( ), glo_EditorManager.setup_createEditor ("J99"), and glo_EditorManager. setup_addTaskToEditor(glo_ProjectTaskInfo).

APPENDIX B

```
<body id="ProjSchedBodyID">
    <p id="WorkingID" align="center"><font size="7">Working ....</font><br>
        <img border="0" src="working.gif" width="59" height="52"><br>
    </p>
<script>
var glo__TaskOptionList = null;
var glo__EditorManager = new CPSjsEditorManagerJ( );
glo__EditorManager.setup__createEditor("J99");
var loc__UnassignedProjectTaskList = new Array( );
loc__UnassignedProjectTaskList.push("Class Specification");
loc__UnassignedProjectTaskList.push("Implementation and Unit Test Plan");
loc__UnassignedProjectTaskList.push("Iteration 1");
loc__UnassignedProjectTaskList.push("Iteration 2");
loc__UnassignedProjectTaskList.push("Iteration 3");
```

APPENDIX B-continued

```
loc__UnassignedProjectTaskList.push("Planning");
loc__UnassignedProjectTaskList.push("Project Closing Documents");
loc__UnassignedProjectTaskList.push("System Test");
loc__UnassignedProjectTaskList.push("Post Documents");
glo__EditorManager.setup_addUnassignedProjectTasks(loc__UnassignedProjectTaskList
);
var glo__ProjectTaskInfo = new SPSjsProjectTaskInfo( );
glo__ProjectTaskInfo.m__bIsProjectTask = true;
glo__ProjectTaskInfo.m__sMemberLabel = "";
glo__ProjectTaskInfo.m__sTaskName = "Project Preparation";
glo__ProjectTaskInfo.m__sTaskID = "10";
glo__ProjectTaskInfo.m__SetDate = "2006-08-18";
glo__ProjectTaskInfo.m__PlanStart = "2006-08-25";
glo__ProjectTaskInfo.m__PlanEnd = "2006-09-01";
glo__ProjectTaskInfo.m__ActualStart = "2006-08-25";
glo__ProjectTaskInfo.m__ActualEnd = "2006-09-02";
glo__EditorManager.setup_addTaskToEditor(glo__ProjectTaskInfo);
glo__ProjectTaskInfo.reset( );
glo__ProjectTaskInfo.m__bIsProjectTask = false;
glo__ProjectTaskInfo.m__sMemberLabel = "T1";
glo__ProjectTaskInfo.m__sTaskName = "Project Plan";
glo__ProjectTaskInfo.m__sTaskID = "12";
glo__ProjectTaskInfo.m__SetDate = "2006-09-07";
glo__ProjectTaskInfo.m__PlanStart = "2006-08-25";
glo__ProjectTaskInfo.m__PlanEnd = "2006-08-27";
glo__ProjectTaskInfo.m__ActualStart = "2006-08-25";
glo__ProjectTaskInfo.m__ActualEnd = "2006-08-29";
glo__EditorManager.setup_addTaskToEditor(glo__ProjectTaskInfo);
glo__ProjectTaskInfo.reset( );
glo__ProjectTaskInfo.m__bIsProjectTask = true;
glo__ProjectTaskInfo.m__sMemberLabel = "";
glo__ProjectTaskInfo.m__sTaskName = "Requirements";
glo__ProjectTaskInfo.m__sTaskID = "20";
glo__ProjectTaskInfo.m__SetDate = "2007-01-18";
glo__ProjectTaskInfo.m__PlanStart = "2006-09-01";
glo__ProjectTaskInfo.m__PlanEnd = "2006-09-15";
glo__ProjectTaskInfo.m__ActualStart = "2006-08-31";
glo__ProjectTaskInfo.m__ActualEnd = "2006-09-15";
glo__EditorManager.setup_addTaskToEditor(glo__ProjectTaskInfo);
glo__ProjectTaskInfo.reset( );
glo__ProjectTaskInfo.m__bIsProjectTask = false;
glo__ProjectTaskInfo.m__sMemberLabel = "T1";
glo__ProjectTaskInfo.m__sTaskName = "Reqt Doc";
glo__ProjectTaskInfo.m__sTaskID = "22";
glo__ProjectTaskInfo.m__SetDate = "2006-09-08";
glo__ProjectTaskInfo.m__PlanStart = "2006-09-01";
glo__ProjectTaskInfo.m__PlanEnd = "2006-09-09";
glo__ProjectTaskInfo.m__ActualStart = "2006-08-31";
glo__ProjectTaskInfo.m__ActualEnd = "2006-09-08";
glo__EditorManager.setup_addTaskToEditor(glo__ProjectTaskInfo);
glo__ProjectTaskInfo.reset( );
glo__ProjectTaskInfo.m__bIsProjectTask = false;
glo__ProjectTaskInfo.m__sMemberLabel = "T1";
glo__ProjectTaskInfo.m__sTaskName = "Reqt Matrix";
glo__ProjectTaskInfo.m__sTaskID = "32";
glo__ProjectTaskInfo.m__SetDate = "2006-09-11";
glo__ProjectTaskInfo.m__PlanStart = "2006-09-11";
glo__ProjectTaskInfo.m__PlanEnd = "2006-09-15";
glo__ProjectTaskInfo.m__ActualStart = "2006-09-11";
glo__ProjectTaskInfo.m__ActualEnd = "2006-09-15";
glo__EditorManager.setup_addTaskToEditor(glo__ProjectTaskInfo);
glo__ProjectTaskInfo.reset( );
glo__ProjectTaskInfo.m__bIsProjectTask = true;
glo__ProjectTaskInfo.m__sMemberLabel = "";
glo__ProjectTaskInfo.m__sTaskName = "Document Guidelines";
glo__ProjectTaskInfo.m__sTaskID = "30";
glo__ProjectTaskInfo.m__SetDate = "2007-01-22";
glo__ProjectTaskInfo.m__PlanStart = "2006-09-08";
glo__ProjectTaskInfo.m__PlanEnd = "2006-09-11";
glo__ProjectTaskInfo.m__ActualStart = "";
glo__ProjectTaskInfo.m__ActualEnd = "";
glo__EditorManager.setup_addTaskToEditor(glo__ProjectTaskInfo);
glo__ProjectTaskInfo.reset( );
glo__ProjectTaskInfo.m__bIsProjectTask = false;
glo__ProjectTaskInfo.m__sMemberLabel = "T1";
glo__ProjectTaskInfo.m__sTaskName = "Code Conv";
glo__ProjectTaskInfo.m__sTaskID = "42";
glo__ProjectTaskInfo.m__SetDate = "2006-09-08";
glo__ProjectTaskInfo.m__PlanStart = "2006-09-08";
glo__ProjectTaskInfo.m__PlanEnd = "2006-09-11";
```

APPENDIX B-continued

```
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Top Level Design";
glo_ProjectTaskInfo.m_sTaskID = "40";
glo_ProjectTaskInfo.m_SetDate = "2007-01-22";
glo_ProjectTaskInfo.m_PlanStart = "2006-09-08";
glo_ProjectTaskInfo.m_PlanEnd = "2006-09-11";
glo_ProjectTaskInfo.m_ActualStart = "2006-09-07";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = false;
glo_ProjectTaskInfo.m_sMemberLabel = "T1";
glo_ProjectTaskInfo.m_sTaskName = "Major Packages";
glo_ProjectTaskInfo.m_sTaskID = "62";
glo_ProjectTaskInfo.m_SetDate = "2006-09-08";
glo_ProjectTaskInfo.m_PlanStart = "2006-09-08";
glo_ProjectTaskInfo.m_PlanEnd = "2006-09-11";
glo_ProjectTaskInfo.m_ActualStart = "2006-09-07";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Package Design";
glo_ProjectTaskInfo.m_sTaskID = "50";
glo_ProjectTaskInfo.m_SetDate = "2007-01-09";
glo_ProjectTaskInfo.m_PlanStart = "2007-01-10";
glo_ProjectTaskInfo.m_PlanEnd = "";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Class Design";
glo_ProjectTaskInfo.m_sTaskID = "60";
glo_ProjectTaskInfo.m_SetDate = "2007-01-18";
glo_ProjectTaskInfo.m_PlanStart = "2007-01-17";
glo_ProjectTaskInfo.m_PlanEnd = "2007-01-20";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Unit Test Plan";
glo_ProjectTaskInfo.m_sTaskID = "70";
glo_ProjectTaskInfo.m_SetDate = "2007-01-18";
glo_ProjectTaskInfo.m_PlanStart = "2007-01-18";
glo_ProjectTaskInfo.m_PlanEnd = "";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
glo_ProjectTaskInfo.m_bIsProjectTask = true;
glo_ProjectTaskInfo.m_sMemberLabel = "";
glo_ProjectTaskInfo.m_sTaskName = "Implementation";
glo_ProjectTaskInfo.m_sTaskID = "80";
glo_ProjectTaskInfo.m_SetDate = "2007-01-18";
glo_ProjectTaskInfo.m_PlanStart = "2007-02-01";
glo_ProjectTaskInfo.m_PlanEnd = "2007-03-16";
glo_ProjectTaskInfo.m_ActualStart = "";
glo_ProjectTaskInfo.m_ActualEnd = "";
glo_EditorManager.setup_addTaskToEditor(glo_ProjectTaskInfo);
glo_ProjectTaskInfo.reset( );
</script>
<p align="center">
```

The task assignment editor (Appendices C and D) and member schedule editor (Appendices E and F) follows a similar format for its Web page to generate the editor, as shown in Appendices A and B for the project schedule editor.

Appendix C includes an example code listing of a Web page for the task assignment editor. The example code listing shows the JavaScript denoted by the <script> tag and the PHP script enclosed within <?php and ?> tag. The Web page is stored in the server processor 604 (FIG. 6), such as Web servers 507, 530 (FIG. 5). When the client processor 602 (FIG. 6), such as a Web browser, accesses the Web page, the PHP script is executed in the server processor 604 the entire PHP script is replaced with JavaScript code that the PHP script generates. All the JavaScript code, including that generated by the PHP script, is passed to the client processor 602 for execution.

APPENDIX C

```
<!--////////////////////////////////////////////////////////////
//                  Copyright 2006 by Ricoh Corporation
//                       All Rights Reserved
//                    Confidential and Proprietary
//////////////////////////////////////////////////////////////////
// File:             TaskAssignEditor.htm
//_____
// Description:      This file is the Web page for the task assignment
//                   editor.
// Author:
// History:
//////////////////////////////////////////////////////////////////-->
<html>
<head>
   <title>Task Assignment Editor</title>
</head>
<script>
const C_DEBUG = false;
</script>
<script src="TaskAssignmentJavaScript/cTAjsEditorManagerJ.js"></script>
<script src="TaskAssignmentJavaScript/cTAjsTableJ.js"></script>
<script src="TaskAssignmentJavaScript/cTAjsRowJ.js"></script>
<script src="TaskAssignmentJavaScript/cTAjsTaskCellJ.js"></script>
<script src="TaskAssignmentJavaScript/cTAjsAssignmentCellJ.js"></script>
<script src="../Common/JavaScriptCommon/debugUtilityJ.js"></script>
<script src="../Common/JavaScriptCommon/errorHandlingUtilityJ.js"></script>
<script src="../Common/JavaScriptCommon/editorUtilityJ.js"></script>
<script
src="../Common/JavaScriptCommon/javaScriptSystemConstants.js"></script>
<script>
///////////////////////////////////////////////////////////////
// Global Function:  fglo__deleteTask( )
//-----------------------------------------------------------------
// Description:      This function is the event handler for Delete button
//                   that will delete the selected task and its subtasks.
// Input:            None
// Output:           None
// Preconditions:    glo__EditorManager cannot be null.
// Postconditions:   None
// Security:         None
// Algorithm:
//                   1   if preconditions are not met, return.
//                   2   call glo__EditorManager.deleteSelectedTask( ).
///////////////////////////////////////////////////////////////
   function fglo__deleteTask( )   {
       fglo__PrintDebug("fglo__deleteTask( )");
       if (glo__EditorManager == null)   {
           return;
       }
       glo__EditorManager.deleteSelectedTask( );
   }
///////////////////////////////////////////////////////////////
// Global Function:  fglo__addTasks( )
//-----------------------------------------------------------------
// Description:      This function is the event handler for the AddXXX button.
//                   This function adds empty task rows to the editor for
//                   the member to add tasks to the schedule.
// Input:            None
// Output:           None
// Preconditions:    glo__EditorManager cannot be null.
// Postconditions:   None
// Security:         None
// Algorithm:
//                   1   if preconditions are not met, return.
//                   2   if this.name is empty, return
//                   3   call glo__EditorManager.addTasks(this.name).
///////////////////////////////////////////////////////////////
   function fglo__addTasks( )   {
       fglo__PrintDebug("fglo__addTasks( )");
```

APPENDIX C-continued

```
        if (glo_EditorManager == null)   {
            return;
        }
        if (this.name.length == 0) {
            return;
        }
        glo_EditorManager.addTasks(this.name);
    }
////////////////////////////////////////////////////////////////
// Global Function:    fglo_addDetailTasks( )
//------------------------------------------------------------------------
// Description:        This function is the event handler for Add Details
//                     button which adds empty task rows to the editor
//                     corresponding to detailed tasks of the selected task.
// Input:              None
// Output:             None
// Preconditions:      glo_EditorManager cannot be null.
// Postconditions:     None
// Security:           None
//                     Algorithm:
//                     1   if preconditions are not met, return.
//                     2   call glo_EditorManager.addDetailTasks( ).
////////////////////////////////////////////////////////////////
    function fglo_addDetailTasks( )   {
        fglo_PrintDebug("fglo_addDetailTasks( )");
        if (glo_EditorManager == null)   {
            return;
        }
        glo_EditorManager.addDetailTasks( );
    }
////////////////////////////////////////////////////////////////
// Global Function:    fglo_submitAssignment( )
//------------------------------------------------------------------------
// Description:        This function is the onsubmit event handler when the
//                     Finish button is selected for posting the task assignment.
// Input:              None
// Output:             bool indicating if the task assignment is valid.
// Preconditions:      glo_EditorManager cannot be null.
// Postconditions:     None
// Security:           None
// Algorithm:
//                     1   if preconditions are not met, return false.
//                     2   return glo_EditorManager.submitAssignment( ).
////////////////////////////////////////////////////////////////
    function fglo_submitAssignment( )   {
        fglo_PrintDebug("fglo_submitAssignment( )");
        if (glo_EditorManager == null)   {
            return false;
        }
        return glo_EditorManager.submitTaskAssignment( );
    }
</script>
<body id="AssignmentBodyID">
    <p id="WorkingID" align="center"><font size="7">Working ....</font><br>
        <img border="0" src="working.gif" width="59" height="52"><br>
    </p>
<?php
        include_once("TaskAssignmentPHPPreEdit/cTAPreManagerP.php");
include_once("TaskAssignmentPHPPreEdit/cTAPreInitialDataP.php");
include_once("TaskAssignmentPHPPreEdit/cTAPreTaskRowDataP.php");
include_once("TaskAssignmentPHPPreEdit/cTAPreDBInterfaceP.php");
include_once("TaskAssignmentPHPPreEdit/cTAPreJavaScriptInterfaceP.php");
include_once("TaskAssignmentPHPPreEdit/tAPreConstantsP.php");
include_once("../Common/PHPCommon/debugUtilityP.php");
include_once("../Common/PHPCommon/errorHandlingUtilityP.php");
include_once("../Common/PHPCommon/phpSystemConstants.php");
include_once("../Common/PHPCommon/cScheduleDBP.php");
////////////////////////////////////////////////////////////////
// Main
//------------------------------------------------------------------------
// Description:        This function will create the object that will generate
//                     the initial display of the task assignment editor.
// Input:              None
// Output:             None
// Preconditions:      None
// Postconditions:     None
// Security:           None
// Algorithm:
//                     1   create and assign a CTAPreManagerP object
//                         to $glo_TaskAssignmentManager.
```

APPENDIX C-continued

```
//                  2  call createTaskAssignmentEditor( ) of
//                     $glo__TaskAssignmentManager.
//////////////////////////////////////////////////////////////////
        fglo__debugPrint("TaskAssignEditor.htm PHP Main");
        fglo__debugPrintVar("$_GET", $_GET);
        $glo__TaskAssignmentManager = new CTAPreManagerP( );
        $glo__TaskAssignmentManager->createTaskAssignmentEditor( );
?>
    <p align="center">
    <script type=text/javascript>
//////////////////////////////////////////////////////////////////
// Main
//----------------------------------------------------------------
// Description:     This function removes the working display.
// Input:           None
// Output:          None
// Preconditions:   None
// Postconditions:  None
// Security:        None
//                  Algorithm:
//                  1  get the body element and assign it to a local
//                     element loc__BodyElement.
//                  2  get the paragraph element containing the working
//                     display and assign it to a local element
//                     loc__ParagraphElement.
//                  3  call loc__BodyElement.removeChild( ) with
//                     loc__ParagraphElement passed in.
//////////////////////////////////////////////////////////////////
        fglo__PrintDebug("TaskAssignEditor.htm JavaScript Main");
        var loc__BodyElement = document.getElementById("AssignmentBodyID");
        var loc__ParagraphElement = document.getElementById("WorkingID");
        loc__BodyElement.removeChild(loc__ParagraphElement);
    </script>
    </p>
</body>
</html>
```

Appendix D includes example JavaScript code generated by the PHP script of Appendix C. The JavaScript code replaces the PHP code in the Web page. The JavaScript code includes task scheduling information obtained from the database. The task information is passed to JavaScript for processing. Also, JavaScript code is generated to create an object and to call the member function of the object to provide the initial display of the task assignment editor (for example, var glo_EditorManager=new CTAjsEditorManagerJ( ), glo_EditorManager.setup_createEditor("J99"), and glo_EditorManager.setup_addTopLevelTaskToEditor("10", "Project Preparation").

APPENDIX D

```
<body id="AssignmentBodyID">
    <p id="WorkingID" align="center"><font size="7">Working ....</font><br>
       <img border="0" src="working.gif" width="59" height="52"><br>
    </p>
    <h2 align="center">J99 Task Assignment Editor</h2>
<script>
    var glo__TaskList = new Array( );
    var glo__TaskOptionList = new Array( );
    glo__TaskList.push("Class Specification");
    glo__TaskList.push("Implementation and Unit Test Plan");
    glo__TaskList.push("Iteration 1");
    glo__TaskList.push("Iteration 2");
    glo__TaskList.push("Iteration 3");
    glo__TaskList.push("Planning");
    glo__TaskList.push("Project Closing Documents");
    glo__TaskList.push("System Test");
    glo__TaskList.push("Post Documents");
    var glo__MemberList = new Array( );
    glo__MemberList.push("T1");
    glo__MemberList.push("MGR");
    var glo__EditorManager = new CTAjsEditorManagerJ( );
    glo__EditorManager.setup__createEditor("J99");
    glo__EditorManager.setup__addTopLevelTaskToEditor("10", "Project
Preparation");
    glo__EditorManager.setup__addLevelOneTaskToEditor("10", "Project
Initiation", "MGR");
    glo__EditorManager.setup__addLevelOneTaskToEditor("10", "Project Plan",
"MGR");
    glo__EditorManager.setup__addLevelOneTaskToEditor("10", "Resource Plan",
"MGR");
```

APPENDIX D-continued

```
    glo_EditorManager.setup_addTopLevelTaskToEditor("20", "Requirements");
    glo_EditorManager.setup_addLevelOneTaskToEditor("20", "Reqt Doc", "T1");
    glo_EditorManager.setup_addLevelOneTaskToEditor("20", "Reqt Matrix",
"T1");
    glo_EditorManager.setup_addTopLevelTaskToEditor("30", "Document
Guidelines");
    glo_EditorManager.setup_addLevelOneTaskToEditor("30", "Des Doc Guide",
"MGR");
    glo_EditorManager.setup_addLevelOneTaskToEditor("30", "Code Conv", "T1");
    glo_EditorManager.setup_addLevelOneTaskToEditor("30", "Impl Plan Guide",
"T1");
    glo_EditorManager.setup_addTopLevelTaskToEditor("40", "Top Level Design");
    glo_EditorManager.setup_addLevelOneTaskToEditor("40", "Database", "MGR");
    glo_EditorManager.setup_addLevelOneTaskToEditor("40", "Major Interfaces",
"T1");
    glo_EditorManager.setup_addLevelOneTaskToEditor("40", "Major Packages",
"T1");
    glo_EditorManager.setup_addTopLevelTaskToEditor("50", "Package Design");
    glo_EditorManager.setup_addLevelOneTaskToEditor("50", "Task Assignment",
"");
    glo_EditorManager.setup_addTopLevelTaskToEditor("60", "Class Design");
    glo_EditorManager.setup_addLevelOneTaskToEditor("60", "Task Assignment",
"MGR");
    glo_EditorManager.setup_addTopLevelTaskToEditor("70", "Unit Test Plan");
    glo_EditorManager.setup_addLevelOneTaskToEditor("70", "MemberSchedule
Package", "");
    glo_EditorManager.setup_addLevelOneTaskToEditor("70", "ProjectSchedule
Package", "MGR");
    glo_EditorManager.setup_addTopLevelTaskToEditor("80", "Implementation");
    glo_EditorManager.setup_addLevelOneTaskToEditor("80", "Project Schedule",
"");
    glo_EditorManager.setup_addLevelOneTaskToEditor("80", "Task Assignment",
"MGR");
    glo_EditorManager.setup_addLevelOneTaskToEditor("80", "Member Schedule",
"T1");
    glo_EditorManager.setup_addTopLevelTaskToEditor("90", "2nd Iteration");
</script>
```

Appendix E includes an example code listing of a Web page for the member schedule editor. The example code listing shows the JavaScript denoted by the <script> tag and the PHP script enclosed within <?php and ?> tag. The Web page is stored in the server processor 604 (FIG. 6), such as Web servers 507, 530 (FIG. 5). When the client processor 602 (FIG. 6), such as a Web browser, accesses the Web page, the PHP script is executed in the server processor 604 and the entire PHP script is replaced with JavaScript code that the PHP script generates. All the JavaScript code, including that generated by the PHP script, is passed to the client processor 602 for execution.

APPENDIX E

```
<!--////////////////////////////////////////////////////////////
//              Copyright 2006 by Ricoh Corporation
//                    All Rights Reserved
//                Confidential and Proprietary
////////////////////////////////////////////////////////////
// File:        MembScheduleEditor.htm
//
// Description: This file is the Web page for the member schedule
//              editor.
// Author:
// History:
////////////////////////////////////////////////////////////-->
<html>
<head>
    <title>Member Schedule Editor</title>
</head>
<script>
const C_DEBUG = false;
</script>
<script src="MemberScheduleJavaScript/cMSjsEditorManagerJ.js">
</script>
```

APPENDIX E-continued

```
<script src="MemberScheduleJavaScript/cMSjsTableManagerJ.js">
</script>
<script src="MemberScheduleJavaScript/cMSjsTableJ.js"></script>
<script src="MemberScheduleJavaScript/cMSjsRowJ.js"></script>
<script src="MemberScheduleJavaScript/cMSjsTaskCellJ.js"></script>
<script src="MemberScheduleJavaScript/cMSjsDateCellJ.js"></script>
<script src="MemberScheduleJavaScript/sMSjsMemberTaskInfoJ.js">
</script>
<script src="MemberScheduleJavaScript/cMSjsDetailTaskInfoJ.js">
</script>
<script src="../Common/JavaScriptCommon/debugUtilityJ.js"></script>
<script src="../Common/JavaScriptCommon/errorHandlingUtilityJ.js">
</script>
<script src="../Common/JavaScriptCommon/dateUtilityJ.js"></script>
<script src="../Common/JavaScriptCommon/editorUtilityJ.js"></script>
<script
src="../Common/JavaScriptCommon/javaScriptSystemConstants.js">
</script>
<script src="../Common/JavaScriptCommon/cDateSelectorJ.js"></script>
<script src="../Common/JavaScriptCommon/calendarUtilityJ.js"></script>
<script>
////////////////////////////////////////////////////////////
// Global Function: fglo_deleteTask( )
//--------------------------------------------------------
// Description:    This function is the event handler for Delete button
//                 that will delete the selected task and its subtasks.
// Input:          None
// Output:         None
// Preconditions:  glo_EditorManager cannot be null.
// Postconditions: None
// Security:       None
// Algorithm:
//                 1  if preconditions are not met, return.
//                 2  call glo_EditorManager.deleteSelectedTask( ).
////////////////////////////////////////////////////////////
function fglo_deleteTask( ) {
    fglo_PrintDebug("fglo_deleteTask( )");
```

APPENDIX E-continued

```
        if (glo__EditorManager == null)    {
            return;
        }
        glo__EditorManager.deleteSelectedTask( );
}
//////////////////////////////////////////////////////////////
// Global Function:    fglo__addTasks( )
//------------------------------------------------------------
// Description:        This function is the event handler for the AddXXX
//                     button.
//                     This function adds empty task rows to the editor for
//                     the member to add tasks to the schedule.
// Input:              None
// Output:             None
// Preconditions:      glo__EditorManager cannot be null.
// Postconditions:     None
// Security:           None
// Algorithm:
//                     1    if preconditions are not met, return.
//                     2    if this.name is empty, return
//                     3    call glo__EditorManager.addTasks(this.name).
//////////////////////////////////////////////////////////////
function fglo__addTasks( )    {
    fglo__PrintDebug("fglo__addTasks( )");
    if (glo__EditorManager == null)    {
        return;
    }
    if (this.name.length == 0)    {
        return;
    }
    glo__EditorManager.addTasks(this.name);
}
//////////////////////////////////////////////////////////////
// Global Function:    fglo__addDetailTasks( )
//------------------------------------------------------------
// Description:        This function is the event handler for Add Details
//                     button which adds empty task rows to the editor
//                     corresponding to detailed tasks of the selected task.
// Input:              None
// Output:             None
// Preconditions:      glo__EditorManager cannot be null.
// Postconditions:     None
// Security:           None
// Algorithm:
//                     1    if preconditions are not met, return.
//                     2    call glo__EditorManager.addDetailTasks( ).
//////////////////////////////////////////////////////////////
function fglo__addDetailTasks( )    {
    fglo__PrintDebug("fglo__addDetailTasks( )");
    if (glo__EditorManager == null)    {
        return;
    }
    glo__EditorManager.addDetailTasks( );
}
//////////////////////////////////////////////////////////////
// Global Function:    fglo__updateTasks( )
//------------------------------------------------------------
// Description:        This function is the event handler for Update button
//                     which updates all the task rows of the editor such
//                     that the schedules of the tasks are consolidated
//                     with the schedules of its subtasks.
// Input:              None
// Output:             None
// Preconditions:      glo__EditorManager cannot be null.
// Postconditions:     None
// Security:           None
// Algorithm:
//                     1    if preconditions are not met, return.
//                     2    call glo__EditorManager.updateTasks( ).
//////////////////////////////////////////////////////////////
function fglo__updateTasks( )    {
    fglo__PrintDebug("fglo__updateTasks( )");
    if (glo__EditorManager == null)    {
        return;
    }
    glo__EditorManager.updateTasks( );
}
//////////////////////////////////////////////////////////////
// Global Function:    fglo__submitSchedule( )
//------------------------------------------------------------
// Description:        This function is the onsubmit event handler
//                     when the Finish button is selected for posting the
//                     task schedule. This function updates and validates
//                     the schedule.
// Input:              None
// Output:             bool indicating if the task schedule is valid and
//                     could be updated.
// Preconditions:      glo__EditorManager cannot be null.
// Postconditions:     None
// Security:           None
// Algorithm:
//                     1    if preconditions are not met, return false.
//                     2    return glo__EditorManager.submitSchedule( ).
//////////////////////////////////////////////////////////////
function fglo__submitSchedule( )    {
    fglo__PrintDebug("fglo__submitSchedule( )");
    if (glo__EditorManager == null)    {
        return false;
    }
    return glo__EditorManager.submitSchedule( );
}
</script>
<style type="text/css">
<!--
span.label {color:black;width:30;height:16;text-align:center;margin-top:0;background:#ffF;font:bold 13px Arial}
span.c1 {cursor:hand;color:black;width:30;height:16;text-align:center;margin-top:0;background:#ffF;font:bold 13px Arial}
span.c2 {cursor:hand;color:red;width:30;height:16;text-align:center;margin-top:0;background:#ffF;font:bold 13px Arial}
span.c3 {cursor:hand;color:#b0b0b0;width:30;height:16;text-align:center;margin-top:0;background:#ffF;font:bold 12px Arial}
-->
</style>
<body id="MembSchedBodyID">
    <p id="WorkingID" align="center"><font
    size="7">Working . . . .</font><br>
        <img border="0" src="working.gif" width="59"
        height="52"><br>
    </p>
    <?php
        include_once('MemberSchedulePHPPreEdit/
        cMSPreManagerP.php');
        include_once("MemberSchedulePHPPreEdit/cMSPreInitialDataP.php");
        include_once("MemberSchedulePHPPreEdit/cMSPreRowDataP.php");
        include_once("MemberSchedulePHPPreEdit/cMSPreDBInterfaceP.php");
        include_once("MemberSchedulePHPPreEdit/
        cMSPreJavaScriptInterfaceP.php");
        include_once("MemberSchedulePHPPreEdit/MSPreConstantsP.php");
        include_once("../Common/PHPCommon/debugUtilityP.php");
        include_once("../Common/PHPCommon/errorHandlingUtilityP.php");
        include_once("../Common/PHPCommon/phpSystemConstants.php");
        include_once("../Common/PHPCommon/dateUtilityP.php");
        include_once("../Common/PHPCommon/cScheduleDBP.php");
//////////////////////////////////////////////////////////////
// Main
//------------------------------------------------------------
// Description:        This function will create the object that will generate
//                     the initial display of the member schedule editor.
//                     Input: None
// Output:             None
// Preconditions:      None
// Postconditions:     None
// Security:           None
// Algorithm:
//                     1    create and assign a CMSPreManagerP object
//                          to $glo__MemberScheduleManager.
//                     2    call createMemberScheduleEditor( ) of
//                          $glo__MemberScheduleManager.
//////////////////////////////////////////////////////////////
    fglo__debugPrint("MembScheduleEditor.htm Main");
    fglo__debugPrintVar("$_GET", $_GET);
    $glo__MemberScheduleManager = new CMSPreManagerP( );
    $glo__MemberScheduleManager->createMemberScheduleEditor( );
?>
    <p align="center">
        <script type=text/javascript>
//////////////////////////////////////////////////////////////
// Main
//------------------------------------------------------------
```

APPENDIX E-continued

```
// Description:    This function removes the working display
//                 and displays the calendar at the bottom of the
//                 Web page.
// Input:          None
// Output:         None
// Preconditions:  None
// Postconditions: None
// Security:       None
// Algorithm:
//              1  get the body element and assign it to a local
//                 element loc__BodyElement.
//              2  get the paragraph element containing the
//                 working display and assign it to a local element
//                 loc__ParagraphElement.
//              3  call loc__BodyElement.removeChild( ) with
//                 loc__ParagraphElement passed in.
//              4  call writeCalendar( ).
/////////////////////////////////////////////////////////////////////
var loc__BodyElement =
document.getElementById("MembSchedBodyID");
var loc__ParagraphElement = document.getElementById("WorkingID");
loc__BodyElement.removeChild(loc__ParagraphElement);
writeCalendar( );
        </script>
    </p>
</body>
</html>
```

Appendix F includes example JavaScript code generated by the PHP script of Appendix E. The JavaScript code replaces the PHP code in the Web page. The JavaScript code includes task scheduling information obtained from the database. The task information is assigned to a data structure to pass the information to JavaScript for processing (for example, var glo_MemberTaskInfo=SMSjsMemberTaskInfoJ( ) and glo_MemberTaskInfo.xxx="value"). Also, JavaScript code is generated to create an object and to call the member function of the object to provide the initial display of the member schedule editor (for example, var glo_EditorManager=new CMSjsEditorManagerJ( ), glo_EditorManager.setup_createEditor("J99", "test1"), and glo_EditorManager.setup_addTaskToEditor(glo_MemberTaskInfo).

APPENDIX F

```
<body id="MembSchedBodyID">
    <p id="WorkingID" align="center"><font
    size="7">Working....</font><br>
        <img border="0" src="working.gif" width="59"
        height="52"><br>
    </p>
    <h2 align="center">test1's J99 Schedule</h2>
<script>
    var glo__TaskOptionList = null;
    var glo__EditorManager = new CMSjsEditorManagerJ( );
    glo__EditorManager.setup__createEditor("J99", "test1");
    var loc__MemberTaskNameList = new Array( );
    loc__MemberTaskNameList.push("Impl Plan Guide");
    glo__EditorManager.setup__addUnscheduledTasks(30,
"Document Guidelines", loc__MemberTaskNameList);
    loc__MemberTaskNameList.splice(0, 1);
    loc__MemberTaskNameList.push("Major Interfaces");
    glo__EditorManager.setup__addUnscheduledTasks(40,
"Top Level Design", loc__MemberTaskNameList);
    loc__MemberTaskNameList.splice(0, 1);
    loc__MemberTaskNameList.push("Member Schedule");
    glo__EditorManager.setup__addUnscheduledTasks(80,
"Implementation", loc__MemberTaskNameList);
    loc__MemberTaskNameList.splice(0, 1);
    var glo__MemberTaskInfo = new SMSjsMemberTaskInfoJ( );
    glo__MemberTaskInfo.m__nTaskLevel = 1;
    glo__MemberTaskInfo.m__nParentTaskID = 30;
```

APPENDIX F-continued

```
    glo__MemberTaskInfo.m__nTaskID = 42;
    glo__MemberTaskInfo.m__sTaskName = "Code Conv";
    glo__MemberTaskInfo.m__SetDate = "2006-09-08";
    glo__MemberTaskInfo.m__PlanStart = "2006-09-08";
    glo__MemberTaskInfo.m__PlanEnd = "2006-09-11";
    glo__MemberTaskInfo.m__ActualStart = "2006-09-08";
    glo__MemberTaskInfo.m__ActualEnd = "";
    glo__MemberTaskInfo.m__nRev = 1;
    glo__EditorManager.setup__addTaskToEditor(glo__MemberTaskInfo);
    glo__MemberTaskInfo.reset( );
    glo__MemberTaskInfo.m__nTaskLevel = 2;
    glo__MemberTaskInfo.m__nParentTaskID = 42;
    glo__MemberTaskInfo.m__nTaskID = 32;
    glo__MemberTaskInfo.m__sTaskName = "draft";
    glo__MemberTaskInfo.m__SetDate = "2006-09-08";
    glo__MemberTaskInfo.m__PlanStart = "2006-09-11";
    glo__MemberTaskInfo.m__PlanEnd = "2006-09-13";
    glo__MemberTaskInfo.m__ActualStart = "";
    glo__MemberTaskInfo.m__ActualEnd = "";
    glo__MemberTaskInfo.m__nRev = 1;
    glo__EditorManager.setup__addTaskToEditor(glo__MemberTaskInfo);
    glo__MemberTaskInfo.reset( );
    glo__MemberTaskInfo.m__nTaskLevel = 2;
    glo__MemberTaskInfo.m__nParentTaskID = 42;
    glo__MemberTaskInfo.m__nTaskID = 42;
    glo__MemberTaskInfo.m__sTaskName = "review/inspection";
    glo__MemberTaskInfo.m__SetDate = "2006-09-08";
    glo__MemberTaskInfo.m__PlanStart = "2006-09-14";
    glo__MemberTaskInfo.m__PlanEnd = "2006-09-15";
    glo__MemberTaskInfo.m__ActualStart = "";
    glo__MemberTaskInfo.m__ActualEnd = "";
    glo__MemberTaskInfo.m__nRev = 1;
    glo__EditorManager.setup__addTaskToEditor(glo__MemberTaskInfo);
    glo__MemberTaskInfo.reset( );
    glo__MemberTaskInfo.m__nTaskLevel = 1;
    glo__MemberTaskInfo.m__nParentTaskID = 40;
    glo__MemberTaskInfo.m__nTaskID = 62;
    glo__MemberTaskInfo.m__sTaskName = "Major Packages";
    glo__MemberTaskInfo.m__SetDate = "2006-09-08";
    glo__MemberTaskInfo.m__PlanStart = "2006-09-08";
    glo__MemberTaskInfo.m__PlanEnd = "2006-09-11";
    glo__MemberTaskInfo.m__ActualStart = "2006-09-07";
    glo__MemberTaskInfo.m__ActualEnd = "";
    glo__MemberTaskInfo.m__nRev = 2;
    glo__EditorManager.setup__addTaskToEditor(glo__MemberTaskInfo);
    glo__MemberTaskInfo.reset( );
    glo__MemberTaskInfo.m__nTaskLevel = 2;
    glo__MemberTaskInfo.m__nParentTaskID = 62;
    glo__MemberTaskInfo.m__nTaskID = 92;
    glo__MemberTaskInfo.m__sTaskName = "Component";
    glo__MemberTaskInfo.m__SetDate = "2006-09-08";
    glo__MemberTaskInfo.m__PlanStart = "2006-09-08";
    glo__MemberTaskInfo.m__PlanEnd = "2006-09-11";
    glo__MemberTaskInfo.m__ActualStart = "2006-09-07";
    glo__MemberTaskInfo.m__ActualEnd = "";
    glo__MemberTaskInfo.m__nRev = 2;
    glo__EditorManager.setup__addTaskToEditor(glo__MemberTaskInfo);
    glo__MemberTaskInfo.reset( );
    glo__MemberTaskInfo.m__nTaskLevel = 3;
    glo__MemberTaskInfo.m__nParentTaskID = 92;
    glo__MemberTaskInfo.m__nTaskID = 12;
    glo__MemberTaskInfo.m__sTaskName = "Interfaces";
    glo__MemberTaskInfo.m__SetDate = "2006-09-08";
    glo__MemberTaskInfo.m__PlanStart = "2006-09-08";
    glo__MemberTaskInfo.m__PlanEnd = "2006-09-11";
    glo__MemberTaskInfo.m__ActualStart = "2006-09-07";
    glo__MemberTaskInfo.m__ActualEnd = "";
    glo__MemberTaskInfo.m__nRev = 2;
    glo__EditorManager.setup__addTaskToEditor(glo__MemberTaskInfo);
    glo__MemberTaskInfo.reset( );
    glo__MemberTaskInfo.m__nTaskLevel = 4;
    glo__MemberTaskInfo.m__nParentTaskID = 12;
    glo__MemberTaskInfo.m__nTaskID = 12;
    glo__MemberTaskInfo.m__sTaskName = "Structures";
    glo__MemberTaskInfo.m__SetDate = "2006-09-07";
    glo__MemberTaskInfo.m__PlanStart = "2006-09-08";
    glo__MemberTaskInfo.m__PlanEnd = "2006-09-10";
    glo__MemberTaskInfo.m__ActualStart = "2006-09-08";
    glo__MemberTaskInfo.m__ActualEnd = "";
    glo__MemberTaskInfo.m__nRev = 1;
```

APPENDIX F-continued

```
    glo__EditorManager.setup__addTaskToEditor(glo__MemberTaskInfo);
    glo__MemberTaskInfo.reset( );
    glo__MemberTaskInfo.m__nTaskLevel = 4;
    glo__MemberTaskInfo.m__nParentTaskID = 12;
    glo__MemberTaskInfo.m__nTaskID = 22;
    glo__MemberTaskInfo.m__sTaskName = "Drawings";
    glo__MemberTaskInfo.m__SetDate = "2006-09-08";
    glo__MemberTaskInfo.m__PlanStart = "2006-09-08";
    glo__MemberTaskInfo.m__PlanEnd = "2006-09-11";
    glo__MemberTaskInfo.m__ActualStart = "2006-09-07";
    glo__MemberTaskInfo.m__ActualEnd = "";
    glo__MemberTaskInfo.m__nRev = 1;
    glo__EditorManager.setup__addTaskToEditor(glo__MemberTaskInfo);
    glo__MemberTaskInfo.reset( );
    glo__MemberTaskInfo.m__nTaskLevel = 1;
    glo__MemberTaskInfo.m__nParentTaskID = 20;
    glo__MemberTaskInfo.m__nTaskID = 32;
    glo__MemberTaskInfo.m__sTaskName = "Reqt Matrix";
    glo__MemberTaskInfo.m__SetDate = "2006-09-11";
    glo__MemberTaskInfo.m__PlanStart = "2006-09-11";
    glo__MemberTaskInfo.m__PlanEnd = "2006-09-15";
    glo__MemberTaskInfo.m__ActualStart = "2006-09-11";
    glo__MemberTaskInfo.m__ActualEnd = "2006-09-15";
    glo__MemberTaskInfo.m__nRev = 3;
    glo__EditorManager.setup__addTaskToEditor(glo__MemberTaskInfo);
    glo__MemberTaskInfo.reset( );
</script>
```

Providing Graceful Termination of an Interpretable Script Code Executing in a Client Browser Window The scripted code may be programmed in JavaScript or other script languages such as JScript and ECMAScript. Originally defined by Netscape, JavaScript is an interpreted language which is processed "on-the-fly" by the Web browser add-in components. Various open source versions of JavaScript are widely available. Embodiments are not limited to JavaScript as defined by Netscape or as that term is ordinarily used. Thus, as used herein, the term JavaScript refers broadly to any script-based programming language and not just JavaScript from Netscape, including JScript, ECMAScript, etc.

In an embodiment, a Web browser enabled client requests Web pages for a project task editor from a Web server. The Web server returns an HTML Web page containing embedded JavaScript included with the Web page or generated by the Web server which will display a task editor containing task information when the JavaScript is executed by the client. The Web page also contains JavaScript code for classes, global functions, and constants that are used by the Web enabled client to create, manage, and maintain the task editor. The JavaScript code may be included with the Web page or generated in the Web page by the Web server. When the Web enabled client receives the Web page for the editor, the client processor executes the JavaScript code generated by the Web server for the initial display of the task editor.

The JavaScript code creates objects corresponding to the classes included by the Web page and calls the member functions of the classes along with calling the global functions to display and manage the task editor. The JavaScript code is enclosed within a Try block of the JavaScript Try and Catch Block statement to handle abnormal conditions during the execution of the JavaScript code.

The use of Try and Catch Block statements along with throwing an exception in the JavaScript code to handle the abnormal condition allows for the graceful termination of JavaScript code executing on the Web browser enabled client. Other possible solutions to handle abnormal conditions during the creation, management, and execution of the task editor on the Web browser enabled client include having a global function redirect to a new Web page that displays a message about the editor session. The global functions may also be useful for debugging purposes to display a message indicating the location of the abnormal condition which may include the filename, the line number, the class, and/or the name of the function that called the global function. Thus, the JavaScript may be modified to identify, for diagnostic purposes, the location where the global function is called.

FIG. 5 depicts an example client-server operating environment for implementation of a project management system. The example operating environment comprises a plurality of workstations, one or more Web servers, and one or more associated databases, which are all connected directly or indirectly to a communications network.

Generally, Web servers 507, 530 comprise resources for the display and management of the editors. The Web servers 507, 530 interact with databases 506, 536, respectively, to store, maintain, and manage task assignment and task schedule information, represented by data 508, 538. For clarity, two Web servers and two databases are shown in FIG. 5, but in other embodiments, any number of Web servers and databases can be used. Web browsers on computer workstations 501, 502 access the resources on the Web servers 507, 530 to display the editors. Project members or managers can access the editors over the network 500 (LAN or WAN). The project task management system can be used to manage projects at different levels within an organization, e.g., at project, department, division, and organization levels.

Workstations 501, 502 are clients of the Web servers 507, 530. In an embodiment, workstations 501, 502 are typically computer systems configured with one or more Web browsers, and are utilized, for example, by the engineers/developers to complete tasks associated with a product development project. Example tasks include initiating projects, preparing and maintaining task schedules, designing software architecture, creating specifications, creating software code, implementing and testing software code, inspecting various task products, etc. The project managers utilize workstations 501, 502 for accessing information to review and manage the progress of the project. The developers and managers transmit communications through the network 500 to the other connected components, e.g., Web servers 507, 530; databases 506, 536; and handheld device 520 and laptop 522, via access point(s) 524.

The workstations 501, 502, handheld devices 520, and laptop 522, which can access the Web pages from the Web servers 507, 530, can process JavaScript code that is embedded in the Web pages to manage task editors and other applications included in the browsers. The browsers process JavaScript using browser add-in components. Examples of common browser add-in components include ActiveX Controls, browser extensions and browser helper objects. In most common browser configurations, a JavaScript add-in component is provided which allows the Web browsers installed in each of the workstations 501, 502 to process JavaScript received from the Web servers 507, 530.

The Web servers 507, 530 are configured with a combination of computer hardware and software implementing Hypertext Transfer Protocol [HTTP] and Transmission Control Protocol/Internet Protocol [TCP/IP]). Web servers 507, 530 serve the files that form Web pages (e.g., Hypertext Markup Language [HTML] or Extensible Markup Language [XML] files), to users, such as developers or managers at a workstation 501, 502. For example, an Apache Web server, which contains modules for the execution of PHP, Visual Basic Script or Ruby scripts, may be used as the Web server application for the Web server 507 and 530. A non-scripting object oriented language such as C, C++, C#, Java, CORBA, PERL, AWK, or Visual Basic may be used.

In general, the information exchanged and managed is served by the Web servers 507, 530 over the network 500. The databases 506, 536 may be programmed in any convenient relational database language, by way of example and not limitation, ORACLE, Sequel Server, MySQL, SQL, MS ACCESS, DB2, MS FOXBASE, DBASE, PostgreSQL and RBASE.

Additional aspects of the programmatic techniques described herein may be implemented and executed on the Web servers 507, 530, although these techniques are not limited to such an implementation. The techniques could also be implemented on any other processing system, such as workstations 501, 502 or a similarly configured computer system as illustrated in FIG. 35.

Databases 506, 536 represent example databases for storing data 508, 538 related to the development project, thus providing access to the information by authorized individuals at workstations 501, 502, through queries transmitted over the network 500. The type of data stored on databases 506, 536 may vary in different embodiments. Example data includes project initiation forms, member and project task schedules, specifications, software code, inspection reports, Web page files, and document directories and indexes.

In an embodiment, network 500 is a packet-switched network for facilitating the exchange of information between and among various connected components, such as workstations 501, 502, Web servers 507, 530, and databases 506, 536. The network 500 may be a Local Area Network (LAN), such as an Ethernet, Fast Ethernet, a token ring, or wireless LAN such as specified IEEE standards 802.11a and 802.11b. In addition, network 500 may also be a Wide Area Network (WAN) over one or more internetworks for facilitating communication with remote users through a Virtual Private Network (VPN), or the network 500 may represent a combination of a LAN and a WAN. In addition, network 500 can be formed using a variety of different media, including but not limited electrical, wire or cable, optical, or wireless connections.

Figure 37:
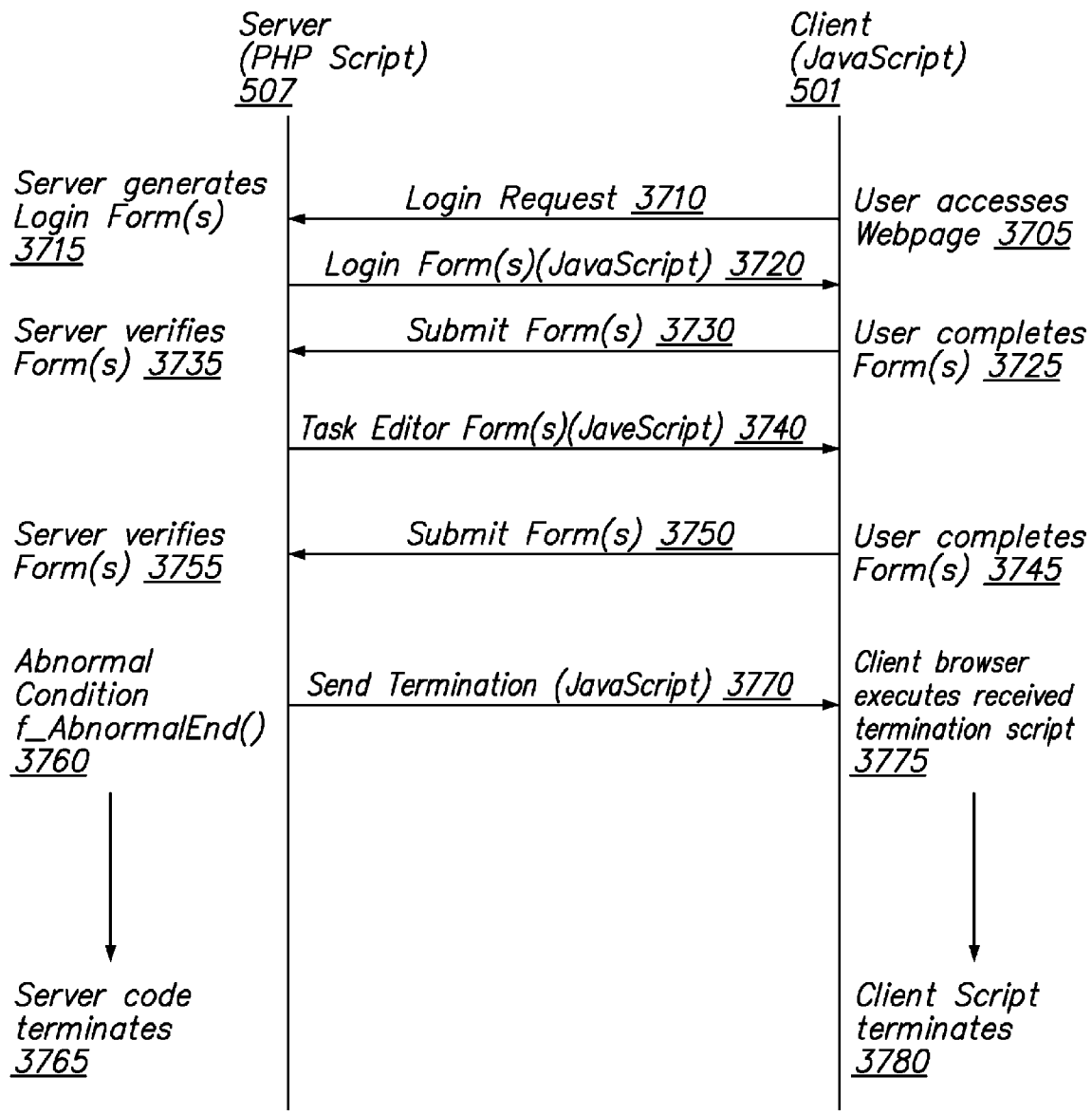
FIG. 37 depicts a server evaluating server side code and received information from a Web enabled client for abnormal conditions.

FIG. 37 depicts a server evaluating server side code and received information from a Web enabled client for abnormal conditions. In the approach of FIG. 37 a Web server 507 evaluates server side code and received information from a Web enabled client 501 for abnormal conditions. In an embodiment, a user at one of the Web enabled clients 501, 502 accesses via the Web enabled client 501 a Webpage 3705 associated with a project management system. Generally, accessing a Webpage is accomplished by the user directing the Web browser of the client to a universal resource locator (URL) address assigned to the project management system on the Web server 507. The user interacts with a displayed login page found at the URL of the project management system and generates a login request at operation 3710.

In an embodiment, the Web server 507 generates one or more login forms at operation 3715 containing JavaScript code which are then sent at operation 3720 to the Web browser of the requesting client 501. The JavaScript code may be included with the Web page containing the forms or generated by the Web server. The user completes the login forms at operation 3725 which are then submitted at operation 3730 to the Web server 507 for access approval. If access to the project management system is allowed, the Web server 507 generates and sends one or more forms associated with a task editor at operation 3740 to the requesting Web enabled client 501.

The Web server will pass the HTML Web page that includes JavaScript code along with Web server generated JavaScript code that will be executed on the client-side Web browser to display a task editor. The Web server will update a project management system 508, 536 database(s) with information entered in the task editor when it is submitted by the client-side Web browser and will create a Web page for task information. The programming language executed by the Web servers 507, 530 can be PHP script but any language can be used that can be executed by the Web server such as Perl or Ruby. Execution of the Web server code occurs generally in two main Web pages; one for generating and displaying the task editor on the client-side Web browser and the other for submitting the task editor session information received from the client-side Web browser.

At any point hereinafter, if an abnormal condition at operation 3760 is determined in the code executing on the Web server 507, then a global function is called which generates a termination JavaScript at operation 3770 which is sent to the client Web browser 501 and the executing server code is terminated at operation 3765.

In an embodiment, a window of the Web browser associated with the Web server encountering the abnormal condition is cleared, and information is displayed in the window which includes information useful in debugging the fault which caused the abnormal condition. For example, a filename, line number, class, and/or name of a function that called the global function.

If an abnormal condition is not found, the Web page for the task editor forms containing JavaScript code generated by the Web server are sent to the client of the Web browser at operation 3740 establishing the task editor session.

An abnormal condition at operation 3775 causes the Web browser of the client to terminate the current task editor session at operation 3780 with the Web server 507, clears the currently displayed Web page in the client-side browser window and displays a Web page in the client-side browser window which informs the user that the task editor session has terminated due to an abnormal condition.

If the script for the task editor executes without an abnormal condition, the user enters task editor information into the received forms at operation 3745 and submits the form(s) at operation 3750 to the Web server 507. The Web server 507 again verifies the received information from the Web enabled client and executing server code to ensure that an abnormal condition has not occurred. If no abnormal conditions have occurred on either Web server 507 or client 501, processing ends normally.

An example global function written in PHP to generate JavaScript code to be executed by the client-side browser and terminate execution of the PHP code on the Web server is provided in TABLE 8.

TABLE 8

EXAMPLE GLOBAL FUNCTION TO TERMINATE EXECUTION
PHP Code Listing - global function for graceful termination on server and client processor.

```
//////////////////////////////////////////////////////////////
// Global Function:   fglo_abnormalEnd($in_sMessage=C_ErrHndlUtil_DefaultErrorMessage)
// Description:       This function writes out the JavaScript interface to
//                    clear the Web browser window and to display the input
```

TABLE 8-continued

EXAMPLE GLOBAL FUNCTION TO TERMINATE EXECUTION
PHP Code Listing - global function for graceful termination on server and client processor.

```
//                        message in the Web browser before exiting the system.
//                        This function should be called to clear the Web
//                        browser when a non-recoverable error condition is
//                        encountered.
// Input:                 String for the message.
// Output:                None.  Input message is displayed in window.
// Preconditions:         None
// Postconditions:        None
// Security:              None
// Algorithm:
//              1  initialize $loc_sMessage to empty string.
//              2  if $in_sMessage is not empty,
//                 2.1  $loc_sMessage = str_replace(C_ErrHndlUtil_MessageKey,
//                         $in_sMessage, C_ErrHndlUtil_MessageFormat)
//              3  else
//                 3.1  $loc_sMessage = str_replace(C_ErrHndlUtil_MessageKey,
//                         C_ErrHndlUtil_DefaultErrorMessage, C_ErrHndlUtil_MessageFormat)
//              4  echo "<script>\n"
//              5  echo "  var loc_BodyArray = document.getElementsByTagName
//                   (\"body\");\n"
//              6  echo "  for (loc_iBodyIndex = 0; loc_iBodyIndex <
//                   loc_BodyArray.length; loc_iBodyIndex++)   {\n"
//              7  echo "      loc_NodeArray = loc_BodyArray[loc_iBodyIndex].
//                   childNodes;\n"
//              8  echo "      for (loc_iNodeIndex = loc_NodeArray.length-1;
//                   loc_iNodeIndex >= 0; loc_iNodeIndex--)   {\n"
//              9  echo "          loc_BodyArray[loc_iBodyIndex].removeChild
//                   (loc_NodeArray[loc_iNodeIndex]);\n"
//              10 echo "      }\n"
//              11 echo "  }\n"
//              12 echo "  document.writeln(\"$loc_sMessage\");\n"
//              13 echo "</script>\n"
//              14 call die( )
/////////////////////////////////////////////////////////////////
function fglo_abnormalEnd($in_sMessage=C_ErrHndlUtil_DefaultErrorMessage)   {
    $loc_sMessage = "";
    if (!empty($in_sMessage)) {
        $loc_sMessage = str_replace(C_ErrHndlUtil_MessageKey, $in_sMessage,
C_ErrHndlUtil_MessageFormat);
    } else {
        $loc_sMessage = str_replace(C_ErrHndlUtil_MessageKey, C_ErrHndlUtil_DefaultErrorMessage,
C_ErrHndlUtil_MessageFormat);
    }
    echo "<script>\n";
    echo "  var loc_BodyArray = document.getElementsByTagName(\"body\");\n";
    echo "  for (loc_iBodyIndex = 0; loc_iBodyIndex < loc_BodyArray.length; loc_iBodyIndex++)
{\n";
    echo "      loc_NodeArray = loc_BodyArray[loc_iBodyIndex].childNodes;\n";
    echo "      for (loc_iNodeIndex = loc_NodeArray.length-1; loc_iNodeIndex >= 0;
loc_iNodeIndex--) {\n";
    echo "          
loc_BodyArray[loc_iBodyIndex].removeChild(loc_NodeArray[loc_iNodeIndex]);\n";
    echo "      }\n";
    echo "  }\n";
    echo "  document.writeln(\"$loc_sMessage\");\n";
    echo "</script>\n";
    die( );
}
```

The code writes out JavaScript code that clears the browser window and displays a message in the browser before stopping the execution of PHP.

An example PHP code to determine if an abnormal condition has occurred in various PHP code modules is provided in TABLE 9.

TABLE 9

EXAMPLE PHP CODE TO DETERMINE ABNORMAL CONDITION
PHP Code Listing - the use of the global function fglo_abnormalEnd( ) by functions of various classes

```
Listing 1 - Unexpected input values, object creation failure, access failure, and invalid data all
result in termination. Function shows the use of debug messages.
/////////////////////////////////////////////////////////////////
// Public Function:    initializeDBInterface($in_sProjectNumber)
// Description:        This function initializes access to the database to
```

TABLE 9-continued

EXAMPLE PHP CODE TO DETERMINE ABNORMAL CONDITION
PHP Code Listing - the use of the global function fglo_abnormalEnd( ) by functions of various classes

```
//                      obtain and update information in the database. This
//                      function also obtains the highest project task id
//                      corresponding to the project number.
// Input:               String for the project number.
// Output:              bool indicating if initialization was successful.
// Preconditions:       Input string cannot be empty.
// Postconditions:      Object created for attribute member cannot be NULL.
// Security:            SQL Injection
// Algorithm:
//                   1  if preconditions are not met, call fglo_abnormalEnd( ).
//                   2  create and assign a CScheduleDBP object to $m_ScheduleDB.
//                   3  if $m_ScheduleDB is NULL, call fglo_abnormalEnd( ).
//                   4  if open( ) of $m_ScheduleDB returns false,
//                      call fglo_abnormalEnd( ).
//                   5  if $in_sProjectNumber does not match the regular
//                      expression C_PROJECTNUMREGEX, call fglo_abnormalEnd( ).
//                      Note: this is protection against SQL injection.
//                   6  create and assign a CPSPostDBQueryGeneratorP
//                      object to $m_PostDBQueryGenerator with
//                      $in_sProjectNumber passed in.
//                   7  if $m_PostDBQueryGenerator is NULL, call fglo_abnormalEnd( ).
//                   8  call obtainQueryToObtainHighestProjectTaskID( ) of
//                      $m_PostDBQueryGenerator and assign value returned
//                      to local string $loc_sQuery.
//                   9  if query( ) of $m_ScheduleDB with $loc_sQuery
//                      passed in returns false, call fglo_abnormalEnd( ).
//                  10  create and assign local array to $loc_QueryRecord.
//                  11  if obtainRecord( ) of $m_ScheduleDB with
//                      $loc_QueryRecord passed in returns true,
//                      $m_nHighestProjectTaskID =
//                      $loc_QueryRecord[C_Post_MaxProjectTaskIdIndex]
//                  12  else $m_nHighestProjectTaskID = 0
//                  13  return true.
////////////////////////////////////////////////////////////
public function initializeDBInterface($in_sProjectNumber)   {
   fglo_debugPrint("CPSPostDBInterfaceP::initializeDBInterface( )");
   // Test Preconditions
   if (empty($in_sProjectNumber)) {
      if (C_DEBUG) {
         fglo_abnormalEnd("CPSPostDBInterfaceP::initializeDBInterface( ) – Precondition
Fialed");
      } else {
         fglo_abnormalEnd( );
      }
   }
   // Object creation
   $this->m_ScheduleDB = new CScheduleDBP( );
   if ($this->m_ScheduleDB == null) {
      if (C_DEBUG) {
         fglo_abnormalEnd("CPSPostDBInterfaceP::initializeDBInterface( ) – CScheduleDB cannot
be created");
      } else {
         fglo_abnormalEnd( );
      }
   }
   // Object access
   if (! $this->m_ScheduleDB->open( )) {
      if (C_DEBUG) {
         fglo_abnormalEnd("CPSPostDBInterfaceP::initializeDBInterface( ) – Database cannot be
opened");
      } else {
         fglo_abnormalEnd( );
      }
   }
   // SQL Injection
   if (!preg_match(C_PROJECTNUMREGEX, $in_sProjectNumber)) {
      if (C_DEBUG) {
         fglo_abnormalEnd("CPSPostDBInterfaceP::initializeDBInterface( ) – SQL Injection for
Project Number");
      } else {
         fglo_abnormalEnd( );
      }
   }
   // Object creation
   $this->m_PostDBQueryGenerator = new CPSPostDBQueryGenerator($in_sProjectNumber);
   if ($this->m_PostDBQueryGenerator == null) {
```

TABLE 9-continued

EXAMPLE PHP CODE TO DETERMINE ABNORMAL CONDITION
PHP Code Listing - the use of the global function fglo_abnormalEnd( ) by functions of various classes

```
      if (C_DEBUG) {
         fglo_abnormalEnd("CPSPostDBInterface::initializeDBInterface( ) –
CPSPostDBQueryGenereator cannot be created");
      } else {
         fglo_abnormalEnd( );
      }
   }
   // DB access
   $loc_sQuery = $this->m_PostDBQueryGenerator->obtainQueryToObtainHighestProjectTaskID( );
   if (! $this->m_ScheduleDB->query($loc_sQuery)) {
      if (C_DEBUG) {
         fglo_abnormalEnd("CPSPostDBInterface::initializeDBInterface( ) – DB Query Failed");
      } else {
         fglo_abnormalEnd( );
      }
   }
   $loc_QueryRecord = array( );
   if ($this->m_ScheduleDB->obtainRecord($loc_QueryRecord)) {
      $this->m_nHighestProjectTaskID = (int)$loc_QueryRecord[C_Post_MaxProjectTaskIdIndex];
   } else {
      $this->m_nHighestProjectTaskID = 0;
   }
   return true;
}
Listing 2 - Object creation failure and process failure all result in termination.
/////////////////////////////////////////////////////////////////////
// Main
//-------------------------------------------------------------------
// Description:    This function will create the object that will post
//                 the information in the project schedule editor and
//                 generate the project schedule web page file.
// Input:          None
// Output:         None
// Preconditions:  None
// Postconditions: None
// Security:       None
// Algorithm:
//              1  create and assign a CPSPostManagerP object
//                 to $glo_ProjectTaskManager.
//              2  if $glo_ProjectTaskManager is NULL, call
//                 fglo_abnormalEnd( ).
//              3  call postProjectScheduleEditorSession( ) of
//                 $glo_ProjectTaskManager and assign
//                 value returned to bool $glo_bIsPostSuccessful.
//              4  call isEditorToBeRedisplayed( ) of $glo_ProjectTaskManager
//                 and assign value returned to bool $glo_bIsToBeRedisplay.
//              5  destroy $glo_ProjectTaskManager using unset( ).
//              6  if $glo_bIsPostSuccessful is false, call
//                 fglo_abnormalEnd( ).
//              7  obtain the project number from $_POST and assign
//                 them to the global string $glo_sProjectNumber.
//              8  if $glo_bIsToBeRedisplay is true, call header( ) with
//                 "Location: ProjScheduleEditor.htm?ProjectNumber=$glo_sProjectNumber"
//                 passed in.
//              9  create and assign a CPSWebManagerP
//                 object with $glo_sProjectNumber passed in to
//                 $glo_ProjectScheduleWebPageManager.
//             10  if $glo_ProjectScheduleWebPageManager is NULL, call
//                 fglo_abnormalEnd( )
//             11  call createProjectScheduleWebPage( ) of
//                 $glo_ProjectScheduleWebPageManager and assign
//                 value returned to $glo_bIsPostSuccessful.
//             12  destroy $glo_ProjectScheduleWebPageManager using unset( ).
//             13  if glo_bIsPostSuccessful is false, call fglo_abnormalEnd( )
//             14  else display message that editor session was successful
//                 and completed.
/////////////////////////////////////////////////////////////////////
fglo_debugPrintVar("$_POST", $_POST);
// Object Creation
$glo_ProjectTaskManager = new CPSPostManagerP;
if ($glo_ProjectTaskManager == null)     {
   fglo_abnormalEnd( );
}
// Process Results
$glo_bIsPostSuccessful = $glo_ProjectTaskManager->postProjectScheduleEditorSession( );
$glo_bIsToBeRedisplay = $glo_ProjectTaskManager->isEditorToBeRedisplayed( );
```

TABLE 9-continued

EXAMPLE PHP CODE TO DETERMINE ABNORMAL CONDITION
PHP Code Listing - the use of the global function fglo__abnormalEnd( ) by functions of various classes

```
unset($glo__ProjectTaskManager);
if (! $glo__bIsPostSuccessful)   {
   fglo__abnormalEnd( );
}
$glo__sProjectNumber = $__POST[C__HIDPROJNUM];
if ($glo__bIsToBeRedisplay)   {
   header("Location: ProjScheduleEditor.htm?ProjectNumber=$glo__sProjectNumber");
}
// Object Creation
$glo__ProjectScheduleWebPageManager = new CPSWebManagerP($glo__sProjectNumber);
if ($glo__ProjectScheduleWebPageManager == null)   {
   fglo__abnormalEnd( );
}
$glo__bIsPostSuccessful = $glo__ProjectScheduleWebPageManager->createProjectScheduleWebPage( );
unset($glo__ProjectScheduleWebPageManager);
// Process Results
if ($glo__bIsPostSuccessful)   {
  echo "<h2>Editor Session Completed!</h2>\n";
} else {
   fglo__abnormalEnd( );
}
Listing 3 - Process failure result in termination.
//////////////////////////////////////////////////////////////
// Public Function:   createProjectScheduleEditor( )
// Description:       This function will create the interface that will
//                    display the project schedule editor.
// Input:             None
// Output:            None
// Preconditions:     None
// Postconditions:    None
// Security:          None
// Algorithm:
//                    1   if initializeWithProjectInfo( ) returns false,
//                        call fglo__abnormalEnd( ).
//                    2   if initializeEditorWithTasks( ) returns false,
//                        call fglo__abnormalEnd( ).
//                    3   call generateScriptForEditor( ).
//////////////////////////////////////////////////////////////
public function createProjectScheduleEditor( )   {
    fglo__debugPrint("CPSPreManagerP::createProjectScheduleEditor( )");
    // Process Results
      if (! $this->initializeWithProjectInfo( ))   {
        fglo__abnormalEnd( );
      }
    // Process Results
    if (! $this->initializeEditorWithTasks( ))   {
        fglo__abnormalEnd( );
    }
    $this->generateScriptForEditor( );
}
Listing 4 - Invalid input values and object creation failure all result in termination.
//////////////////////////////////////////////////////////////
// Public Function: __construct(&$in__EditorDBInterface,
//                    &$in__JavaScriptInterface)
// Description:       Constructor
// Input:             CPSPreDBInterfaceP and CPSPreJavaScriptInterfaceP
//                    objects.
// Output:            None
// Preconditions:     Input objects should not be NULL.
// Postconditions:    Created object should not be NULL.
// Security:          None
// Algorithm:
//                    1   if preconditions are not met, call fglo__abnormalEnd( ).
//                    2   assign $in__EditorDBInterface object
//                        to $m__EditorDBInterface.
//                    3   assign $in__JavaScriptInterface object
//                        to $m__JavaScriptInterface.
//                    4   create and assign an array to $m__MemberLabelList.
//                    5   if postconditions are not met, call fglo__abnormalEnd( ).
//////////////////////////////////////////////////////////////
public function __construct(&$in__EditorDBInterface, &$in__JavaScriptInterface)   {
   fglo__debugPrint("CPSPreRowDataP Constructor");
   // Test valid input
   if ($in__EditorDBInterface == null || $in__JavaScriptInterface == null)   {
      fglo__abnormalEnd( );
   }
```

TABLE 9-continued

EXAMPLE PHP CODE TO DETERMINE ABNORMAL CONDITION
PHP Code Listing - the use of the global function fglo_abnormalEnd( ) by functions of various classes

```
$this->m_EditorDBInterface = $in_EditorDBInterface;
$this->m_JavaScriptInterface = $in_JavaScriptInterface;
// Object creation
$this->m_MemberLabelList = array( );
if (is_null($this->m_MemberLabelList))   {
    fglo_abnormalEnd( );
  }
}
```

Figure 38:
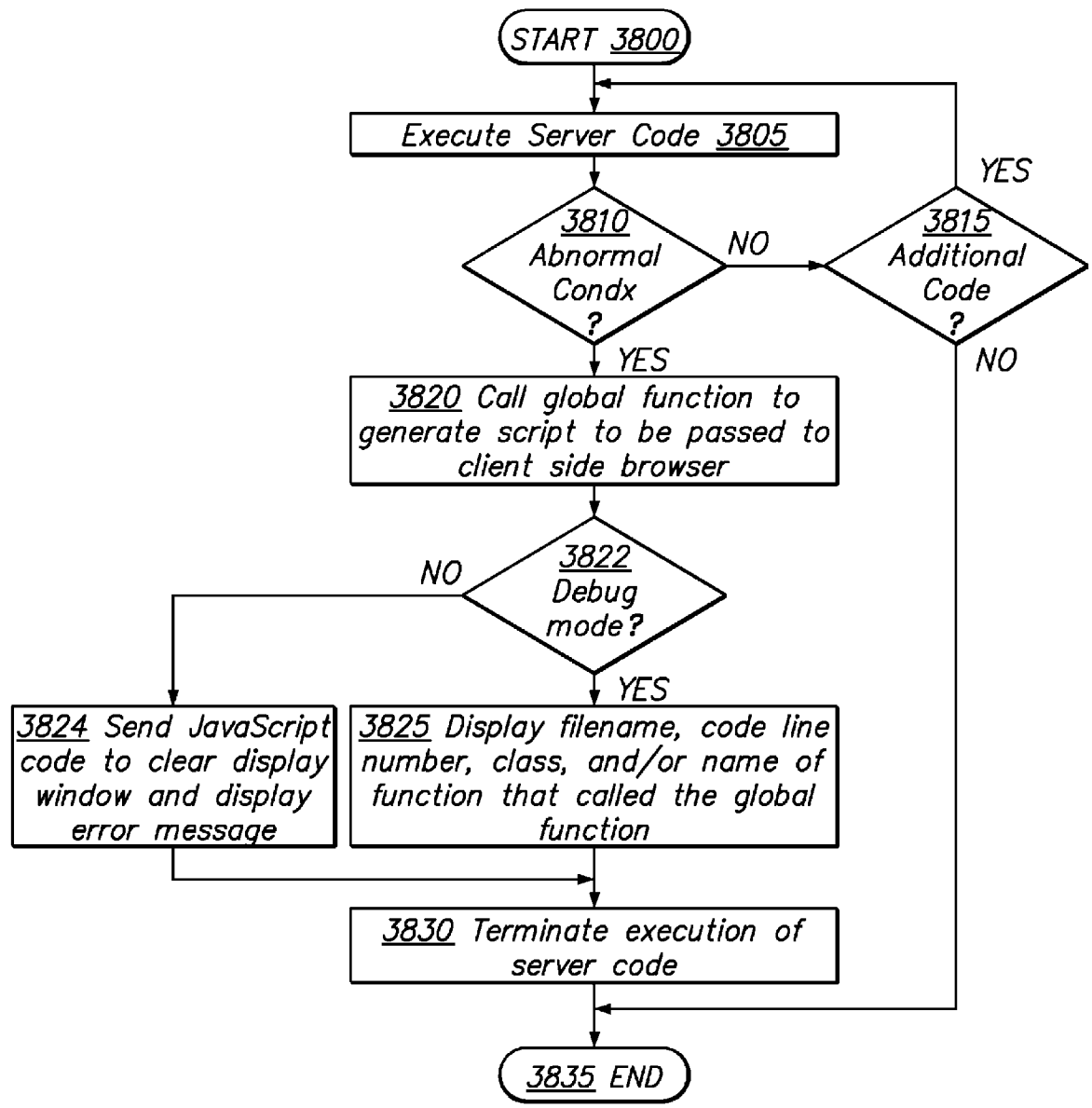
FIG. 38 depicts a Web server process that generates a client side script upon identification of an abnormal condition.

FIG. 38 depicts a Web server process that generates a client side script upon identification of an abnormal condition.

Processing by the Web server begins at step 3800 when a request is received from a Web enabled client. At step 3805, server code is executed by the Web server. During the execution of the code for the Web server, tests at step 3810 for abnormal conditions are performed in various locations within the code. Examples of abnormal conditions include but are not limited input values to a function which do not correspond to expected values, attribute members of an object which must exist, or objects which must be created.

Abnormal conditions encountered will prevent the code on the Web server from executing properly. If an abnormal condition is determined at step 3810 then a global function is called which generates a JavaScript which is passed to the client-side browser to execute at step 3820.

Embodiments may include a debug mode and a production mode and may execute different behavior depending on the current mode. In an embodiment, at step 3822 a test is performed to determine whether the server is in debug mode. If not, then JavaScript code is created and sent at step 3824 to clear the display window and display a generic error message, such as "Editor Session Failed." Thus when the JavaScript that is passed to the client side browser is executed, the currently displayed window in the client-side browser will be cleared and the window will display an error message which informs the user that the task editor session has abnormally terminated. If the server is in debug mode, then in step 3825 the JavaScript causes displaying a message providing more detailed information about the abnormal condition for possible use in debugging.

After the client-side JavaScript is generated by the Web server, execution of the server side code is terminated at step 3830, and the abnormal termination process on the Web server ends at step 3835.

Alternately, if an abnormal condition has not occurred at step 3810, execution of the Web server code continues until all the code on the Web server has completed execution at step 3815, ending normal termination process on the Web server at step 3835.

In an embodiment, the global function is programmed to capture and display for debugging purposes, at step 3825, a message indicating the location of the abnormal condition which may include the filename, code line number, class, and/or name of the function that called the abnormal termination global function.

Figure 39:
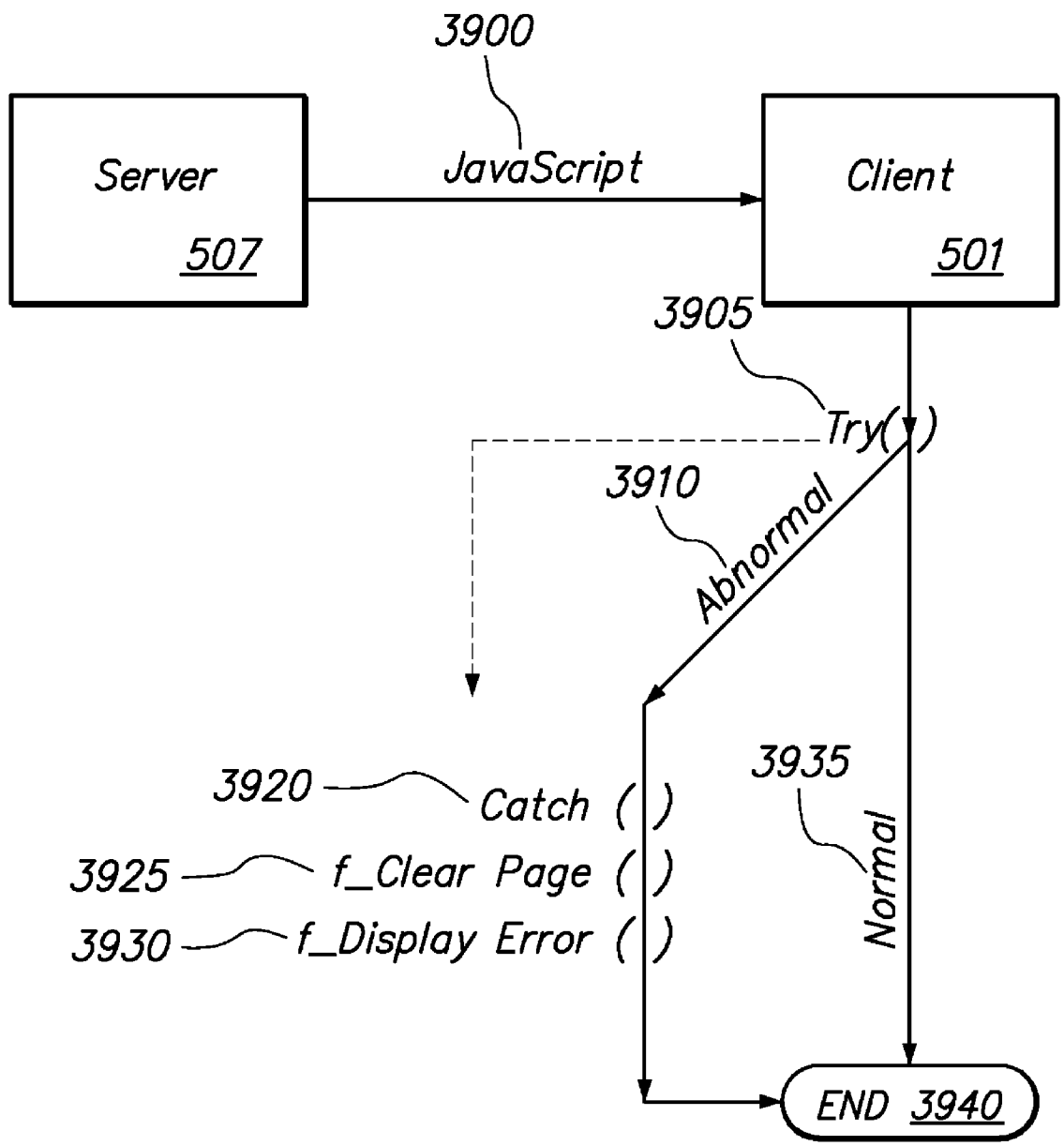
FIG. 39 depicts a processing arrangement where try and catch block statements provide a mechanism to gracefully terminate a Web application on a client.

FIG. 39 depicts a processing arrangement in which Try and Catch Block statements 3905, 3920 provide a mechanism to gracefully terminate a client-side task editor application. In an embodiment, a JavaScript 3900 is sent from the Web server 507 to the client 501. The JavaScript 3900 is processed by the Web browser. The JavaScript 3900 is executed within the Try Block 3905 statement. The Try Block statement 3905 evaluates each line of the script 3900 to determine if an abnormal condition is present. Each line of the script 3900 is executed within the Try Block statement 3905 and at various places in the script the script is evaluated for abnormal conditions. An abnormal condition includes malformed objects, missing or unexpected data, missing or unexpected objects and/or invalid data. If no abnormal conditions are found the script executes to completion and terminates normally 3940.

However, if an abnormal condition 3910 is found, the script throws an exception within the Try Block statement 3905 which causes execution to resume within the Catch block statement 3920. The Catch Block statement 3920 captures the line in the script which contains the abnormal condition 3910 and calls a second global function 3925 which clears the currently displayed Webpage 3925. A third global function is then called which displays the Web page that includes an error message 3930 which informs the user that the project task editor session has been terminated.

Example global functions written in JavaScript to terminate execution of the JavaScript, clear the browser window of the client and display of an error message are set forth in Table 10.

TABLE 10

EXAMPLE GLOBAL FUNCTIONS FOR TERMINATION

Listing 1 - A global function which throws an exception with an input message that will be displayed in the browser window. This function can be called anywhere within the code of the Try Block Statement.
//////////////////////////////////////////////////////////
// Function:     fglo_abnormalEnd(in_sMessage)
// Description:  This function throws an exception so as to clear
//               the window and display a message. In order to call
//               this function, the javascript that calls this function
//               must be embedded in a try...catch statement. The
//               try...catch statement is used to stop the execution
//               of the javascript once an error condition is encountered.
//               JavaScript does not provide a die( ), exit( ), or
//               abort( ) function to stop the execution of javascript.

TABLE 10-continued

EXAMPLE GLOBAL FUNCTIONS FOR TERMINATION

```
//              All the code to be executed should be within the
//              try block. If this function is called, an
//              exception is thrown and all the code in the catch
//              block is executed. However, code after the
//              try...catch statement is executed.
// Usage:       This shows the use of the try...catch.
//              try {
//                  JavaScript code which can throw an exception
//                  by calling this function.
//              }
//              catch(loc_sMessage) {
//                  fglo_clearWindow( );
//                  fglo_displayErrorMessage(loc_sMessage);
//              }
//              When fglo_abnormalEnd( ) is called, in_sMessage is
//              assigned to loc_sMessage.
// Input:       String for error message.
// Output:      None
// Preconditions: None
// Postconditions: None
// Security:    None
// Algorithm:
//              1   throw in_sMessage.
///////////////////////////////////////////////////////
function fglo_abnormalEnd(in_sMessage)   {
   fglo_PrintDebug("fglo_abnormalEnd( )");
   throw in_sMessage;
}
Listing 2 - global function clears the browser window by deleting all elements within the
<body> tag.
///////////////////////////////////////////////////////
// Function:    fglo_clearWindow( )
// Description: This function removes the contents of the window
//              within the body tags of the Web page.
// Input:       None
// Output:      None. The contents of the body of the Web page
//              are removed.
// Preconditions: None
// Postconditions: None
// Security:    None
// Algorithm:
//              1   obtain all body elements (body tag) and assign to
//                  the local array loc_BodyArray.
//                  Use getElementsByName("body").
//              2   set local array loc_NodeArray to null.
//              3   for loc_iBodyIndex from 0 to loc_BodyArray.length-1,
//                  3.1 assign childNodes of the body to loc_NodeArray.
//                      loc_NodeArray =
//                      loc_BodyArray[loc_iBodyIndex].childNodes
//                  3.2 for loc_iNodeIndex from loc_NodeArray.length-1
//                      to 0,
//                      3.2.1 remove child node from body element.
//                          loc_BodyArray[loc_iBodyIndex].
//                          removeChild(loc_NodeArray[loc_iNodeIndex]).
///////////////////////////////////////////////////////
function fglo_clearWindow( )   {
   fglo_PrintDebug("fglo_clearWindow( )");
   var loc_BodyArray = document.getElementsByTagName("body");
   for (loc_iBodyIndex = 0; loc_iBodyIndex < loc_BodyArray.length; loc_iBodyIndex++)   {
      loc_NodeArray = loc_BodyArray[loc_iBodyIndex].childNodes;
      for (loc_iNodeIndex = loc_NodeArray.length-1; loc_iNodeIndex >= 0; loc_iNodeIndex--)   {
         loc_BodyArray[loc_iBodyIndex].removeChild(loc_NodeArray[loc_iNodeIndex]);
      }
   }
}
Listing 3 - global function displays the input message in the browser window of the client.
///////////////////////////////////////////////////////
// Function:    fglo_displayErrorMessage(in_sMessage)
// Description: This function displays a message in the window. Use
//              this function to display an error message in the window.
//              fglo_clearWindow( ) should be called before this function
//              to clear the window before displaying the error message.
//              Otherwise, it is uncertain how the message will be
//              displayed in the window.
// Input:       String for error message.
// Output:      None. Error message is displayed in the window.
// Preconditions: None
// Postconditions: None
```

TABLE 10-continued

EXAMPLE GLOBAL FUNCTIONS FOR TERMINATION

```
// Security:     None
// Algorithm:
//         1   initialize local strings loc_sMessageFormat to
//             C_ErrorHandling_MessageFormat and loc_sMessage to
//             empty string.
//         2   if in_sMessage is null or empty, replace message
//             key in loc_sMessageFormat with default message and
//             assign value to loc_sMessage: loc_sMessage =
//             loc_sMessageFormat.replace(C_ErrorHandling_MessageKey,
//             C_ErrorHandling_DefaultErrorMessage)
//         3   otherwise replace message key in loc_sMessageFormat
//             with input message and assign value to loc_sMessage:
//             loc_sMessage = loc_sMessageFormat.replace(C_ErrorHandling_MessageKey,
//             in_sMessage.
//         4   call document.writeln( ) with loc_sMessage passed in.
///////////////////////////////////////////////////////////////
function fglo_displayErrorMessage(in_sMessage)   {
  fglo_PrintDebug("fglo_displayErrorMessage( )");
  var loc_sMessageFormat = C_ErrorHandling_MessageFormat;
  var loc_sMessage = "";
  if (in_sMessage == null || in_sMessage.length == 0)   {
    loc_sMessage = loc_sMessageFormat.replace(C_ErrorHandling_MessageKey,
C_ErrorHandling_DefaultErrorMessage);
  } else {
    loc_sMessage = loc_sMessageFormat.replace(C_ErrorHandling_MessageKey, in_sMessage);
  }
  document.writeln(loc_sMessage);
}
```

An example JavaScript which includes the Try and Catch Block statements 3905, 3920 is provided in Table 11.

Table 11—Example Code Using Try and Catch Block Statements

JavaScript Code Listing—Example code listing using Try and Catch Block statements to handle abnormal conditions. JavaScript code generated by the server processor (Web server) within the HTML <body> tag of the project task manager editor causes the Web page to display the initial editor. The client side Web browser will execute the JavaScript in the Try Block. Code in the functions of various classes used by editor will test for abnormal conditions. If any abnormal conditions are encountered, fglo_abnormalEnd( ) will be called to throw an exception to stop the execution of code in the try block and execution of code will continue in the Catch Block statement.

```
<body id="MembSchedBodyID">
  <p id="WorkingID" align="center"><font
  size="7">Working . . . .</font><br>
    <img border="0" src="working.gif" width="59" height="52"><br>
  </p>
  <h2 align="center">test1's J99 Schedule</h2>
<script>
try {
  var glo_TaskOptionList = null;
  var glo_EditorManager = new CMSjsEditorManagerJ( );
  glo_EditorManager.setup_createEditor("J99", "test1");
  var loc_sMemberTaskNameList = new Array( );
  loc_MemberTaskNameList.push("Impl Plan Guide");
  glo_EditorManager.setup_addUnscheduledTasks(30,
"Document Guidelines", loc_MemberTaskNameList);
  loc_MemberTaskNameList.splice(0, 1);
  loc_MemberTaskNameList.push("Major Interfaces");
  glo_EditorManager.setup_addUnscheduledTasks(40,
"Top Level Design", loc_MemberTaskNameList);
  loc_MemberTaskNameList.splice(0, 1);
  loc_MemberTaskNameList.push("Member Schedule");
  glo_EditorManager.setup_addUnscheduledTasks(80,
"Implementation", loc_MemberTaskNameList);
```

-continued

```
  loc_MemberTaskNameList.splice(0, 1);
  var glo_MemberTaskInfo = new SMSjsMemberTaskInfoJ( );
  glo_MemberTaskInfo.m_nTaskLevel = 1;
  glo_MemberTaskInfo.m_nParentTaskID = 30;
  glo_MemberTaskInfo.m_nTaskID = 42;
  glo_MemberTaskInfo.m_sTaskName = "Code Conv";
  glo_MemberTaskInfo.m_SetDate = "2006-09-08";
  glo_MemberTaskInfo.m_PlanStart = "2006-09-08";
  glo_MemberTaskInfo.m_PlanEnd = "2006-09-11";
  glo_MemberTaskInfo.m_ActualStart = "2006-09-08";
  glo_MemberTaskInfo.m_ActualEnd = "";
  glo_MemberTaskInfo.m_nRev = 1;
  glo_EditorManager.setup_addTaskToEditor(glo_MemberTaskInfo);
  glo_MemberTaskInfo.reset( );
  glo_MemberTaskInfo.m_nTaskLevel = 2;
  glo_MemberTaskInfo.m_nParentTaskID = 42;
  glo_MemberTaskInfo.m_nTaskID = 32;
  glo_MemberTaskInfo.m_sTaskName = "draft";
  glo_MemberTaskInfo.m_SetDate = "2006-09-08";
  glo_MemberTaskInfo.m_PlanStart = "2006-09-11";
  glo_MemberTaskInfo.m_PlanEnd = "2006-09-13";
  glo_MemberTaskInfo.m_ActualStart = "";
  glo_MemberTaskInfo.m_ActualEnd = "";
  glo_MemberTaskInfo.m_nRev = 1;
  glo_EditorManager.setup_addTaskToEditor(glo_MemberTaskInfo);
  glo_MemberTaskInfo.reset( );
  glo_MemberTaskInfo.m_nTaskLevel = 2;
  glo_MemberTaskInfo.m_nParentTaskID = 42;
  glo_MemberTaskInfo.m_nTaskID = 42;
  glo_MemberTaskInfo.m_sTaskName = "review/inspection";
  glo_MemberTaskInfo.m_SetDate = "2006-09-08";
  glo_MemberTaskInfo.m_PlanStart = "2006-09-14";
  glo_MemberTaskInfo.m_PlanEnd = "2006-09-15";
  glo_MemberTaskInfo.m_ActualStart = "";
  glo_MemberTaskInfo.m_ActualEnd = "";
  glo_MemberTaskInfo.m_nRev = 1;
  glo_MemberTaskInfo.reset( );
}
catch(loc_sMessage)   {
  fglo_clearWindow( );
  fglo_displayErrorMessage(loc_sMessage);
}
</script>
```

Figure 40:
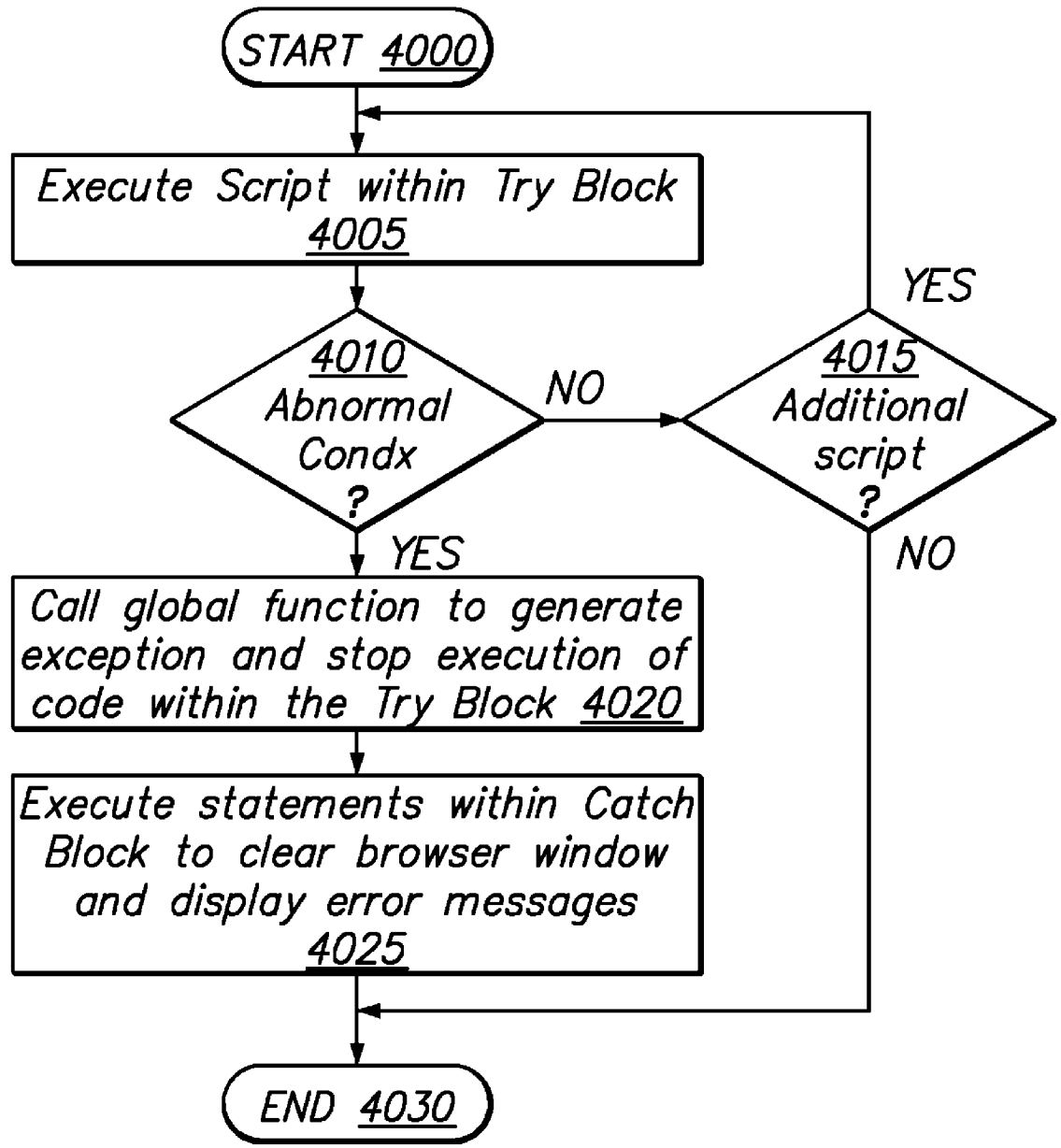
FIG. 40 depicts a Web browser processing flow chart which utilizes the try and catch block statements.

FIG. 40 depicts client-side Web browser processing that utilizes the Try and Catch Block statements for the termination of the client-side script for the project task management system when abnormal conditions are encountered during the execution of the script by the Web enabled client.

Processing by the client-side Web browser begins at step 4000 when a Web page containing JavaScript is received from a Web server. The received JavaScript is executed within a Try Block statement at step 4005. Each line of the JavaScript is executed within the Try Block statement. Various places within the script are evaluated for abnormal condition(s). If no abnormal conditions are found at step 4010, the client-side Web browser determines if additional script is to be executed in step 4015.

If additional JavaScript is to be executed, processing continues at step 4005 within the Try Block. If all of the JavaScript has been executed, JavaScript processing ends at step 4030. If an abnormal condition is identified at step 4010, a first global function is called to generate an exception and execution of the JavaScript in the Try Block statement is stopped at step 4020.

The JavaScript execution continues within the Catch Block statement at step 4025 where a second global function clears the currently displayed Web page, and a third global function displays the Web page within the client-side browser window informing the user that task editor has failed.

TABLE 12 provides sample code for a system that uses the global function fglo_abnormalEnd( ). Without the use of the function, the editor will behave incorrectly.

TABLE 12

USING GLOBAL ABNORMAL END FUNCTION

```
Listing 1 - Unexpected input values, non existing member object, and failure in accessing an
element (form element) in the Web page result in termination. This function shows the use of
debug messages.
/////////////////////////////////////////////////////////////////
// Function:       setup_createEditor(in_sProjectNumber, in_sMemberName)
// Description:    This function will create and display the form of
//                 the editor that will contain a table with only the
//                 header row and the controls below the table. Hidden
//                 elements for the project number and member name are
//                 added to the editor.
// Input:          Strings for the project number and member name.
// Output:         None
// Preconditions:  Input strings cannot be empty and m_TableManager
//                 cannot be null.
// Postconditions: None
// Security:       None
// Algorithm:
//              1  If preconditions are not met, call fglo_abnormalEnd( ).
//              2  document.writeln('<form id="' + C_FORMNAME + 'ID"
//                 method="POST" action="PostMembSchedule.htm">')
//              3  m_EditorFormElement = document.getElementById(C_FORMNAME + "ID")
//              3a if m_EditorFormElement is null, call fglo_abnormalEnd( ).
//              4  m_EditorFormElement.onsubmit = fglo_submitSchedule
//              5  call fglo_addHiddenElement( ) passing in m_EditorFormElement,
//                 "", C_PROJECTNUMBER, and in_sProjectNumber.
//              6  call fglo_addHiddenElement( ) passing in m_EditorFormElement,
//                 "", C_MEMBERNAME, and in_sMemberName.
//              7  call setup_createTable( ) of m_TableManager.
//              8  call this.setup_addEditorControls( ).
//              9  document.writeln('</form>')
/////////////////////////////////////////////////////////////////
function CMSjsEditorManagerJ_setup_createEditor(in_sProjectNumber, in_sMemberName)   {
    fglo_PrintDebug("CMSjsEditorManagerJ::setup_createEditor( )");
    // Test preconditions
    if (in_sProjectNumber.length == 0 || in_sMemberName.length == 0 ||
        this.m_TableManager == null) {
        if (C_DEBUG) {
            fglo_abnormalEnd("CMSjsEditorManagerJ::setup_createEditor( ) - Precondition Failed");
        } else {
            fglo_abnormalEnd( );
        }
    }
    document.writeln('<form id="' + C_FORMNAME + 'ID" method="POST"
action="PostMembSchedule.htm">');
    // Accessing form element
    this.m_EditorFormElement = document.getElementById(C_FORMNAME + "ID");
    if (this.m_EditorFormElement == null)   {
        if (C_DEBUG)   {
            fglo_abnormalEnd("CMSjsEditorManagerJ::setup_createEditor( ) - Form Element cannot be
obtained");
        } else   {
            fglo_abnormalEnd( );
        }
    }
    this.m_EditorFormElement.onsubmit = fglo_submitSchedule;
    fglo_addHiddenElement(this.m_EditorFormElement, "", C_PROJECTNUMBER, in_sProjectNumber);
    fglo_addHiddenElement(this.m_EditorFormElement, "", C_MEMBERNAME, in_sMemberName);
    this.m_TableManager.setup_createTable( );
    this.setup_addEditorControls( );
```

TABLE 12-continued

USING GLOBAL ABNORMAL END FUNCTION

```
  document.writeln('</form>');
}
CMSjsEditorManagerJ.prototype.setup__createEditor=CMSjsEditorManagerJ__setup__createEditor;
Listing 2 - Unexpected and invalid input values, failure in creating an element (cell element) in
the Web page, and object creation failure result in termination.
///////////////////////////////////////////////////////////////////
// Function:     setup__initializeTaskRow(in__RowElement, in__MemberTaskInfo)
// Description:  This function will initialize and display a row of the
//               table with the member task. All the cells in the row
//               are created and initialized with member task information
//               obtained from the database.
// Input:        Object for row element and SMSjsMemberTaskInfoJ structure.
// Output:       None
// Preconditions: Row element cannot be null and SMSjsMemberTaskInfoJ
//               cannot be null.
// Postconditions: None
// Security:     None
// Algorithm:
//            1   if preconditions are not met, call fglo__abnormalEnd( ).
//            2   call this.initializeRowElement( ) with in__RowElement
//                passed in.
//            3   call m__RowElement.insertCell( ) with C__TASKCELLPOS
//                passed in and assign value returned to a local
//                cell element loc__CellElement
//            4   if loc__CellElement is null, call fglo__abnormalEnd( ).
//            5   create and assign a CMSjsTaskCellJ object to m__TaskCell
//                with m__sRowID passed in.
//            6   if m__TaskCell is null, call fglo__abnormalEnd( ).
//            7   call m__TaskCell.setup__initializeTaskCell( ) with
//                loc__CellElement and in__MemberTaskInfo passed in.
//            8   create a local Array loc__Schedule.
//            8a  if loc__Schedule is null, call fglo__abnormalEnd( ).
//            9   loc__Schedule[C__SETDATE] = in__MemberTaskInfo.m__SetDate
//           10   loc__Schedule[C__PLANSTART] = in__MemberTaskInfo.m__PlanStart
//           11   loc__Schedule[C__PLANEND] = in__MemberTaskInfo.m__PlanEnd
//           12   loc__Schedule[C__ACTUALSTART] = in__MemberTaskInfo.m__ActualStart
//           13   loc__Schedule[C__ACTUALEND] = in__MemberTaskInfo.m__ActualEnd
//           14   call this.initializeDateCells( ) with loc__Schedule passed in.
///////////////////////////////////////////////////////////////////
function CMSjsRowJ__setup__initializeTaskRow(in__RowElement, in__MemberTaskInfo)  {
  fglo__PrintDebug("CMSjsRowJ::setup__initializeTaskRow( )");
  // Test preconditions
  if (in__RowElement == null || in__MemberTaskInfo == null)   {
    fglo__abnormalEnd( );
  }
  this.initializeRowElement(in__RowElement);
  // Cell element creation
  var loc__CellElement = this.m__RowElement.insertCell(C__TASKCELLPOS);
  if (loc__CellElement == null)   {
    fglo__abnormalEnd( );
  }
  // Object creation
  this.m__TaskCell = new CMSjsTaskCellJ(this.m__sRowID);
  if (this.m__TaskCell == null)   {
    fglo__abnormalEnd( );
  }
  this.m__TaskCell.setup__initializeTaskCell(loc__CellElement, in__MemberTaskInfo);
  // Array object creation
  var loc__Schedule = new Array( );
  if (loc__Schedule == null)   {
    fglo__abnormalEnd( );
  }
  loc__Schedule[C__SETDATE] = in__MemberTaskInfo.m__SetDate;
  loc__Schedule[C__PLANSTART] = in__MemberTaskInfo.m__PlanStart;
  loc__Schedule[C__PLANEND] = in__MemberTaskInfo.m__PlanEnd;
  loc__Schedule[C__ACTUALSTART] = in__MemberTaskInfo.m__ActualStart;
  loc__Schedule[C__ACTUALEND] = in__MemberTaskInfo.m__ActualEnd;
  this.initializeDateCells(loc__Schedule);
}
CMSjsRowJ.prototype.setup__initializeTaskRow=CMSjsRowJ__setup__initializeTaskRow;
Listing 3 - Unexpected and invalid input values and failure in creating an element (text and font
element) in the Web page result in termination.
///////////////////////////////////////////////////////////////////
// Function:     setup__initializeTaskCell(in__CellElement, in__MemberTaskInfo)
// Description:  This function initializes and displays the task cell
//               of a row with the member task. The cell is initialized
//               with information about the task obtained from the
//               database in which some of the information are put
```

TABLE 12-continued

USING GLOBAL ABNORMAL END FUNCTION

```
//                    into hidden input elements.
// Input:             Object for cell element and SMSjsMemberTaskInfoJ structure.
// Output:            None
// Preconditions:     Cell element and SMSjsMemberTaskInfoJ cannot be null.
// Postconditions:    None
// Security:          None
// Algorithm:
//              1     if preconditions are not met, call fglo__abnormalEnd( ).
//              2     assign in__CellElement to m__TaskCellElement.
//              3     m__TaskCellElement.id = m__sRowID + C__TASKCELLID
//              4     call this.addCheckboxToTaskCell( ).
//              5     call this.addHiddenElementsToCell( ) with
//                    in__MemberTaskInfo passed in.
//              6     initialize local string loc__sIndentation to empty
//                    string.
//              7     for loc__iIndex from 1 to in__MemberTaskInfo.m__nTaskLevel−1
//                    7.1 add C__INDENTATION to loc__sIndentation.
//              8     create a text node with the loc__sIndentation
//                    + in__MemberTaskInfo.m__sTaskName and assign node
//                    to loc__TextNode.
//              9     if loc__TextNode is null, call fglo__abnormalEnd( ).
//             10     create a font element and assign element to
//                    m__TaskNameTextNode.
//             11     if m__TaskNameTextNode is null, call fglo__abnormalEnd( ).
//             12     append loc__TextNode to m__TaskNameTextNode.
//             13     append m__TaskNameTextNode to m__TaskCellElement.
/////////////////////////////////////////////////////////////////
function CMSjsTaskCellJ__setup__initializeTaskCell(in__CellElement, in__MemberTaskInfo)   {
  fglo__PrintDebug("CMSjsTaskCellJ::setup__initializeTaskCell( )");
  // Test preconditions
  if (in__CellElement == null || in__MemberTaskInfo == null)   {
    fglo__abnormalEnd( );
  }
  this.m__TaskCellElement = in__CellElement;
  this.m__TaskCellElement.id = this.m__sRowID + C__TASKCELLID;
  this.addCheckboxToTaskCell( );
  this.addHiddenElementsToCell(in__MemberTaskInfo);
  var loc__sIndentation = "";
  for (var loc__iIndex = 1; loc__iIndex <= in__MemberTaskInfo.m__nTaskLevel−1; loc__iIndex++)
    loc__sIndentation += C__INDENTATION;
  // Create text element
  var loc__TextNode = document.createTextNode(loc__sIndentation + in__MemberTaskInfo.m__sTaskName);
  if (loc__TextNode == null)   {
    fglo__abnormalEnd( );
  }
  // Create font element
  this.m__TaskNameTextNode = document.createElement("font");
  if (this.m__TaskNameTextNode == null)   {
    fglo__abnormalEnd( );
  }
  this.m__TaskNameTextNode.appendChild(loc__TextNode);
  this.m__TaskCellElement.appendChild(this.m__TaskNameTextNode);
}
CMSjsTaskCellJ.prototype.setup__initializeTaskCell=CMSjsTaskCellJ__setup__initializeTaskCell;
```

Managing Project Schedule Data Using Separate Current and Historical Task Schedule Data One of the issues with managing project schedule data is that the amount of schedule data maintained for a project can become very large over time. For example, some projects have a large number of tasks. Project tasks may also have a large number of revisions. Both of these factors can contribute to the creation of a large amount of schedule data that has to be maintained. The schedule data not only requires a large amount of storage, but queries to retrieve particular schedule data become more complex and computationally expensive to process. For example, to retrieve the current schedule for a particular task, an initial query has to be generated and processed to identify the most recent version of the schedule. Then, a subsequent query has to be generated and processed to retrieve the schedule data that corresponds to the most recent version of the schedule.

To address these issues, according to one embodiment of the invention, project schedule data is managed using separate current and historical task schedule data structures. In general, current schedule data is stored separately from historical schedule data, so that the current schedule data may be retrieved separately from the historical task schedule data. This avoids having to first query the schedule data to identify the most recent version of a schedule before the current schedule data can be retrieved.

FIGS. 41A and 41B depict maintaining current schedule data and historical schedule data in separate data structures, according to one embodiment of the invention. This example is depicted in the figures and described herein in the context of data tables, but the invention is not limited to data tables and any type of data structures may be used. Examples of other types of data structures include, without limitation, arrays, records and files. In this example, the current schedule data for a task is stored in the current schedule data table depicted in FIG. 41A, which is referred to herein as the "Level1MemberTask table". The historical schedule data for the task is stored in the historical schedule data table depicted in FIG. 41B, which is referred to herein as the "Level1MemberTaskHistory table".

The sample data in the tables are the result of a project team member using the member schedule editor, such as depicted in FIG. 3A. The Level1MemberTask table depicted in FIG. 41A contains the latest schedule for all tasks of the project. The Level1MemberTaskHistory table depicted in FIG. 41B contains previous schedules for all tasks of the project. When the planned dates (planned start or planned end date) of a task are changed on a later date than the setDate (date of last change), the previous schedule of the task is moved to the Level1MemberTaskHistory table and the new planned dates, setDate, and revision number are updated in the Level1MemberTask table.

In the present example, the planned dates for the task "Project Initiation" and "Status Report" have been modified. As indicated by FIG. 41B, for the "Project Initiation" task (nLevelTaskID=11), the value in the setDate column of Aug. 17, 2007 indicates that the task start date (in the planStart column) and task end date (in the planEnd column) were set to Aug. 17, 2007 and Aug. 24, 2007, respectively. This data was initially stored in the current schedule data table of FIG. 41A, but was moved to the historical schedule data table of FIG. 41B in response to a change to the data. As indicated by FIG. 41A, the value in the setDate column of Aug. 20, 2007 indicates that the task end date was changed on Aug. 20, 2007 from Aug. 23, 2007 to Aug. 24, 2007. Also, actual start and end date values of Aug. 17, 2007 and Aug. 23, 2007, respectively, have been added. Thus, the current schedule data is maintained in the current schedule data table of FIG. 41A, while the historical schedule data for the task is maintained in the historical schedule data table of FIG. 41B. When a user wants to use the schedule editor to view and edit the schedule for the task, only the schedule data contained in the current schedule data table of FIG. 41A needs to be retrieved. In situations where a user wants to view a report containing both current and historical schedule data, then the current schedule data is retrieved from the current schedule data table and the historical schedule data is retrieved from the historical schedule data table.

Figure 42:
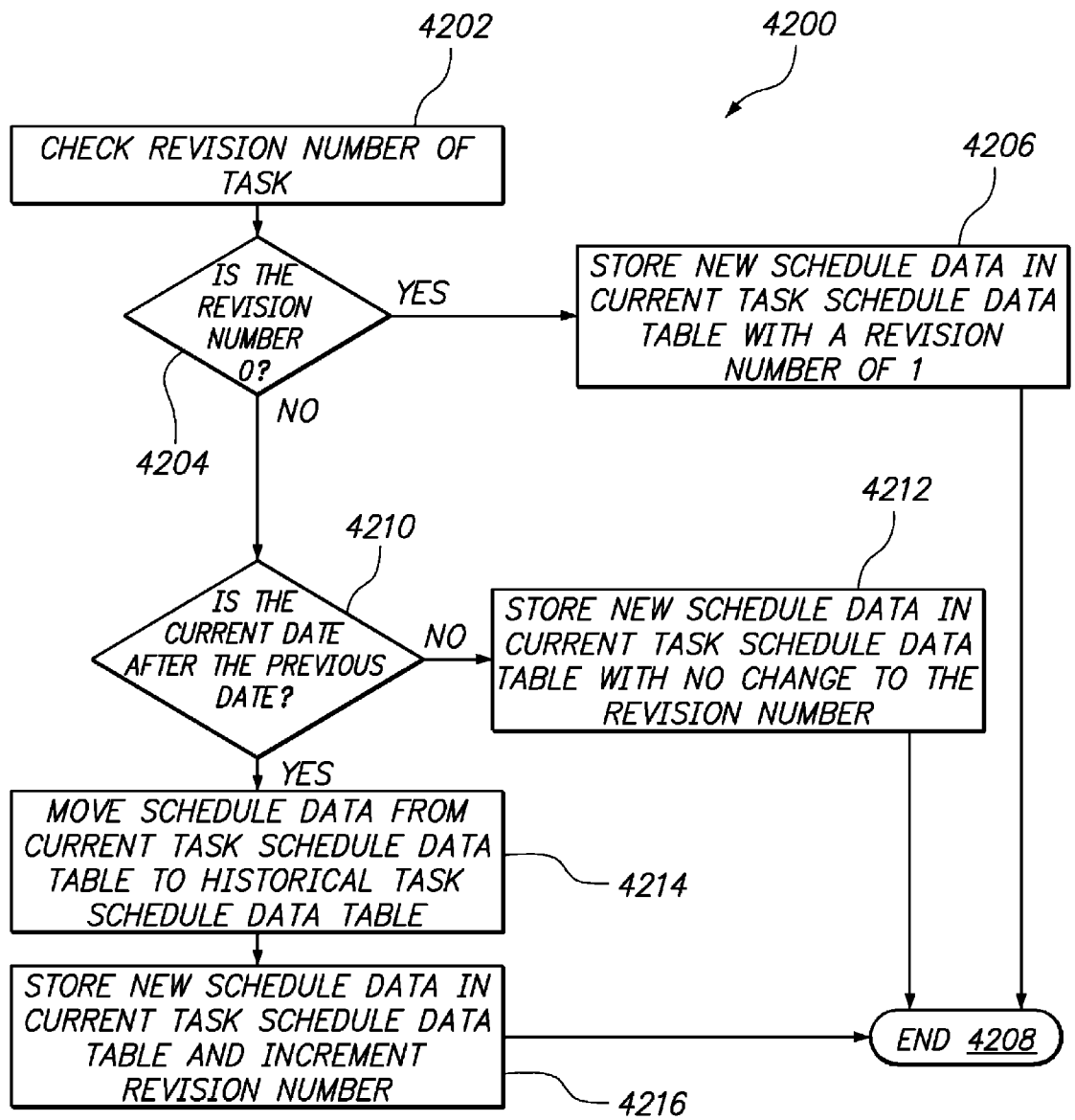
FIG. 42 depicts a flow diagram of a process in a Web server for changing the planned dates of a task.

FIG. 42 depicts a flow diagram 4200 of a process in a Web server for changing the planned dates of a task. A project member can change the planned dates of a task in the member schedule editor. Once the project member completes the member schedule editor session, information in the member schedule editor is posted on (or passed to) the Web server to update the member's schedule. For each task in the member schedule editor, the editor maintains information about the action performed on the task (no action, added, deleted, changed planned dates, or set actual dates) that is passed to the Web server. The Web server processes the schedule information of the task passed from the member schedule editor based upon the action performed on the task to update the member schedule.

In step 4202, a revision number of the task is checked. The revision number of a task may be stored, for example, in the current task schedule data table depicted in FIG. 41A. In step 4204, a determination is made whether the revision number is 0. If the revision number is 0, then this indicates that task does not have any current schedule data and is a to-do list task, which is described in more detail hereinafter. If the revision number is 0, then in step 4206, the new schedule data for the task is stored in the current task schedule data table with a revision number of 1 and the process is then complete in step 4208. In the present example, revision numbers are represented by integer numbers, but the invention is not limited to this approach and any revision scheme may be used.

If in step 4204 a determination is made that the revision number is not 0, then schedule data exists for the task and in step 4210 a determination is made whether the date associated with the new schedule data (the current date) is after the date associated with the existing schedule data (the previous date). If not, then in step 4212 the new schedule data is stored in the current task schedule data table with no change to the revision number and the process is complete in step 4208. This results in overwriting the existing schedule data with the new schedule data. In this example, the determination of whether to overwrite the existing schedule data is performed using a date comparison. That is, changes to schedule data made on the same day will overwrite other changes made on the same day and will not result in a new revision number. The invention is not limited to this approach, however, and other approaches may be used. For example, the threshold for determining whether a change constitutes a new version may be based upon seconds, minutes, hours, days, weeks or months, depending upon a particular implementation.

If, in step 4210, a determination is made that the date associated with the new task schedule data (the current date) is after the date associated with the existing task schedule data (the previous date), then the new task schedule data is considered to be a new version of task schedule data. In step 4214, the existing task schedule data in the current task schedule data table is moved to the historical task schedule data table. For example, the existing task schedule data for the task stored in the current task schedule data table of FIG. 41A is moved into the historical task schedule data table of FIG. 41B. In step 4216, the new task schedule data is then added to the current task schedule data table with the revision number incremented and the process is complete in step 4208.

The approach depicted in FIG. 42 may apply to any level task for a member. This approach may also be used with the project task in the project schedule editor when updating planned dates in the TopLevelProjectTask and TopLevelProjectTaskHistory tables.

Figure 43:
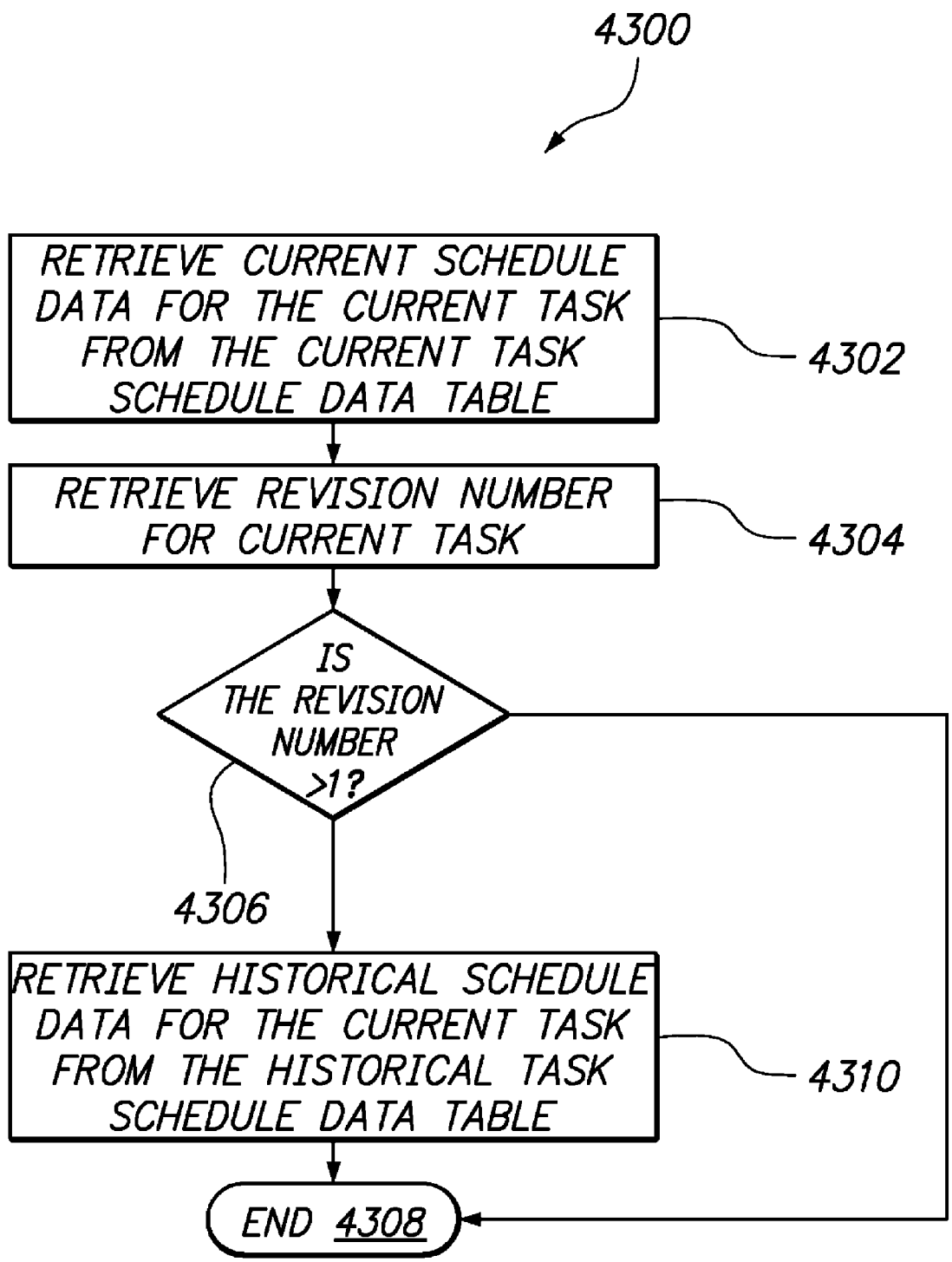
FIG. 43 is a flow diagram that depicts an approach for accessing all revisions of a schedule for a task.

FIG. 43 is a flow diagram 4300 that depicts an approach for accessing all revisions of a schedule for a task. For example, this process may be used when generating a Web page for the member schedule or project schedule showing the schedule of all tasks with its previous schedules. In step 4302, the current schedule data for a current task is retrieved from the current task schedule data table depicted in FIG. 41A. In step 4304, the revision number for the current task is retrieved. The revision number may be stored in the current task schedule data table depicted in FIG. 41A, or in another location.

In step 4306, a determination is made whether the revision number is greater than 1. If the revision number is not greater than 1, then the current schedule data is the only schedule data for the current task and the process is complete in step 4308. If the revision number is greater than 1, then there is also historical schedule data available for the current task. In step 4310, the historical schedule data for the current task is retrieved from the historical schedule data table. The process is then complete in step 4308. Storing task schedule data in separate tables as described herein allows all the revisions of the schedule of a task that meet certain conditions (completed, started only, planned only, unscheduled) to be retrieved with just two queries. For example, to obtain the latest versions of all tasks that are started only, the following queries are used to obtain the schedule for the task "Project Initiation"–SELECT*FROM Level1MemberTask WHERE sProjectNumber="J98" AND nLevel1TaskID=11 and SELECT*FROM Level1MemberTaskHistory WHERE sProjectNumber="J98" AND nLevel1TaskID=11 ORDER BY nScheduleRevNumber DESC.

FIG. 44 depicts a sample Web page generated for a member's task schedule where the schedule of the level 1 task is depicted in the current task schedule data table (Level1MemberTask table) of FIG. 41A and the historical task schedule data table (Level1MemberTaskHistory table) of FIG. 41B using the process of FIG. 43 to depict all revisions of the task schedule. The Web page of FIG. 44 depicts level 2 and level 3 tasks and tasks deleted from the member's schedule. Deleted task are indicated by strikethrough the task name and schedule. The project member has two level 1 tasks, "Project Initiation" and "Status Report", in which the current schedules of the task are depicted and the previous schedules of the task are depicted with strike through. The current schedule of the task is obtained from the current task schedule data table (Level1MemberTask table) of FIG. 41A and the previous schedules of the task are obtained from the historical task schedule data table (Level1MemberTaskHistory table) of FIG. 41B.

To-Do Lists

According to one embodiment of the invention, unscheduled tasks in the project management system are maintained as "to-do lists." Tasks may be added to a member's schedule without specifying any planned dates and the tasks are added to the database. The tasks have an associated revision number of 0 to indicate that the tasks were added, but not yet scheduled. The tasks are displayed in the member schedule editor and in Web page schedules. According to one embodiment of the invention, the tasks are displayed in the member schedule editor and in Web page schedules in a manner that allows a user to readily determine that the tasks are "to-do list" tasks, e.g., by displaying the "to-do list" tasks in a particular location or order with respect to scheduled tasks.

FIG. 45 depicts an example Web page for a member's task schedule displaying to-do list tasks. In the member's task schedule Web page, the member's tasks are placed in the table corresponding to the project task. For example, the tasks "Major Packages & Interface", "Major Sequences", "Data Structures", and "Database" are displayed in the table corresponding to the project task "Top Level Design." Tasks can be added in the member schedule editor without setting the schedule (planned dates). The tasks are displayed at the bottom of the table corresponding to the project task. This serves to clearly identify the tasks that are not yet scheduled by the member but need to be done, which is the function of a to-do list. This feature is especially useful when the member has a large number of tasks and needs to quickly and easily identify the to-do list tasks. From the Web page, the to-do list tasks are "Upgrade Workstation to MS Vista", "Update Apache on Web Server", "Major Packages & Interface", "Major Sequences", "Data Structures", and "Database." The tasks "Update MySQL to latest version", "Upgrade Workstation to MS Vista" and "Update Apache on Web Server" within the table for the project task "Planning" are non-project tasks. They are member tasks that are not associated with any of the project tasks. Non-project tasks are placed in the tables that correspond to the project task based upon the schedules of the project tasks and non-project tasks.

FIG. 46 depicts the member schedule editor containing the tasks displayed in the Web page of FIG. 45. The editor displays only the tasks that are not completed. All the tasks are displayed in one table. The editor depicts the member's tasks that have been added but not scheduled in a previous session. They are all listed at the bottom of the table of the editor to clearly identify the tasks that are not scheduled by the member but need to be done, which is the function of a to-do list. This feature is especially useful when the member has a large number of incomplete tasks and needs to quickly and easily identify the to-do list tasks. The Planned Start Date and Planned End Dates for the tasks "Data Structures" and "Update Apache on Web Server" are being specified in this session.

FIG. 47 depicts the Web page for a member's task schedule that is generated when the member completes the member schedule editor session of FIG. 46. The Web page depicts that two tasks, "Data Structures" and "Update Apache on Web Server", that were previously listed at the bottom of the tables as part of the to-do list tasks in FIG. 45 have been moved above the non-scheduled tasks after the planned dates have been specified in the editor. Specifically, within the table for the project task "Planning," the "Update Apache on Web Server" task has been moved above the "Upgrade Workstation to MS Vista" task. Within the table for the project task "Top Level Design," the task "Data Structures" has been moved above the "Major Packages & Interface" task.

Figure 48:
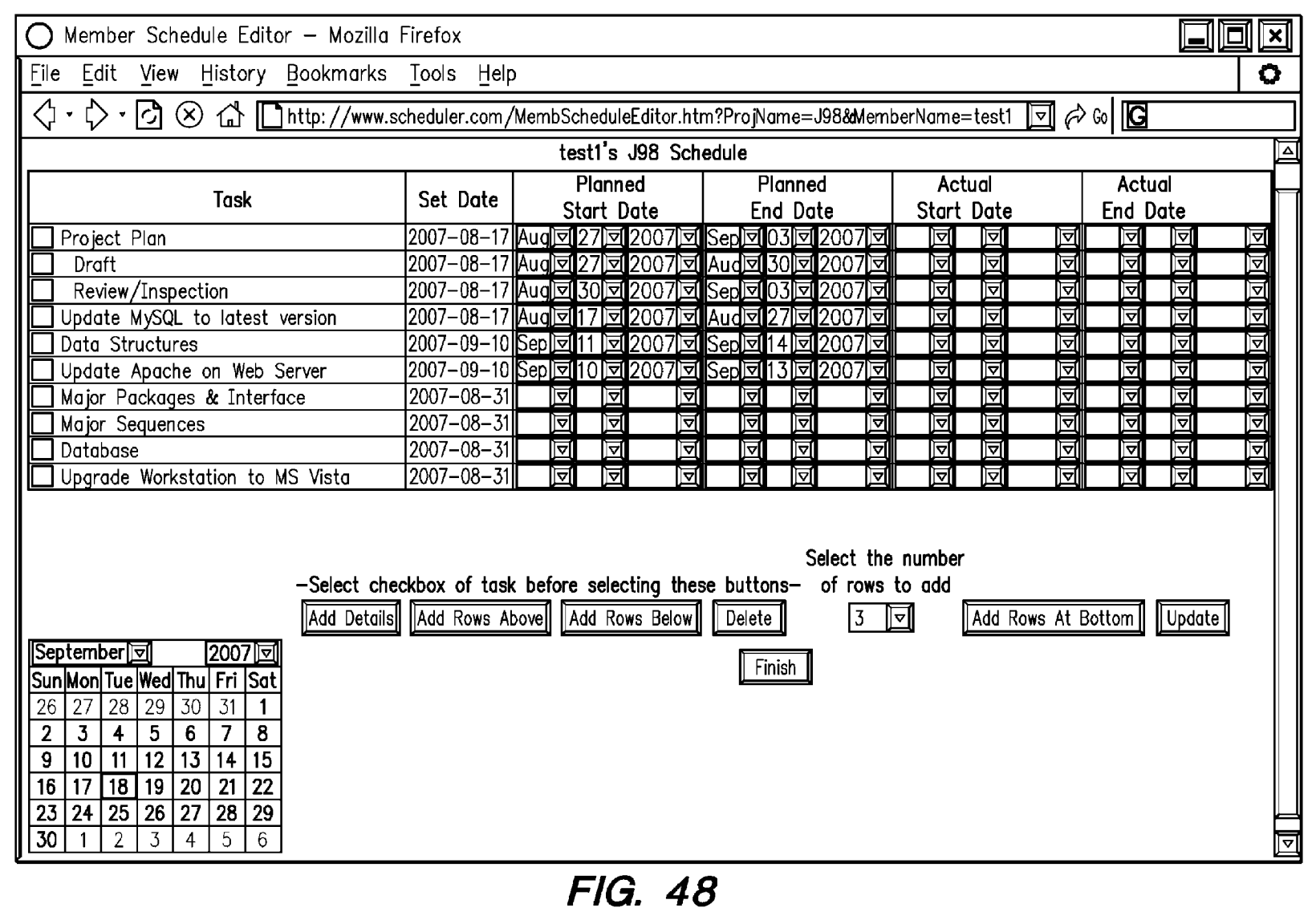

FIG. 48 depicts another member schedule editor session after the previous session of FIG. 46. The editor depicts that the two tasks "Data Structures" and "Update Apache on Web Server" that were previously listed at the bottom of the table as part of the to-do list tasks in FIG. 46, have been moved above the other unscheduled tasks, including "Major Packages & Interface," "Major Sequences," "Database" and "Upgrade Workstation to MS Vista." This provides an immediate visual indication to a user that the tasks "Data Structures" and "Update Apache on Web Server" are no longer "to-do list" tasks.

FIGS. 49A and 49B depict the Level1MemberTask table and Level1MemberTaskHistory table, respectively, of the database containing the task information that are the results of the member schedule editor session and used to generate the Web page of the member task schedule. Tasks added in the member schedule editor that do not have specified planned dates are added to the Level1MemberTask table with a revision number of 0 and represent a to-do list. In FIG. 49A, five tasks in the Level1MemberTask table have a revision number of 0 indicating that the planned dates have not been specified and need to be scheduled. These include the tasks named "Upgrade Workstation to MS Vista," "Design Document Guidelines," "Major Packages & Interface", "Major Sequences" and "Database." These tasks may be displayed in the member schedule editor and Web page in a to-do list manner as previously described herein to remind the project member of the tasks that need to be scheduled. Note that tasks added in the member schedule editor that are unrelated to a project are added to the Level1MemberTask table with a value of 0 for the project task ID. A non-project task does not have a parent project task ID so nProjectTaskID is set to 0 in the table. All other task for which the project task ID is greater than 0 (for example, greater than or equal to 10) indicates that the task is a project related task.

Figure 50:
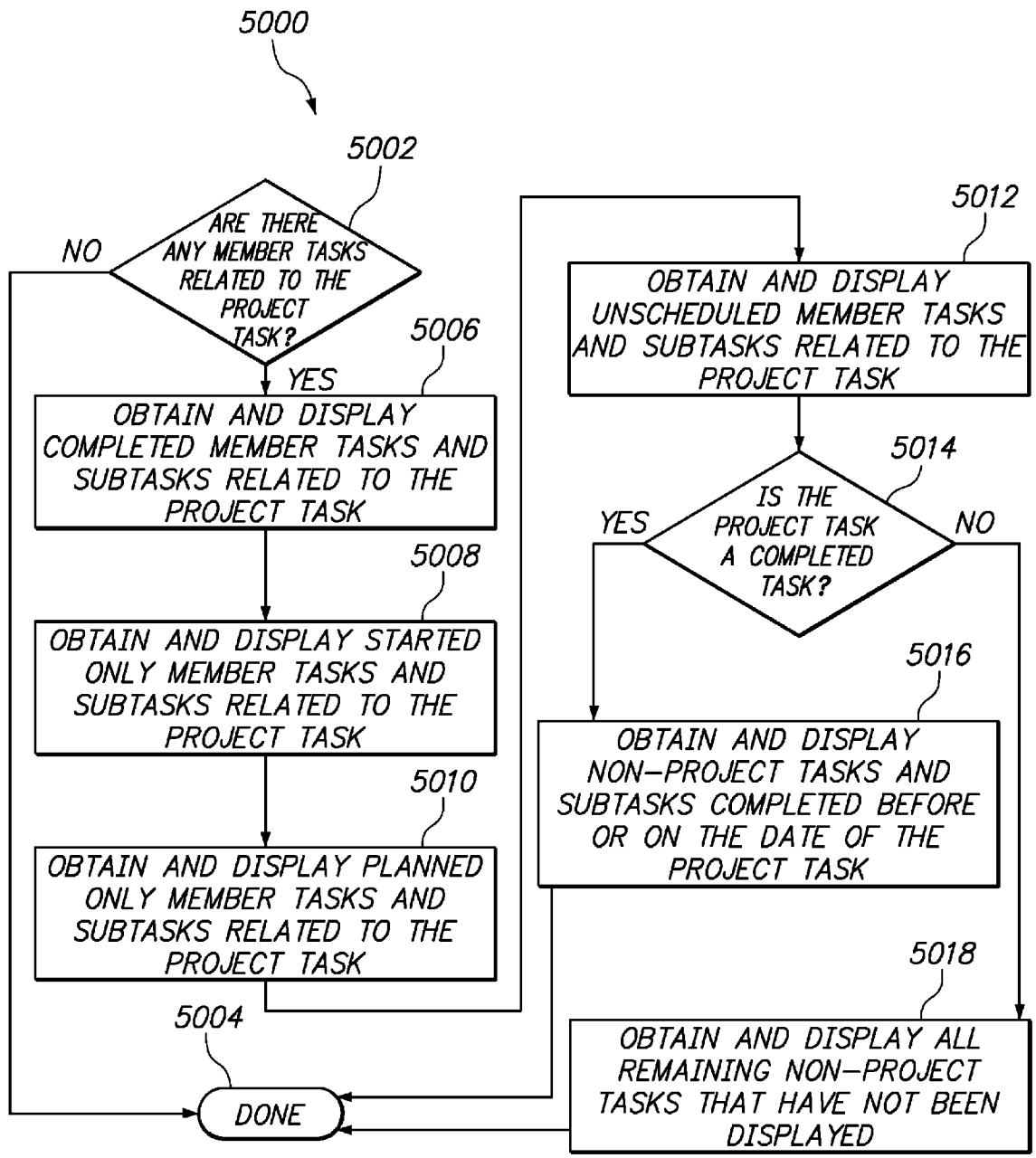
FIG. 50 is a flow diagram that depicts generating a table in the member schedule Web page.

FIG. 50 is a flow diagram 5000 that depicts generating a table in the member schedule Web page. One table corresponds to a project task that contains all its related member tasks. Non-project tasks can also be placed into the table for the project task as described in the flow diagram. The process in the flowchart is repeated for each project task that has been added to the project so that multiple tables are generated in the Web page of the member schedule. The system obtains all information about the project tasks and member tasks from the database.

Starting in step 5002, for each project task, the system determines if there are any member tasks related to the project task. If there are none, then no table is generated in the member schedule for the project task and the process is complete in step 5004. If there are member tasks related to the project task, then in step 5006, member tasks are obtained from the database under varying conditions to organize the display of the member tasks in the table for the project task. The completed member tasks (actualEnd is set) in order of ascending (earliest to latest) actual end date are obtained from Level1MemberTask table of the database. The schedule of the completed member tasks are displayed in the table along with the schedule of its subtasks obtained from LevelXMemberTask tables where X is 2, 3, and 4. Also, in step 5008, the started only member tasks (actualStart is set but actualEnd is not set) in order of ascending actual start date are obtained from Level1MemberTask table of the database. The schedule of the started only member tasks are displayed in the table along with the schedule of its subtasks obtained from LevelXMemberTask tables. In step 5010, the planned only member tasks (planStart is set) in order of ascending plan start date are obtained from Level1MemberTask table of the database. The schedule of the planned only member tasks are displayed in the table along with the schedule of its subtasks obtained from LevelXMemberTask tables. In step 5012, the unscheduled or to-do list member tasks (revision number 0 tasks) in order of ascending set date are obtained from Level1MemberTask table of the database. The unscheduled member tasks are displayed in the table along with the schedule of its subtasks obtained from LevelXMemberTask tables.

In step 5014, a determination is made whether the project task is a completed task. If the project task is a completed task, then in step 5016, all completed non-project tasks (level 1 member tasks where the project task id is 0) in order of ascending actual end date whose completion date is before or on the completion date of the project task are obtained from Level1MemberTask table of the database. The schedule of the completed non-project member tasks are displayed in the table along with the schedule of its subtasks obtained from LevelXMemberTask tables.

If, in step 5014, the project task is not a completed task, then in step 5018, all remaining non-project tasks in order of descending revision number (the to-do list of non-project task will be last) that have not been displayed in the member schedule are obtained from Level1MemberTask table of the database. The schedule of the non-project member tasks are displayed in the table along with the schedule of its subtasks obtained from LevelXMemberTask tables. Then the table of all member tasks related to the project task is completed. The member tasks are organized in the table in the following order: completed tasks, started only task, planned only task, unscheduled task, and non-project task. Though not shown in the flowchart, access is made to the LevelXMemberTaskHistory tables where X is 1, 2, 3, and 4 to obtain all revision history of the schedule of all member tasks to display the history of the schedule in the member schedule Web page. All revisions of the schedule of tasks obtain from the LevelXMemberTaskHistory tables will be displayed in the table of the Web page with strikethrough text.

Listed below are sample queries used to obtain member tasks associated with the project task id 30 corresponding to the database tables shown in FIG. 49A.

Figure 51:
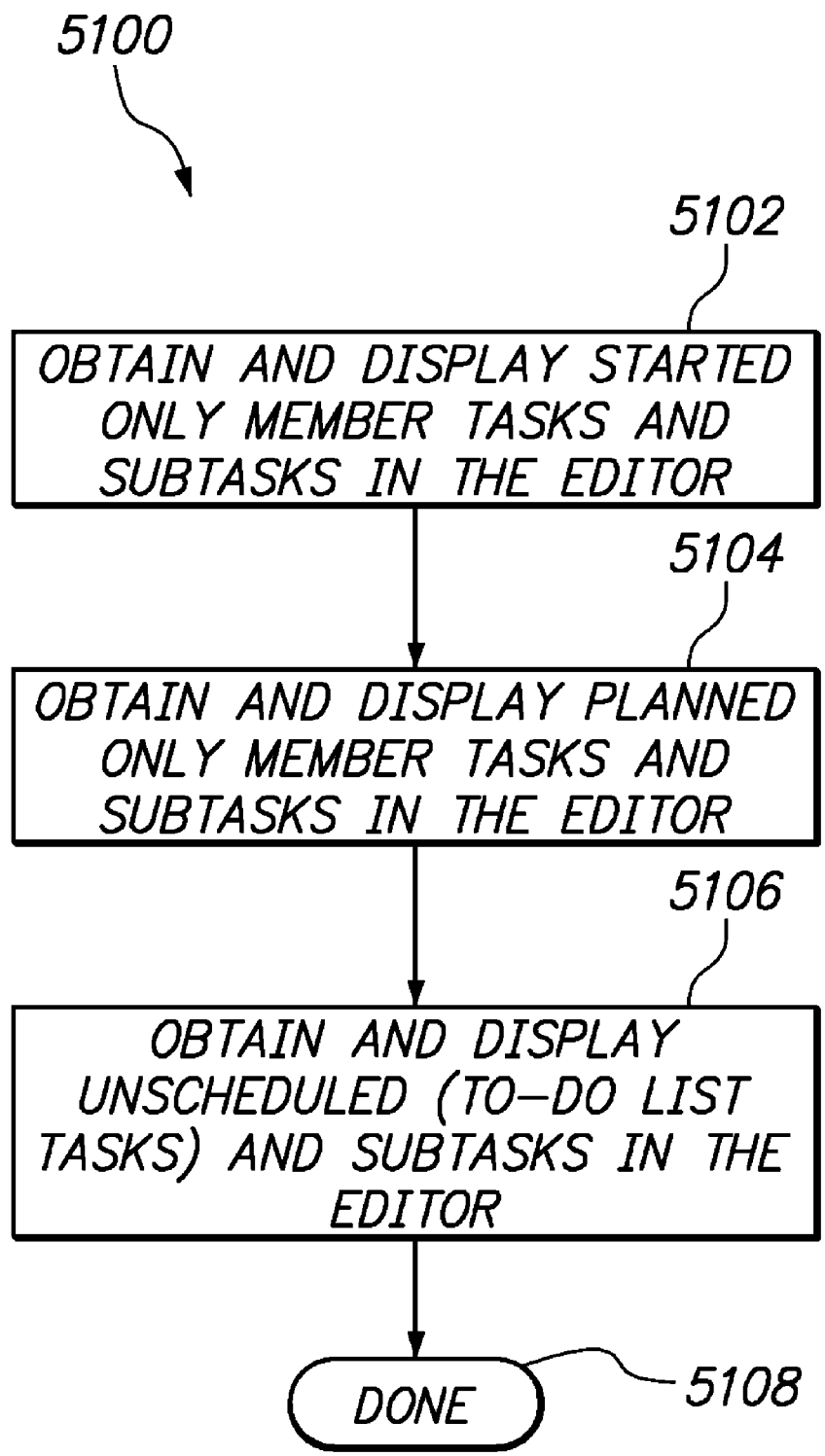
FIG. 51 is a flow diagram that depicts a process for obtaining the schedule for the tasks that will be displayed in the rows of the table of the member schedule editor.

1. Obtain completed member tasks: SELECT nLevel1TaskID FROM Level1MemberTask WHERE sProjectNumber="J98" AND sMemberLabel='T1' AND nProjectTaskID=30 AND actualEnd IS NOT NULL ORDER BY actualEnd
2. Obtain started only member tasks: SELECT nLevel1TaskID FROM Level1MemberTask WHERE sProjectNumber="J98" AND sMemberLabel='T1' AND nProjectTaskID=30 AND actualStart IS NOT NULL AND actualEnd IS NULL ORDER BY actualStart
3. Obtain planned only member tasks: SELECT nLevel1TaskID FROM Level1MemberTask WHERE sProjectNumber="J98" AND sMemberLabel='T1' AND nProjectTaskID=30 AND planStart IS NOT NULL AND actualStart IS NULL AND actualEnd IS NULL ORDER BY planStart
4. Obtain unscheduled (to-do list) member tasks: SELECT nLevel1TaskID FROM Level1MemberTask WHERE sProjectNumber="J98" AND sMemberLabel='T1' AND nProjectTaskID=30 AND nScheduleRevNumber=0 ORDER BY setDate FIG. 51 is a flow diagram 5100 that depicts a process for obtaining the schedule for the tasks that will be displayed in the rows of the table of the member schedule editor. The table displays uncompleted level 1 tasks for project and non-project tasks and all its subtasks (completed or not) that have not been deleted. In step 5102, the started only member tasks (actualStart is set but actualEnd is not set) in order of ascending actual start date are obtained from Level1MemberTask table of the database. The schedule of the started only member tasks are displayed in the table along with the schedule of its subtasks obtained from LevelXMemberTask tables. In step 5104, the planned only member tasks (planStart is set) in order of ascending plan start date are obtained from Level1MemberTask table of the database. The schedule of the planned only member tasks are displayed in the table along with the schedule of its subtasks obtained from LevelXMemberTask tables. In step 5106, the unscheduled or to-do list member tasks (revision number 0 tasks) in order of ascending set date are obtained from Level1MemberTask table of the database. The unscheduled member tasks are displayed in the table along with the schedule of its subtasks obtained from LevelXMemberTask tables. Then the table for the member schedule editor is done showing all uncompleted project and non-project tasks. Since the table does not depict the revision of the schedule of the tasks, there is no access to the history tables. The tasks in the member schedule editor are organized in the table in the following order: started only task, planned only task, and unscheduled (to-do list) task. The process is complete in step 5108.

Listed below are sample queries used to obtain uncompleted and undeleted member tasks corresponding to the database tables shown in FIG. 49A. The queries access the MemberTasks table to obtain information about whether or not a task was deleted.

1. Obtain started only member tasks: SELECT LevelOne.*FROM MemberTasks AS MTasks, Level1MemberTask AS LevelOne WHERE LevelOne.sProjectNumber="J98" AND MTasks.sProjectNumber="J98" AND MTasks.sMemberName='test1' AND LevelOne.nLevel1TaskID=MTasks.nLevel1TaskID AND bIsObsoleted=0 AND actualStart IS NOT NULL AND actualEnd IS NULL ORDER BY actualStart
2. Obtain planned only member tasks: SELECT LevelOne.*FROM MemberTasks AS MTasks, Level1MemberTask AS LevelOne WHERE LevelOne.sProjectNumber="J98" AND MTasks.sProjectNumber="J98" AND MTasks.sMemberName='test1' AND LevelOne.nLevel1TaskID=MTasks.nLevel1TaskID AND bIsObsoleted=0 AND planStart IS NOT NULL AND actualStart IS NULL AND actualEnd IS NULL ORDER BY planStart 3. Obtain unscheduled (to-do list) member tasks: SELECT LevelOne.*FROM MemberTasks AS MTasks, Level1MemberTask AS LevelOne WHERE LevelOne.sProjectNumber='J98' AND MTasks.sProjectNumber="J98" AND MTasks.sMemberName='test1' AND LevelOne.nLevel1TaskID=MTasks .nLevel1TaskID AND bIsObsoleted=0 AND nScheduleRevNumber=0 ORDER BY setDate Implementation Examples FIG. 35 is a block diagram that depicts a computer system 3500 upon which embodiments of the invention can be implemented. Computer system 3500 additionally depicts a non-limiting example of a system configuration of the workstation 102 (FIG. 1) and the Web server 104 (FIG. 1). Computer system 3500 includes a bus 3502 or other communication mechanism for communicating information, and a processor 3504 coupled with bus 3502 for processing information. Computer system 3500 also includes a main memory 3506, such as a random access memory (RAM) or other dynamic storage device, coupled to bus 3502 for storing information and instructions to be executed by processor 3504. Main memory 3506 also may be used for storing temporary variables or other intermediate information during execution of instructions to be executed by processor 3504. Computer system 3500 further includes a read only memory (ROM) 3508 or other static storage device coupled to bus 3502 for storing static information and instructions for processor 3504. A storage device 3510, such as a magnetic disk, optical disk, or magneto-optical disk, is provided and coupled to bus 3502 for storing information and instructions.

Computer system 3500 may be coupled via bus 3502 to a display 3512, such as a cathode ray tube (CRT) or a liquid crystal display (LCD), for displaying information to a computer user. An input device 3514, including alphanumeric and other keys, is coupled to bus 3502 for communicating information and command selections to processor 3504. Another type of user input device is cursor control 3516, such as a mouse, a trackball, or cursor direction keys for communicating direction information and command selections to processor 3504 and for controlling cursor movement on display 3512. This input device typically has two degrees of freedom in two axes, a first axis (e.g., x) and a second axis (e.g., y), that allows the device to specify positions in a plane.

Embodiments of the invention are related to the use of computer system 3500 for implementing the techniques described herein. According to one embodiment of the invention, those techniques are performed by computer system 3500 in response to processor 3504 executing one or more sequences of one or more instructions contained in main memory 3506. Such instructions may be read into main memory 3506 from another computer-readable medium, such as storage device 3510. Execution of the sequences of instructions contained in main memory 3506 causes processor 3504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3504 for execution. Such a medium may take many forms, including but not limited to, non-volatile media, volatile media, and transmission media. Examples of non-volatile media include, without limitation, optical, magnetic disks, or magneto-optical disks, such as storage device 3510. Volatile media includes dynamic memory, such as main memory 3506. Transmission media includes coaxial cables, copper wire and fiber optics, including the wires that comprise bus 3502. Transmission media can also take the form of acoustic or light waves, such as those generated during radio-wave and infra-red data communications.

Common forms of computer-readable media include, without limitation, a floppy disk, a flexible disk, hard disk, magnetic tape, any other magnetic medium; a CD-ROM, DVD, any other optical or magneto-optical medium; punchcards, papertape, any other physical medium with patterns of holes; a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3504 for execution. For example, the instructions may initially be carried on a magnetic disk of a remote computer. The remote computer can load the instructions into its dynamic memory and send the instructions over a telephone line using a modem. A modem local to computer system 3500 can receive the data on the telephone line and use an infra-red transmitter to convert the data to an infra-red signal. An infra-red detector can receive the data carried in the infra-red signal and appropriate circuitry can place the data on bus 3502. Bus 3502 carries the data to main memory 3506, from which processor 3504 retrieves and executes the instructions. The instructions received by main memory 3506 may optionally be stored on storage device 3510 either before or after execution by processor 3504.

Computer system 3500 also includes a communication interface 3518 coupled to bus 3502. Communication interface 3518 provides a two-way data communication coupling to a network link 3520 that is connected to a local network 3522. For example, communication interface 3518 may be an integrated services digital network (ISDN) card or a modem to provide a data communication connection to a corresponding type of telephone line. As another example, communication interface 3518 may be a local area network (LAN) card to provide a data communication connection to a compatible LAN. Wireless links may also be implemented. In any such implementation, communication interface 3518 sends and receives electrical, electromagnetic or optical signals that carry digital data streams representing various types of information.

Network link 3520 typically provides data communication through one or more networks to other data devices. For example, network link 3520 may provide a connection through local network 3522 to a host computer 3524 or to data equipment operated by an Internet Service Provider (ISP) 3526. ISP 3526 in turn provides data communication services through the world wide packet data communication network now commonly referred to as the "Internet" 3528. Local network 3522 and Internet 3528 both use electrical, electromagnetic or optical signals that carry digital data streams. The signals through the various networks and the signals on network link 3520 and through communication interface 3518, which carry the digital data to and from computer system 3500, are exemplary forms of carrier waves transporting the information.

Computer system 3500 can send messages and receive data, including program code, through the network(s), network link 3520 and communication interface 3518. In the Internet example, a server 3530 might transmit a requested code for an application program through Internet 3528, ISP 3526, local network 3522 and communication interface 3518.

The received code may be executed by processor 3504 as it is received, and/or stored in storage device 3510, or other non-volatile storage for later execution. In this manner, computer system 3500 may obtain application code in the form of a carrier wave.

Extensions and Alternatives

Alternative embodiments are described throughout the foregoing description, and in locations that best facilitate understanding the context of the embodiments. Furthermore, the embodiments have been described with reference to specific embodiments thereof. It will, however, be evident that various modifications and changes may be made thereto without departing from any broader concepts. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

Functional implementation of the various inventive embodiments described herein may be implemented equivalently in hardware, software, firmware, and/or other available functional components or building blocks. No specific limitation is intended to a particular device or programmatic sequence. Other variations and embodiments are possible in light of above teachings.

What is claimed is:

1. A computer-implemented method for managing project schedule data, the computer-implemented method comprising:
    generating schedule data for a task in the project;
    determining whether the schedule data is the first schedule data for the task in the project;
    if the schedule data is the first schedule data for the task in the project, then
        storing the schedule data in a current task schedule data structure, and
        generating and storing in association with the schedule data, version data that indicates that the schedule data is a first version of schedule data for the task in the project;
    if the schedule data is not the first schedule data for the task in the project, then
        determining whether the schedule data should be considered to be a new version of schedule data for the task in the project,
        if the schedule data should be considered to be a new version of schedule data for the task in the project, then
            moving existing schedule data from the current task schedule data structure to a historical task schedule data structure that is separate from the current task schedule data structure, and
            storing the schedule data in the current task schedule data structure; and
    wherein one or more of the steps are performed by one or more processors.

2. The computer-implemented method as recited in claim 1, further comprising if the schedule data should be considered to be a new version of schedule data for the task in the project, then generating and storing in association with the schedule data, version data that indicates that the schedule data is the most recent version of schedule data for the task in the project.

3. The computer-implemented method as recited in claim 1, wherein determining whether the schedule data should be considered to be a new version of schedule data for the task in the project includes comparing a first date on which the existing schedule data was created to a second data on which the schedule data was created.

4. The computer-implemented method as recited in claim 3, wherein the schedule data is considered to be a new version of schedule data for the task in the project if the second date is after the first date.

5. The computer-implemented method as recited in claim 1, further comprising if the schedule data should not be considered to be a new version of schedule data for the task in the project, then overwriting the existing schedule data in the current task schedule data structure with the schedule data.

6. The computer-implemented method as recited in claim 5, further comprising associating with the schedule data version data that was previously associated with the existing schedule data and indicated that the existing schedule data was the most recent version of schedule data for the task in the project.

7. The computer-implemented method as recited in claim 1, wherein determining whether the schedule data is the first schedule data for the task in the project includes examining version data associated with the schedule data to determine whether the schedule data is the first schedule data for the task in the project.

8. The computer-implemented method as recited in claim 1, wherein the current task schedule data structure is a current schedule data table and the historical task schedule data structure is a historical schedule data table.

9. A non-transitory computer-readable medium for managing project schedule data, the computer-readable medium carrying instructions which, when processed by one or more processors, cause:
    generating schedule data for a task in the project;
    determining whether the schedule data is the first schedule data for the task in the project;
    if the schedule data is the first schedule data for the task in the project, then
        storing the schedule data in a current task schedule data structure, and
        generating and storing in association with the schedule data, version data that indicates that the schedule data is a first version of schedule data for the task in the project; and
    if the schedule data is not the first schedule data for the task in the project, then
        determining whether the schedule data should be considered to be a new version of schedule data for the task in the project,
        if the schedule data should be considered to be a new version of schedule data for the task in the project, then
            moving existing schedule data from the current task schedule data structure to a historical task schedule data structure that is separate from the current task schedule data structure, and
            storing the schedule data in the current task schedule data structure.

10. The non-transitory computer-readable medium as recited in claim 9, further comprising additional instructions which, when processed by the one or more processors, cause if the schedule data should be considered to be a new version of schedule data for the task in the project, then generating and storing in association with the schedule data, version data that indicates that the schedule data is the most recent version of schedule data for the task in the project.

11. The non-transitory computer-readable medium as recited in claim 9, wherein determining whether the schedule data should be considered to be a new version of schedule data for the task in the project includes comparing a first date on which the existing schedule data was created to a second data on which the schedule data was created.

12. The non-transitory computer-readable medium as recited in claim 11, wherein the schedule data is considered to be a new version of schedule data for the task in the project if the second date is after the first date.

13. The non-transitory computer-readable medium as recited in claim 9, further comprising additional instructions which, when processed by the one or more processors, cause if the schedule data should not be considered to be a new version of schedule data for the task in the project, then overwriting the existing schedule data in the current task schedule data structure with the schedule data.

14. The non-transitory computer-readable medium as recited in claim 13, further comprising additional instructions which, when processed by the one or more processors, cause associating with the schedule data version data that was previously associated with the existing schedule data and indicated that the existing schedule data was the most recent version of schedule data for the task in the project.

15. The non-transitory computer-readable medium as recited in claim 9, wherein determining whether the schedule data is the first schedule data for the task in the project includes examining version data associated with the schedule data to determine whether the schedule data is the first schedule data for the task in the project.

16. The non-transitory computer-readable medium as recited in claim 9, wherein the current task schedule data structure is a current schedule data table and the historical task schedule data structure is a historical schedule data table.

17. An apparatus for managing project schedule data, the apparatus comprising:
one or more processors; and
a memory storing instructions which, when processed by the one or more processors, cause:
generating schedule data for a task in the project;
determining whether the schedule data is the first schedule data for the task in the project;
if the schedule data is the first schedule data for the task in the project, then
storing the schedule data in a current task schedule data structure, and
generating and storing in association with the schedule data, version data that indicates that the schedule data is a first version of schedule data for the task in the project; and
if the schedule data is not the first schedule data for the task in the project, then
determining whether the schedule data should be considered to be a new version of schedule data for the task in the project,
if the schedule data should be considered to be a new version of schedule data for the task in the project, then
moving existing schedule data from the current task schedule data structure to a historical task schedule data structure that is separate from the current task schedule data structure, and
storing the schedule data in the current task schedule data structure.

18. The apparatus as recited in claim 17, wherein the memory further stores additional instructions which, when processed by the one or more processors, cause if the schedule data should be considered to be a new version of schedule data for the task in the project, then generating and storing in association with the schedule data, version data that indicates that the schedule data is the most recent version of schedule data for the task in the project.

19. The apparatus as recited in claim 17, wherein determining whether the schedule data should be considered to be a new version of schedule data for the task in the project includes comparing a first date on which the existing schedule data was created to a second data on which the schedule data was created.

20. The apparatus as recited in claim 19, wherein the schedule data is considered to be a new version of schedule data for the task in the project if the second date is after the first date.

21. The apparatus as recited in claim 17, wherein the memory further stores additional instructions which, when processed by the one or more processors, cause if the schedule data should not be considered to be a new version of schedule data for the task in the project, then overwriting the existing schedule data in the current task schedule data structure with the schedule data.

22. The apparatus as recited in claim 21, wherein the memory further stores additional instructions which, when processed by the one or more processors, cause associating with the schedule data version data that was previously associated with the existing schedule data and indicated that the existing schedule data was the most recent version of schedule data for the task in the project.

23. The apparatus as recited in claim 17, wherein determining whether the schedule data is the first schedule data for the task in the project includes examining version data associated with the schedule data to determine whether the schedule data is the first schedule data for the task in the project.

24. The apparatus as recited in claim 17, wherein the current task schedule data structure is a current schedule data table and the historical task schedule data structure is a historical schedule data table.

* * * * *